US012006921B2

(12) United States Patent
McIntosh

(10) Patent No.: US 12,006,921 B2
(45) Date of Patent: Jun. 11, 2024

(54) APPARATUS, SYSTEMS, AND METHODS FOR CONVERTING VEHICULAR KINETIC ENERGY INTO ELECTRICITY

(71) Applicant: RoadPower Systems Inc., Brooklyn, NY (US)

(72) Inventor: Ryan McIntosh, Jersey City, NJ (US)

(73) Assignee: ROADPOWER SYSTEMS INC., Brooklyn, NY (US)

( * ) Notice: Subject to any disclaimer, the term of this patent is extended or adjusted under 35 U.S.C. 154(b) by 344 days.

(21) Appl. No.: 17/432,715

(22) PCT Filed: Feb. 20, 2020

(86) PCT No.: PCT/US2020/018943
§ 371 (c)(1),
(2) Date: Aug. 20, 2021

(87) PCT Pub. No.: WO2020/172352
PCT Pub. Date: Aug. 27, 2020

(65) Prior Publication Data
US 2022/0166289 A1    May 26, 2022

Related U.S. Application Data

(60) Provisional application No. 62/807,990, filed on Feb. 20, 2019.

(51) Int. Cl.
*F03G 7/08* (2006.01)
*H02K 7/02* (2006.01)
(Continued)

(52) U.S. Cl.
CPC .............. *F03G 7/085* (2021.08); *H02K 7/02* (2013.01); *H02K 7/108* (2013.01); *H02K 7/116* (2013.01); *H02K 7/1853* (2013.01); *H02K 11/30* (2016.01)

(58) Field of Classification Search
CPC .......... F03G 7/085; H02K 7/085; H02K 7/02; H02K 7/108; H02K 7/116; H02K 7/1853
(Continued)

(56) References Cited

U.S. PATENT DOCUMENTS 4,130,064 A * 12/1978 Bridwell ................. F04B 17/00
                                                         104/154
6,172,426 B1    1/2001 Galich
(Continued)

OTHER PUBLICATIONS

International Search Report issued in corresponding International Application No. PCT/US2020/018943, dated May 19, 20210, pp. 1-2.

*Primary Examiner* — Rashad H Johnson
(74) *Attorney, Agent, or Firm* — Carter, DeLuca & Farrell LLP

(57) ABSTRACT

A system for converting vehicular kinetic energy into electricity includes at least one on-road energy collection sub-system and a transmission sub-system. The on-road energy collection sub-system includes at least one flap lever configured to pivot in response to a vehicle driving thereover, and at least one flap lever shaft coupled to the flap lever such that the pivoting of the flap lever drives movement (rotational and/or translational) of the flap lever shaft. At least one output shaft is coupled to the flap lever shaft such that the output shaft is driven to rotate to provide a unidirectional rotational output in response to the movement of the flap lever shaft. The transmission sub-system is configured to receive the unidirectional rotational output from the output shaft as a rotational input and to selectively modify the rotational input for transmission to a flywheel sub-system.

19 Claims, 43 Drawing Sheets

(51) Int. Cl.
*H02K 7/108* (2006.01)
*H02K 7/116* (2006.01)
*H02K 7/18* (2006.01)
*H02K 11/30* (2016.01)

(58) Field of Classification Search
USPC .................................................. 310/68 R, 71
See application file for complete search history.

(56) References Cited

U.S. PATENT DOCUMENTS

| | | | |
|---|---|---|---|
| 6,767,161 B1* | 7/2004 | Calvo | F03G 7/08 |
| | | | 290/1 R |
| 7,497,285 B1* | 3/2009 | Radev | B60K 6/52 |
| | | | 180/65.23 |
| 2007/0240922 A1* | 10/2007 | Kikuchi | B60K 6/547 |
| | | | 180/65.25 |
| 2008/0296897 A1* | 12/2008 | Kovach | H02J 3/381 |
| | | | 290/44 |
| 2010/0192561 A1 | 8/2010 | Hendrickson | |
| 2011/0187125 A1* | 8/2011 | Jang | F03G 7/083 |
| | | | 290/1 C |
| 2015/0360674 A1* | 12/2015 | Nefcy | B60W 10/08 |
| | | | 180/65.285 |
| 2016/0230784 A1 | 8/2016 | Shani et al. | |
| 2016/0280071 A1* | 9/2016 | Newman | B60L 1/003 |
| 2020/0378363 A1* | 12/2020 | Lee | G05F 1/67 |
| 2020/0386295 A1* | 12/2020 | Clegern | F16F 15/3156 |
| 2021/0172495 A1* | 6/2021 | Mepham | F16F 15/1295 |

* cited by examiner

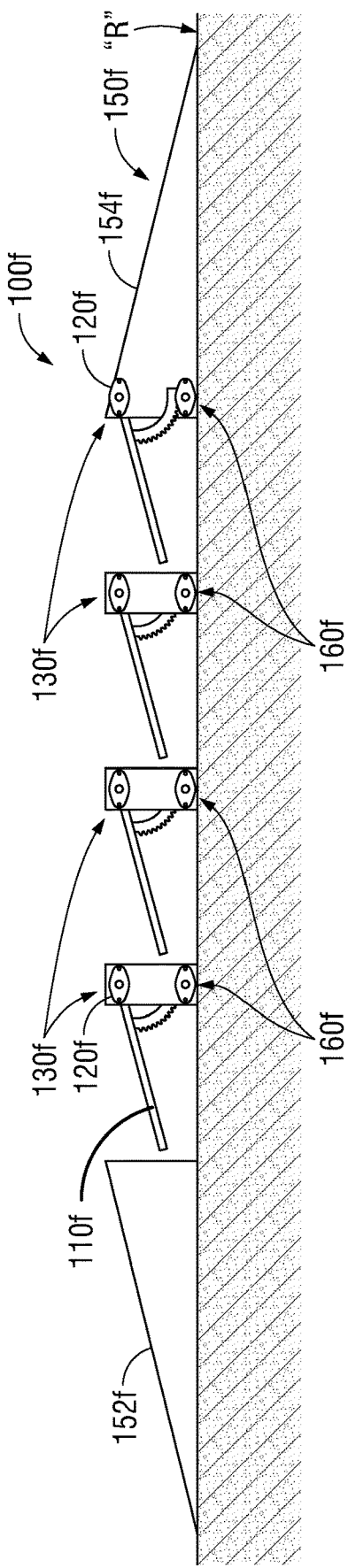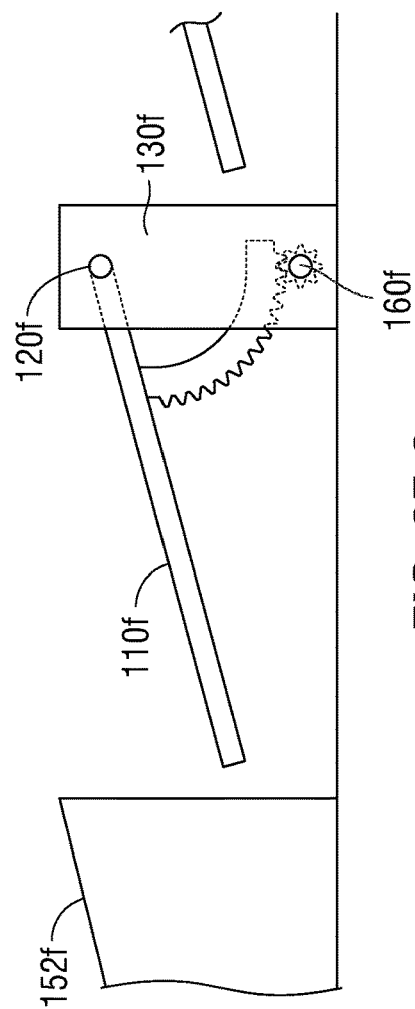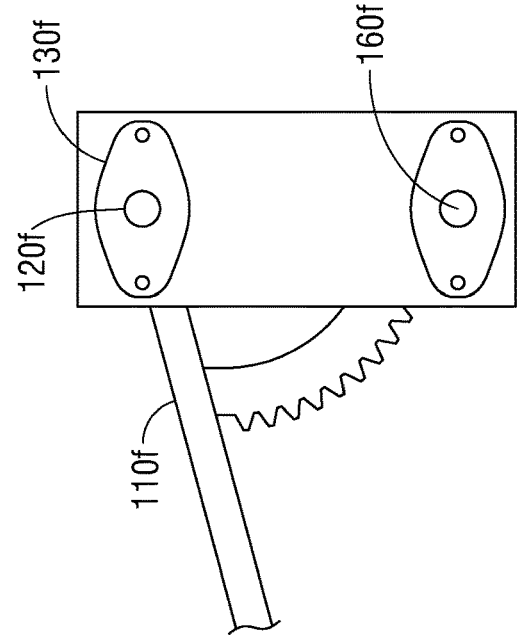

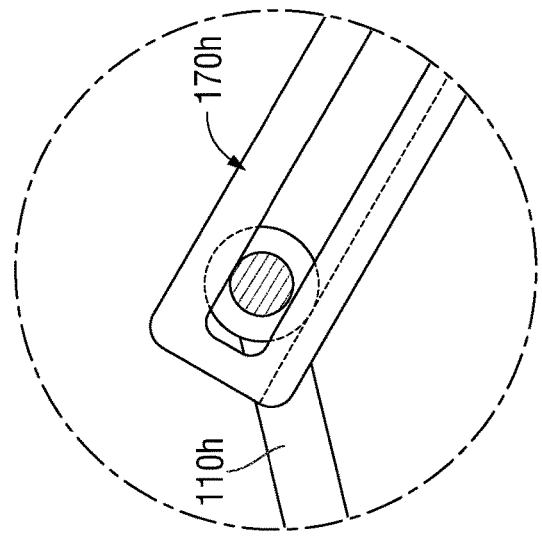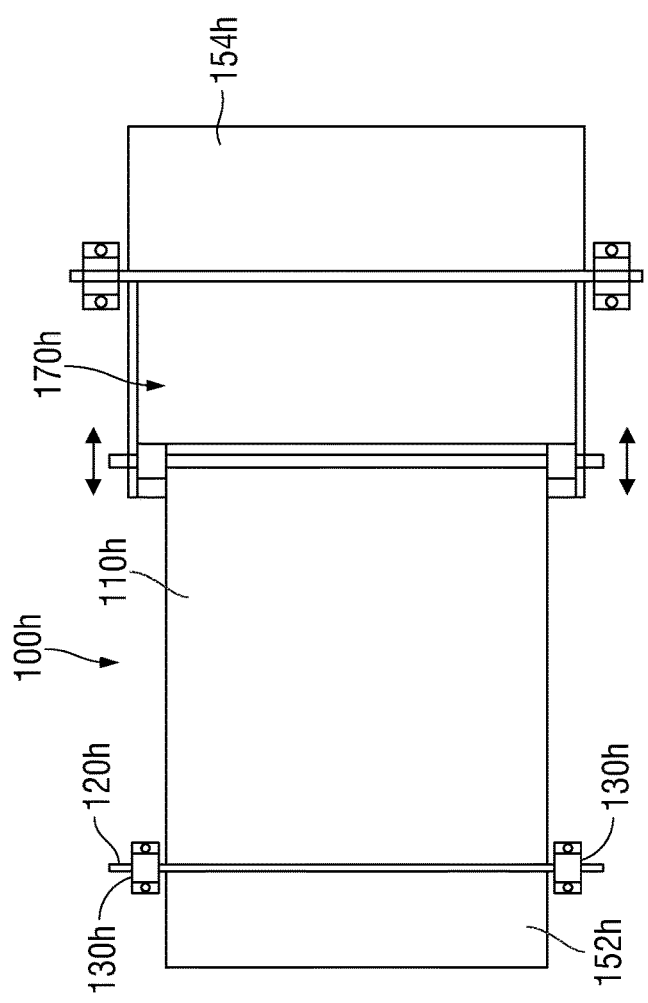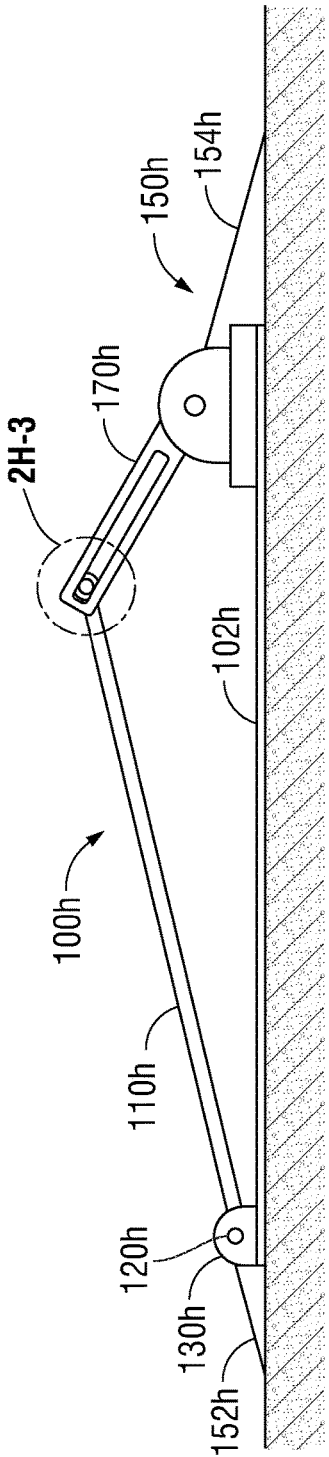

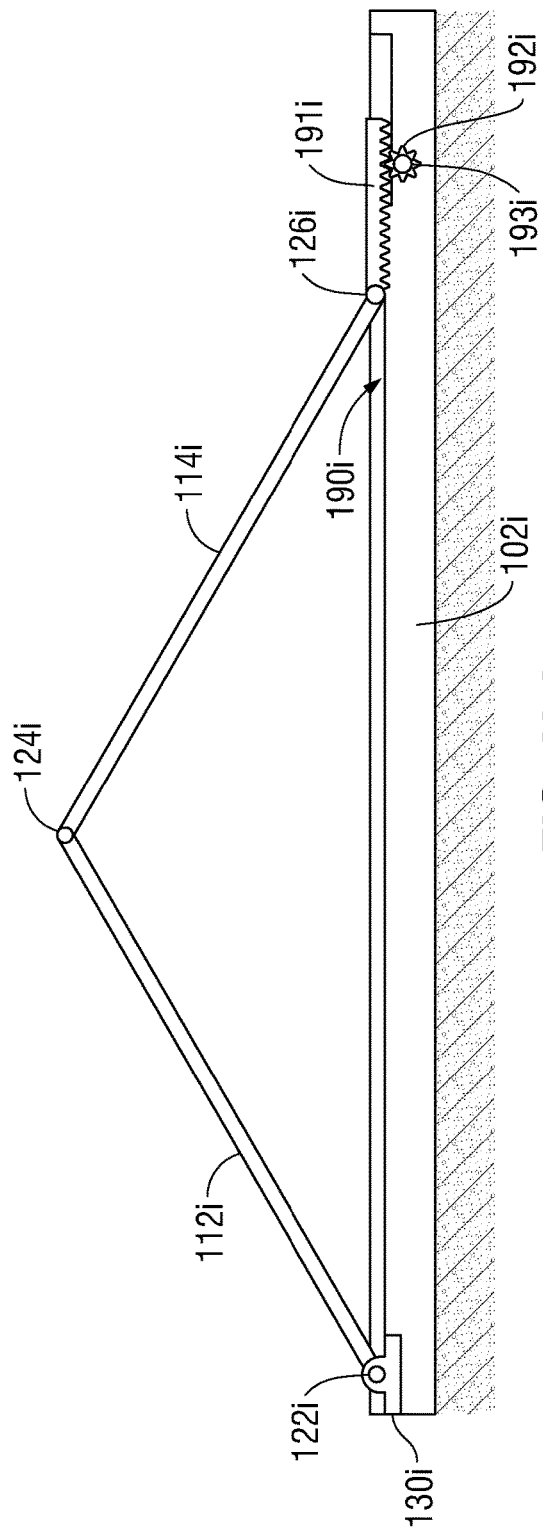
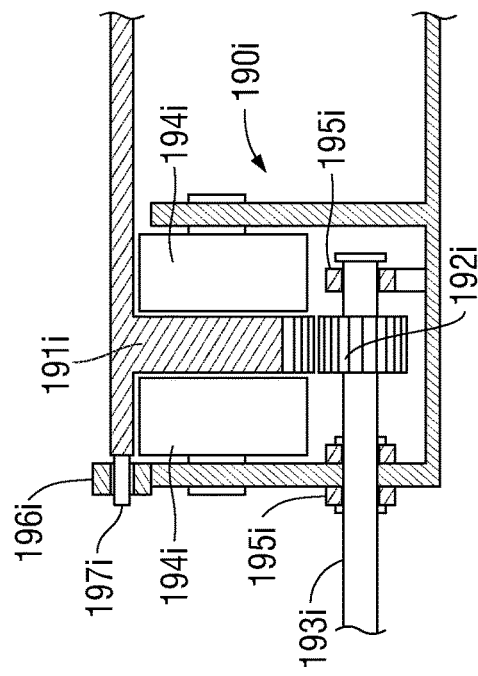
FIG. 2I-2
FIG. 2I-3

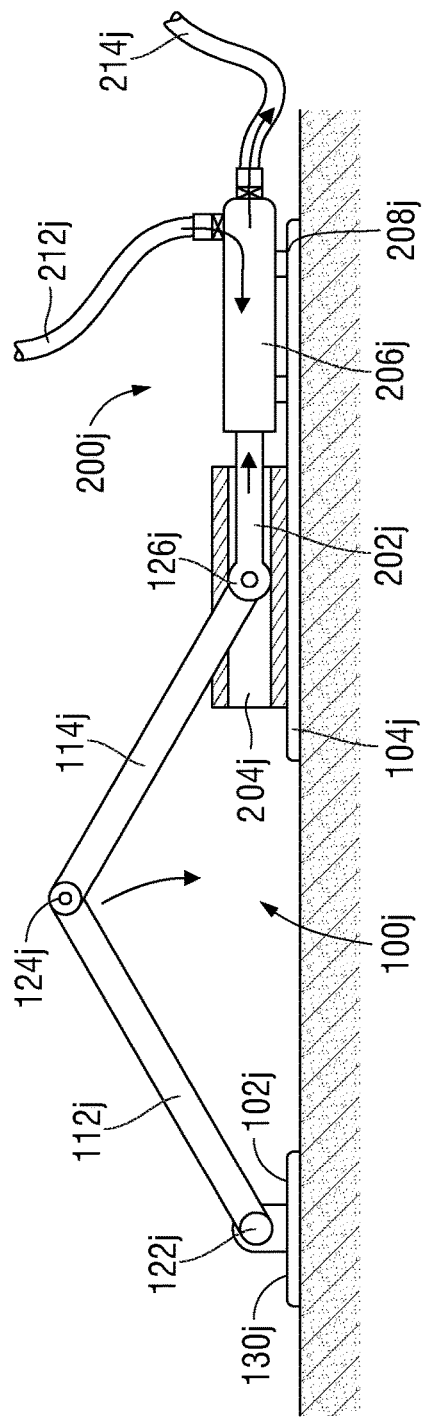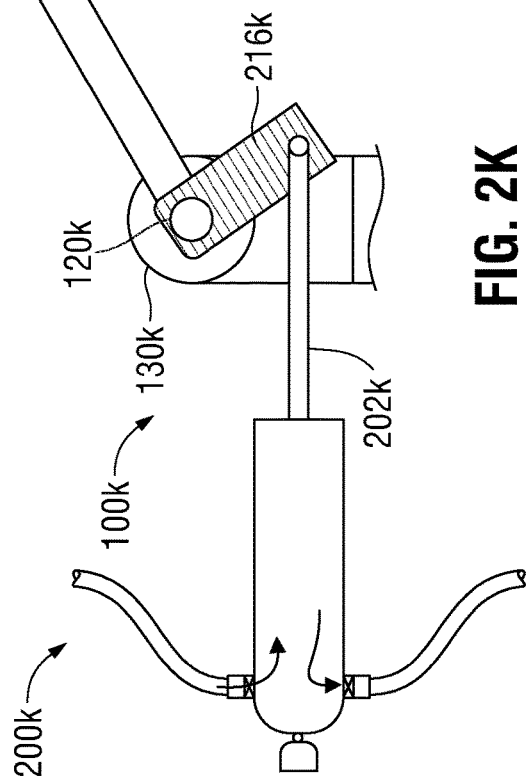

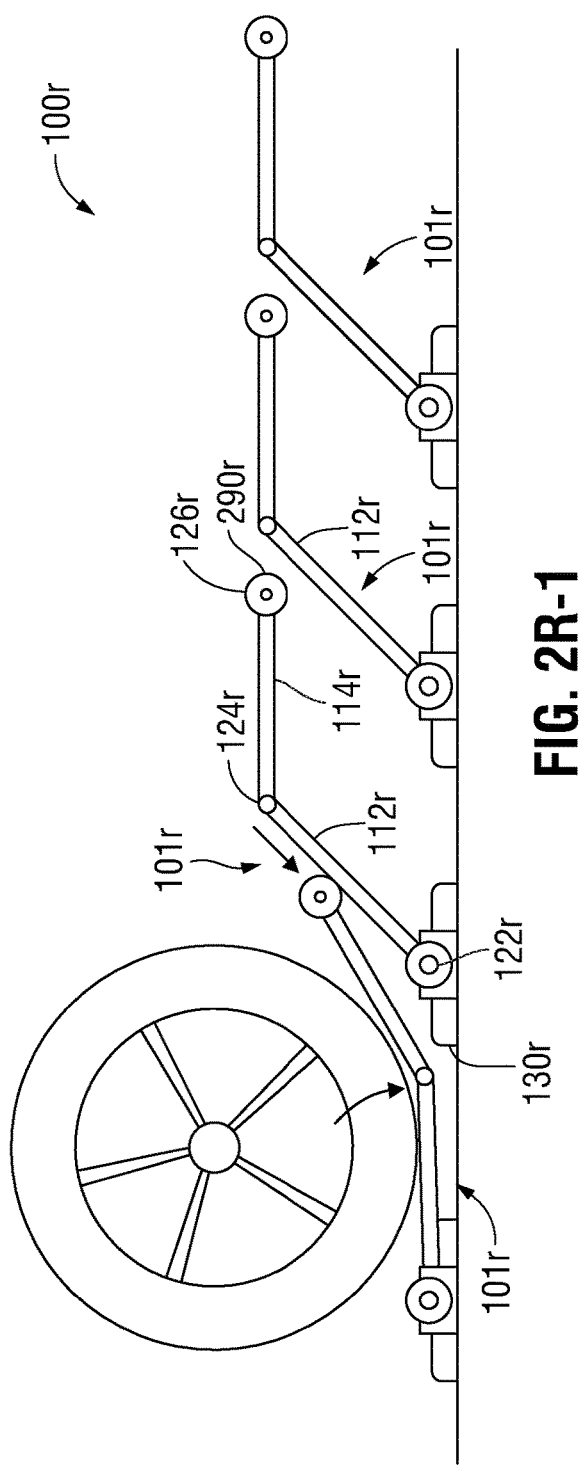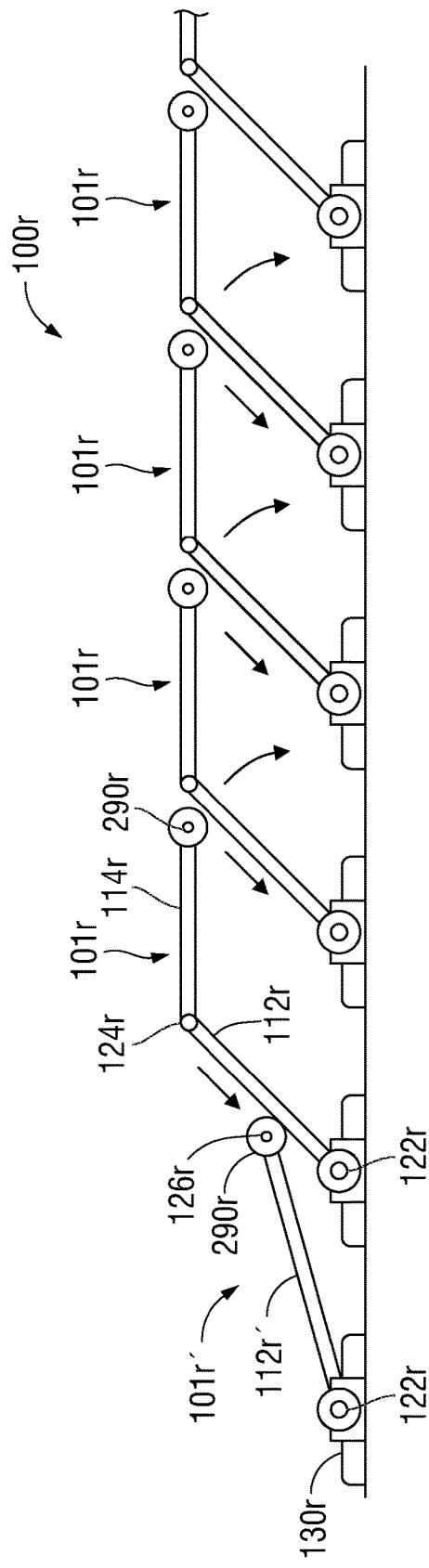

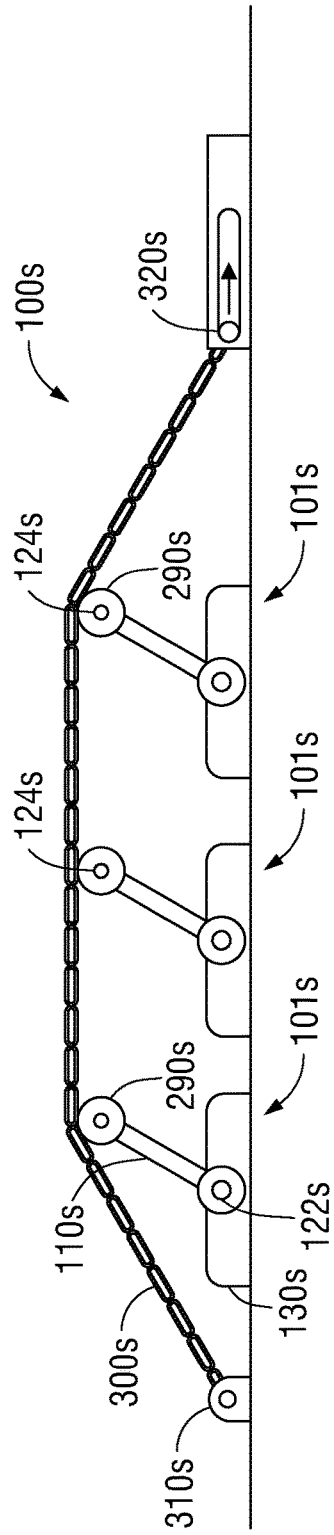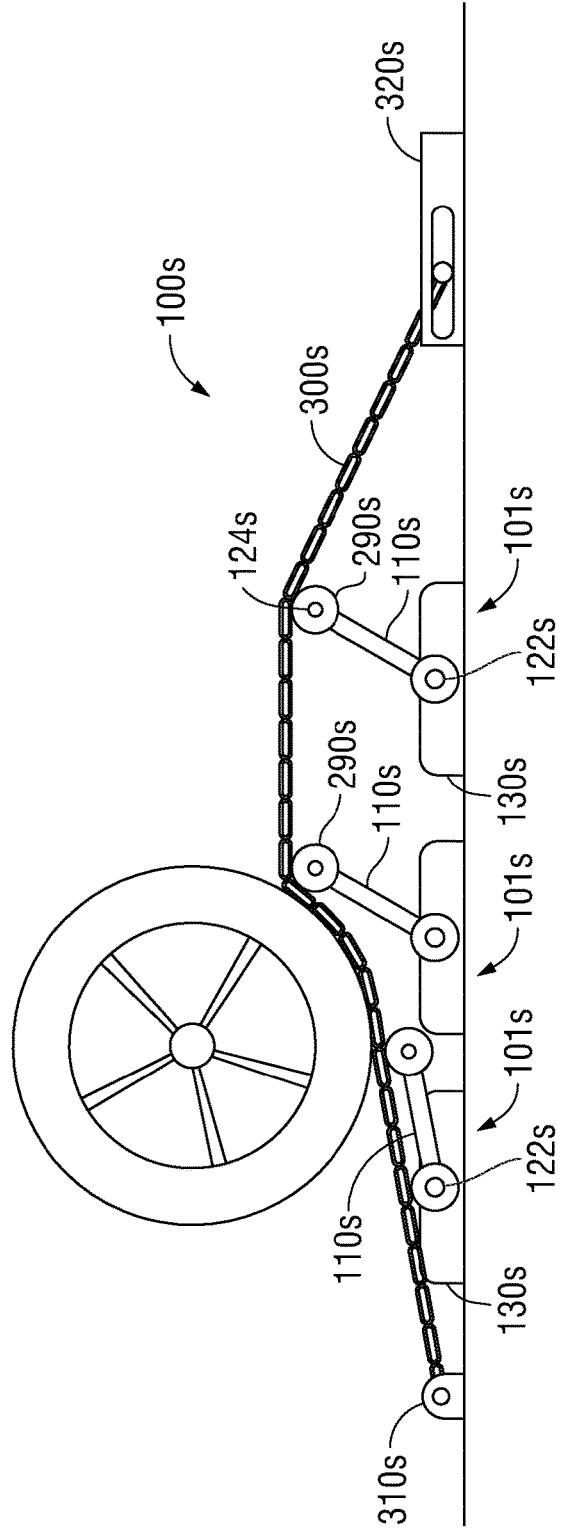

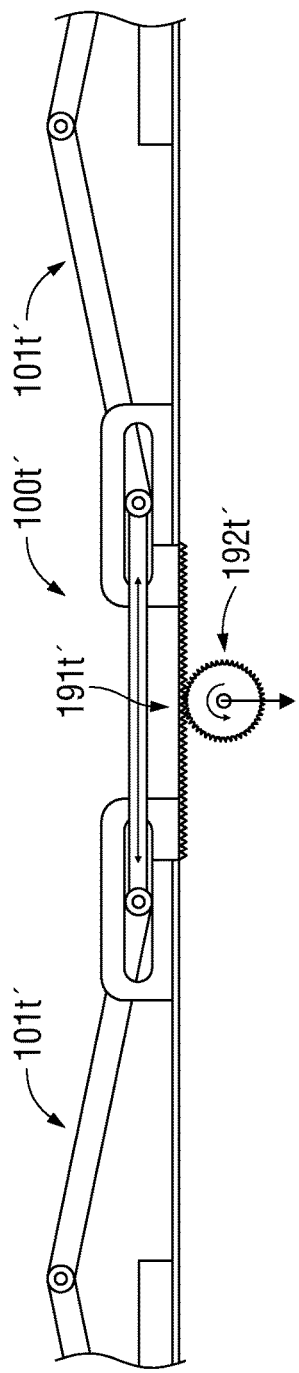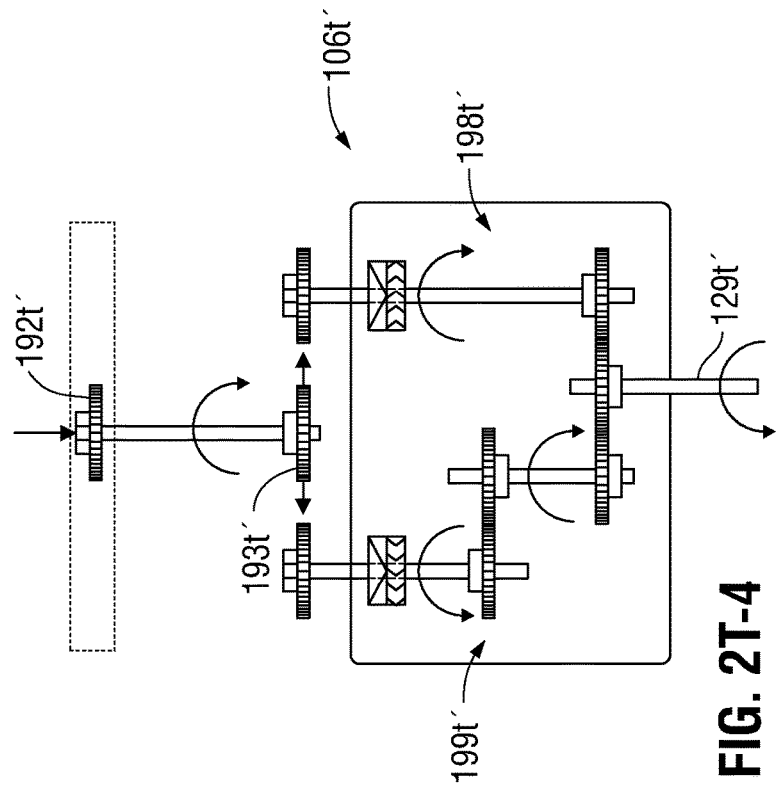

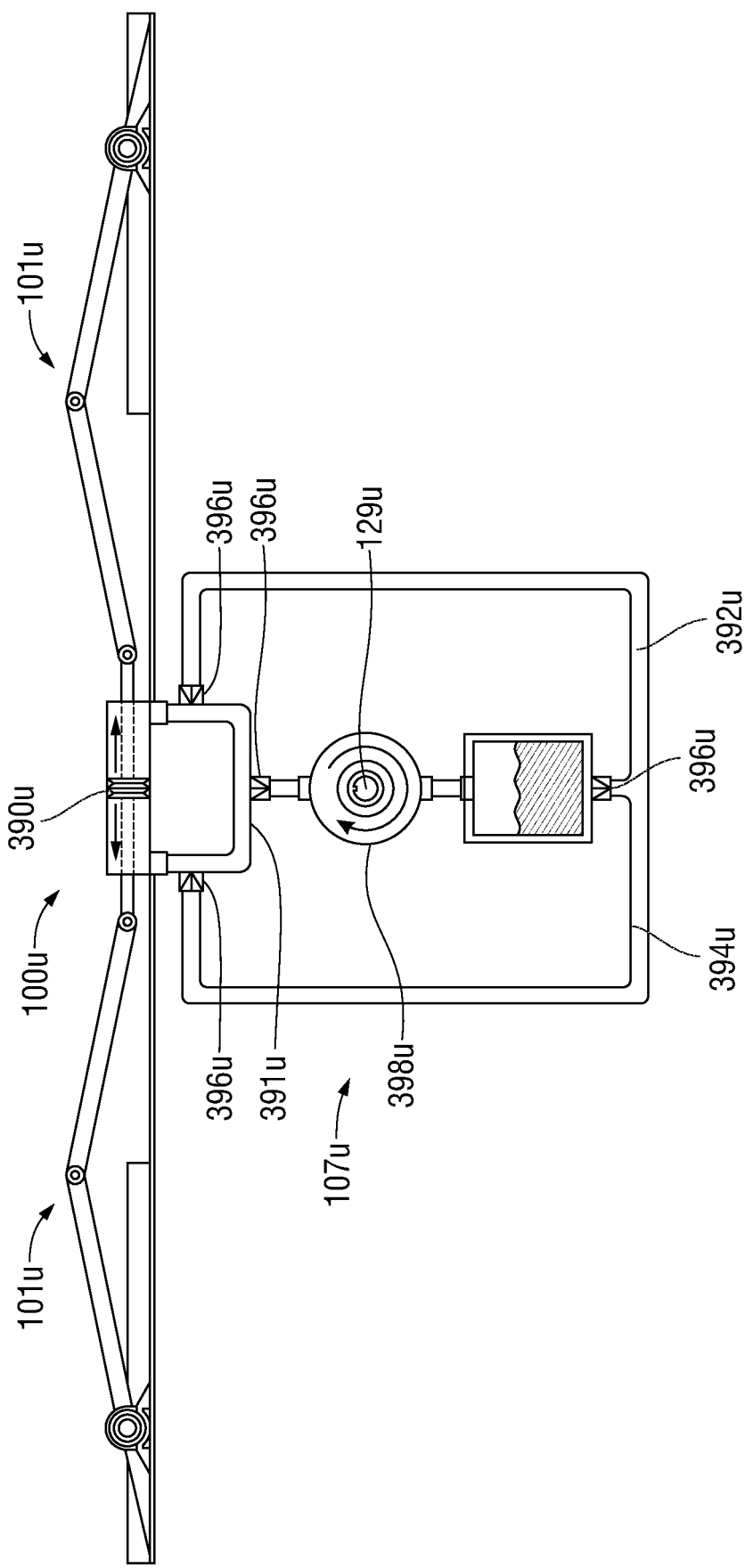

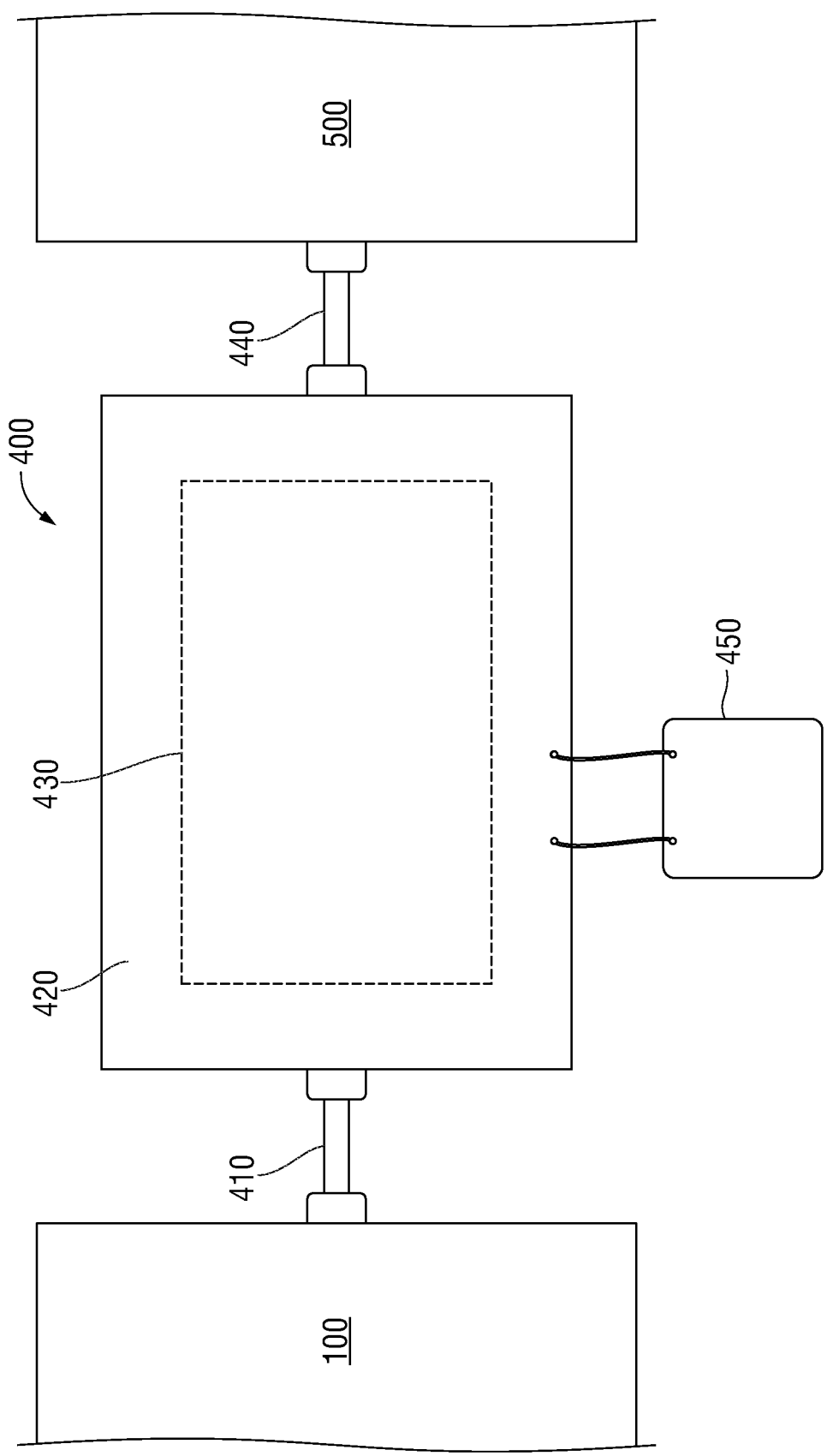

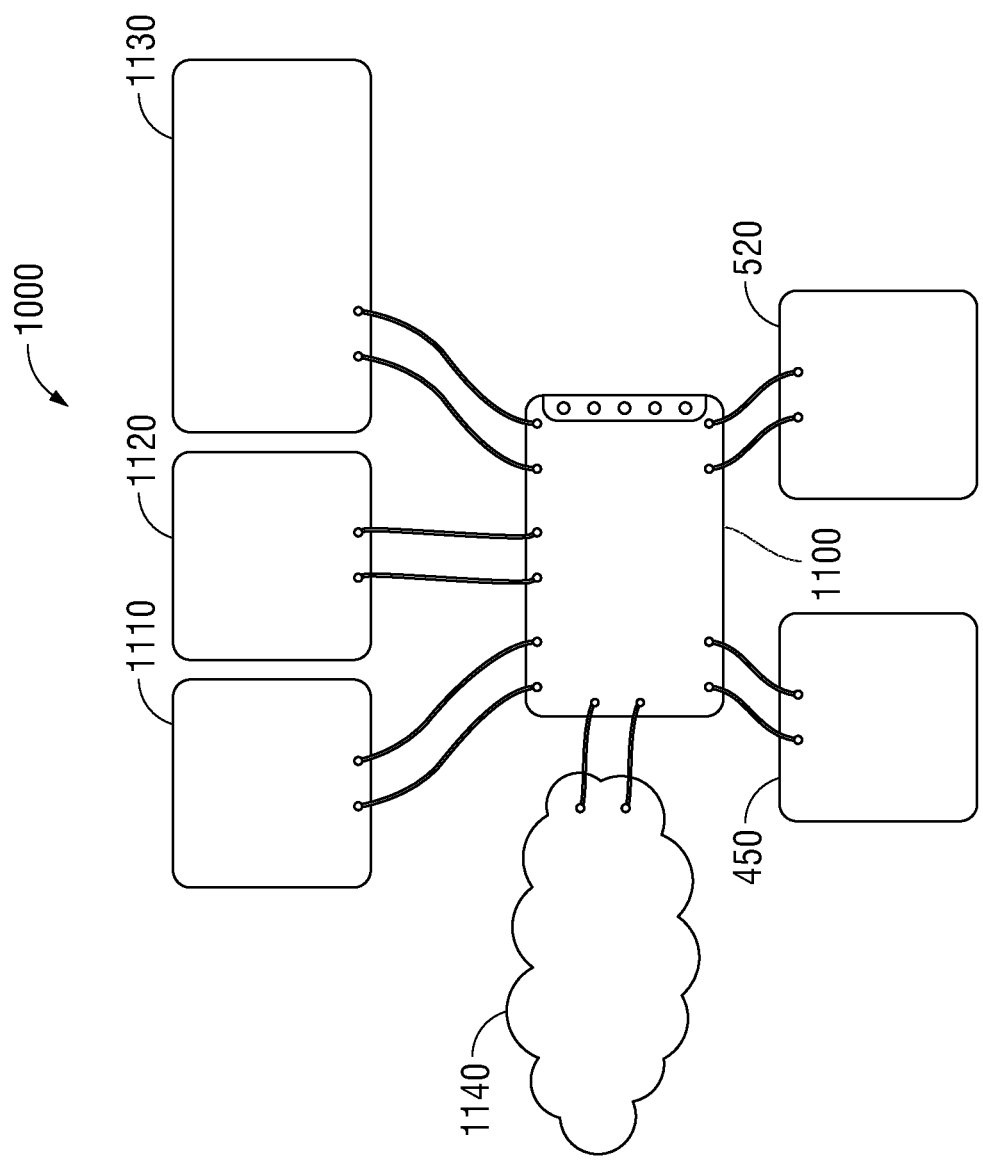
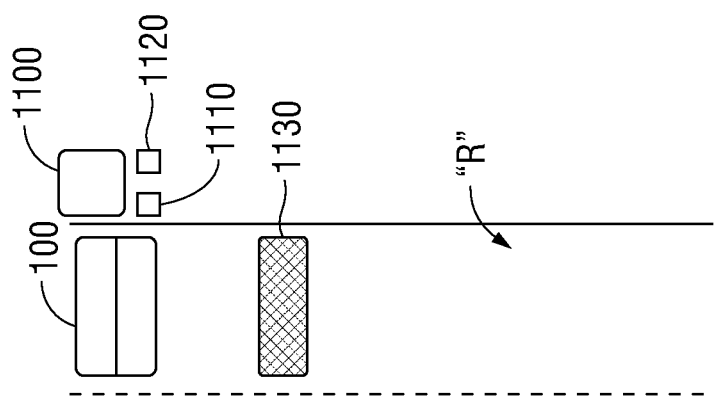
FIG. 7B
FIG. 7A

| | | Vehicle Velocity | | | | | |
|---|---|---|---|---|---|---|---|
| | | Slow (1-10 mph) | | Med (10-20 mph) | | Fast (20 +mph) | |
| | | Trans ratio | Flywheel | Trans ratio | Flywheel | Trans ratio | Flywheel |
| Light (0-1 ton) | Configuration 1 | High (1:10) | Small (10kg) | Med (1:5) | Small (10kg) | Low (1:1) | Small (10kg) |
| | | | | Configuration 2 | | Configuration 3 | |
| Standard (1-2 tons) | Configuration 4 | High (1:10) | Standard (20kg) | Med (1:5) | Standard (20kg) | Low (1:1) | Standard (20kg) |
| | | | | Configuration 5 | | Configuration 6 | |
| Heavy (2+ tons) | Configuration 7 | High (1:10) | Large (30kg) | Med (1:5) | Large (30kg) | Low (1:1) | Large (30kg) |
| | | | | Configuration 8 | | Configuration 9 | |

Vehicle Mass

FIG. 7D

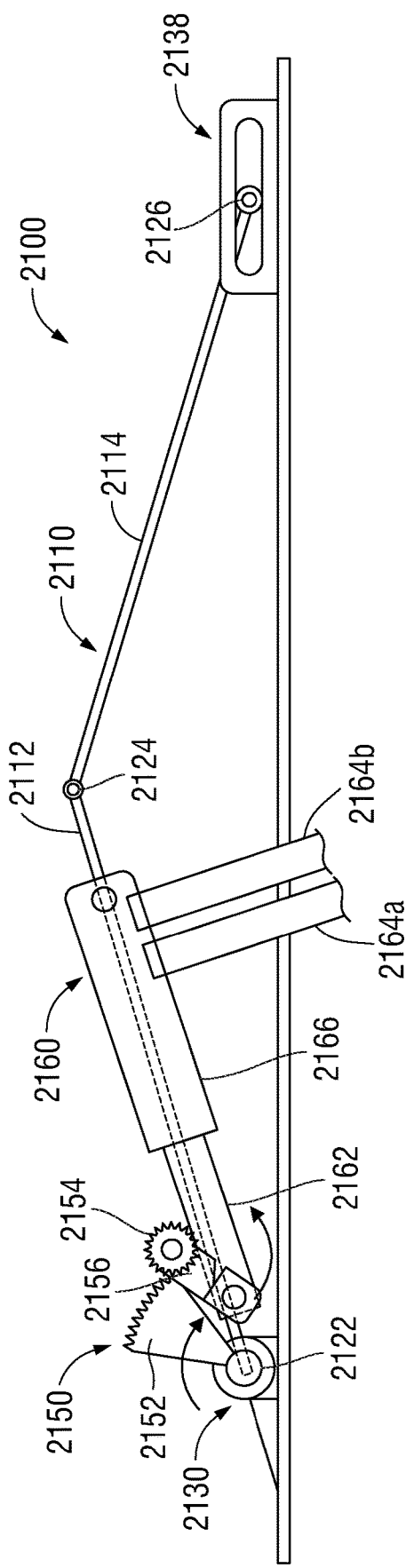
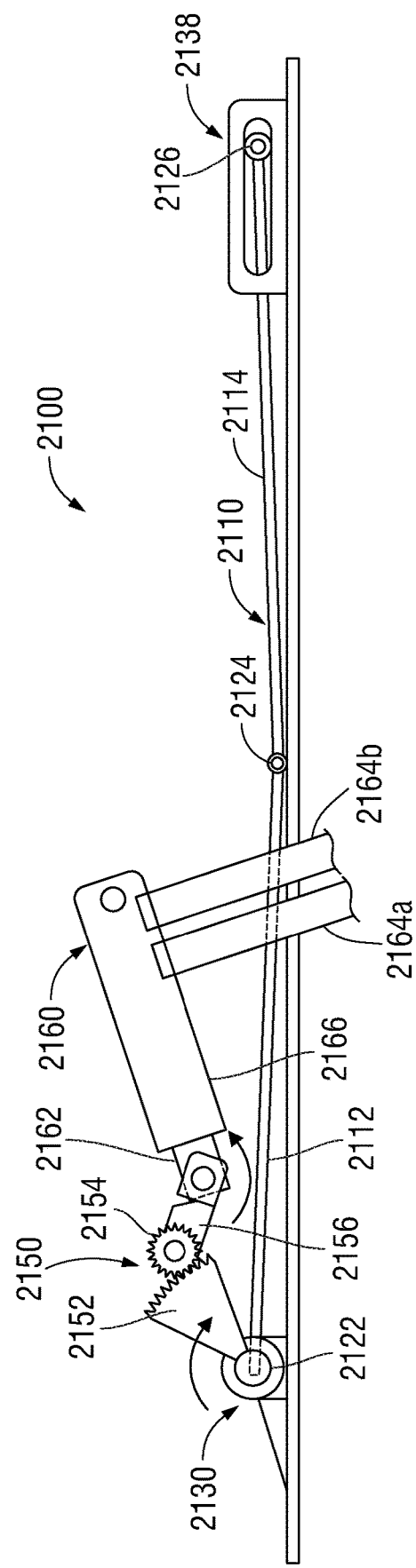
FIG. 10A
FIG. 10B

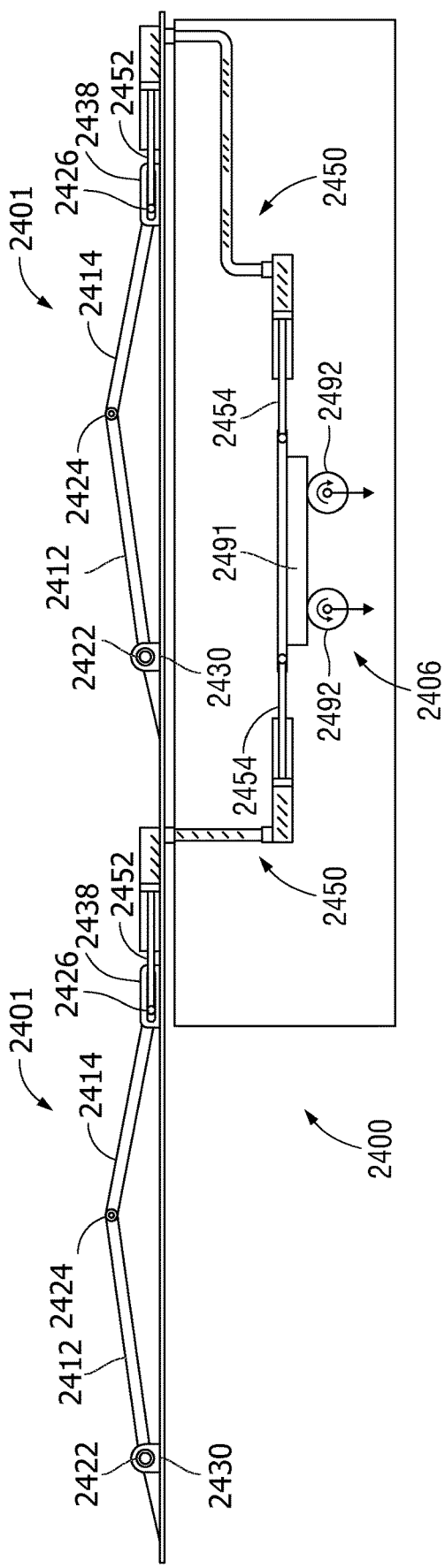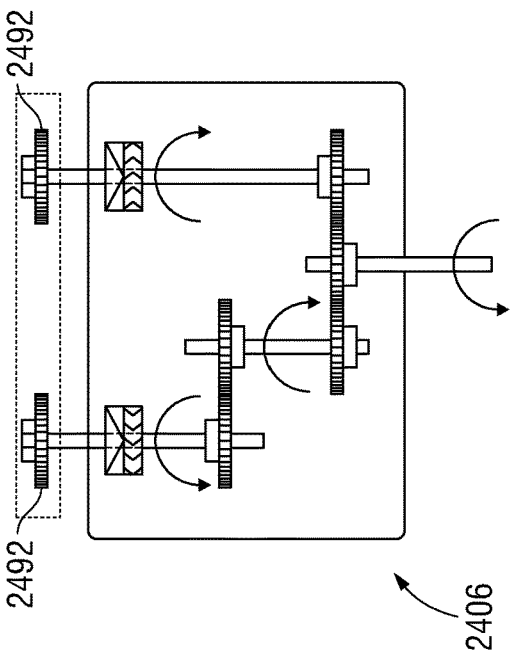
FIG. 16A
FIG. 16B

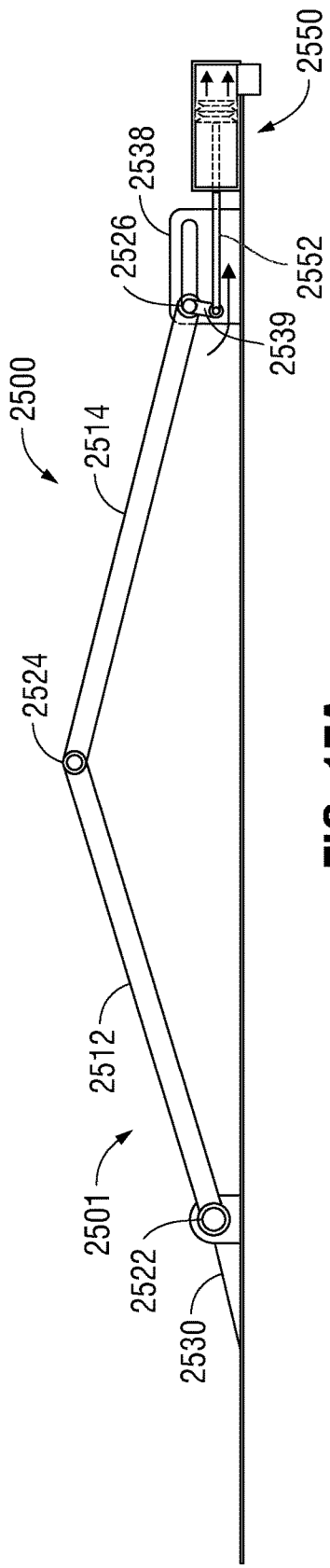
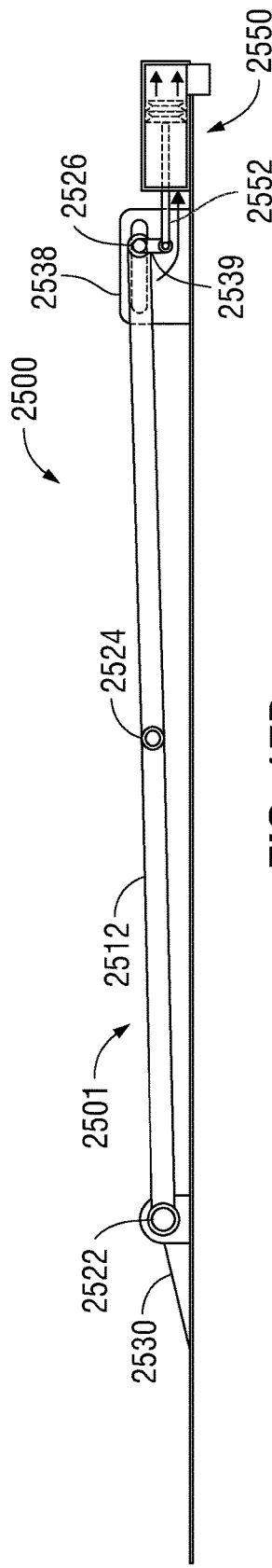
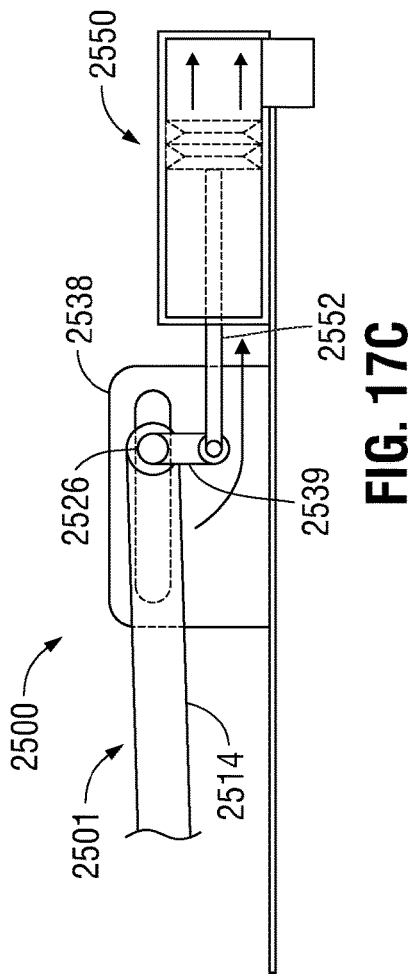
FIG. 17A
FIG. 17B
FIG. 17C

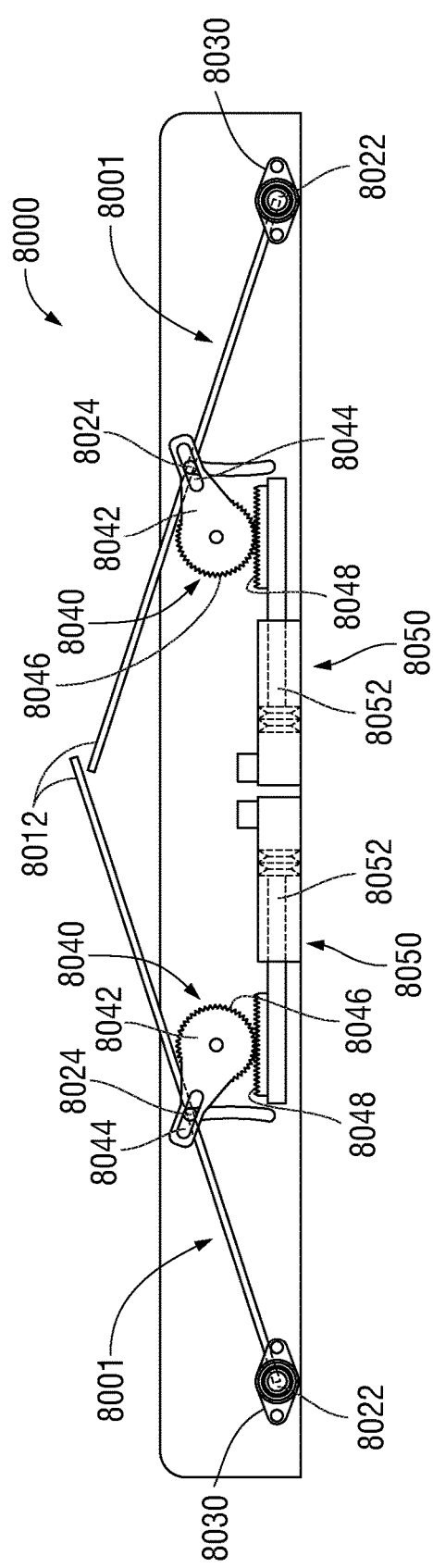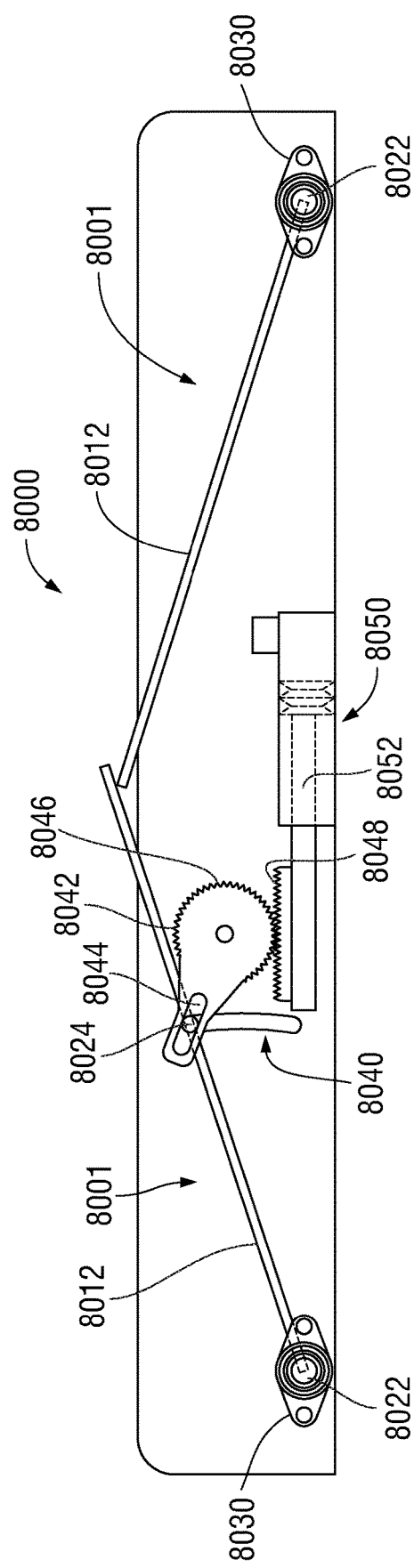

APPARATUS, SYSTEMS, AND METHODS FOR CONVERTING VEHICULAR KINETIC ENERGY INTO ELECTRICITY

CROSS-REFERENCE TO RELATED APPLICATIONS

This application is a U.S. National Stage Application filed under 35 U.S.C. § 371(a) claiming the benefit of and priority to International Patent Application No. PCT/US2020/018943, filed Feb. 20, 2020, which claims the benefit of U.S. Provisional Patent Application No. 62/807,990, filed on Feb. 20, 2019, the entire contents of which are hereby incorporated herein by reference.

BACKGROUND

1. Technical Field

The present disclosure relates generally to alternative energy and, more specifically, to apparatus, systems, and methods for converting vehicular kinetic energy into electricity.

2. Background of Related Art

Typical systems designed to convert vehicle kinetic energy into electricity require significant construction and modification to existing roadway for installation due to the fact that such systems are usually installed at least partially within the roadway itself. Roadway modification can be labor-intensive, costly, and/or interfere with the integrity of the roadway and other systems buried within the roadway, thus significantly impacting the economics of an installation meant to generate energy for sale and/or to offset energy usage.

Aside from the above-noted drawbacks of the installation itself, typical systems installed at least partially within a roadway also present challenges in use, for example: access for maintenance, inspection, and/or repair; drainage and weatherproofing; portability and removability, etc.

Further still, typical systems designed to convert vehicle kinetic energy into electricity lack or provide limited built-in safety features and redundancies and/or are incapable or limited in their ability to adapt to vehicle, traffic, environmental, and other variabilities.

SUMMARY

The present disclosure provides apparatus, systems, and methods for converting vehicular kinetic energy into electricity that advantageously enable installation on top of existing roadways without the need for excavating the roadway, complex construction and installation, and without disrupting the integrity of the roadway or other systems buried within the roadway. As such, the apparatus, systems, and methods of the present disclosure provide ease-of-access for inspection, maintenance, and repair and readily allow for removal and/or adjustment. The apparatus, systems, and methods of the present disclosure additionally or alternatively provide safety features and redundancies as well as adaptability to vehicle, traffic, environmental, and other variabilities. These and other aspects and features of the present disclosure are detailed below. To the extent consistent, any of the aspects and features detailed herein may be utilized with any or all of the other aspects and features detailed herein.

Provided in accordance with aspects of the present disclosure is a system for converting vehicular kinetic energy into electricity. The system includes at least one on-road energy collection sub-system and a transmission sub-system. The at least one on-road energy collection sub-system includes at least one flap lever configured to pivot in response to a vehicle driving over the at least one flap lever and at least one flap lever shaft coupled to the at least one flap lever such that the pivoting of the at least one flap lever drives movement of the at least one flap lever shaft. The movement includes at least one of rotational or translational motion. At least one output shaft is coupled (directly or indirectly) to the at least one flap lever shaft such that the at least one output shaft is driven to rotate to provide a unidirectional rotational output in response to the movement of the at least one flap lever shaft. The transmission sub-system configured to receive (directly or indirectly) the unidirectional rotational output from the at least one output shaft as a rotational input and to selectively modify the rotational input for transmission to a flywheel sub-system or other suitable downstream energy-generating components.

In an aspect of the present disclosure, a hydraulic assembly is coupled (directly or indirectly) between the at least one flap lever shaft and the at least one output shaft. The hydraulic assembly includes at least one hydraulic piston coupled (directly or indirectly) to the at least one flap lever shaft such that the movement of the at least one flap lever shaft drives the hydraulic piston to thereby urge pressurized fluid to flow at least partially through the hydraulic assembly. The flow of the pressurized fluid at least partially through the hydraulic assembly drives (directly or indirectly) the rotation of the at least one output shaft to provide the unidirectional rotational output.

In another aspect of the present disclosure, the movement is rotational motion and a gear assembly is coupled (directly or indirectly) between the at least one flap lever shaft and the hydraulic assembly to convert the rotational motion into translational motion to drive the hydraulic piston. The gear assembly may be configured to provide an output to input ratio of greater than 1:1. Alternatively, the movement may be rotational motion and a linkage assembly, e.g., a four-bar mechanical linkage or other suitable linkage, is coupled (directly or indirectly) between the at least one flap lever shaft and the hydraulic assembly to convert the rotational motion into translational motion to drive the hydraulic piston. The linkage assembly may be configured to provide an output to input ratio of greater than 1:1.

In still another aspect of the present disclosure, a plurality of on-road energy collection sub-systems are provided. In such aspects, a plurality of output shafts may be provided, each corresponding to one of the on-road energy collection sub-systems and each configured to provide a unidirectional rotational output to the transmission sub-system. In these aspects, a single transmission sub-system may be coupled to multiple output shafts. Alternatively, a plurality of transmission sub-systems may be provided, each coupled to one of the output shafts.

In yet another aspect of the present disclosure, and second on-road energy collection sub-systems are provided and one output shaft is coupled to both of the first and second on-road energy collection sub-systems to provide a unidirectional rotational output to the transmission sub-system.

In still yet another aspect of the present disclosure, a hydraulic assembly, a gear assembly, a linkage assembly, and/or any other suitable assembly may be coupled between the first and second on-road energy collection sub-systems. The assembly(s) is configured such that pivoting of the at least one flap lever of the first on-road energy collection sub-system results in the unidirectional rotational output to the transmission sub-system and such that such that pivoting of the at least one flap lever of the second on-road energy collection sub-system results in the unidirectional rotational output to the transmission sub-system.

In another aspect of the present disclosure, the assembly(s) is further configured to reset the first on-road energy collection sub-system in response to pivoting of the at least one flap lever of the second on-road energy collection sub-system and to reset the second on-road energy collection sub-system in response to pivoting of the at least one flap lever of the first on-road energy collection sub-system.

In another aspect of the present disclosure, first and second motors are provided to reset the first and second on-road energy collection sub-systems, respectively.

In yet another aspect of the present disclosure, the system includes a flywheel sub-system. The flywheel sub-system is coupled (directly or indirectly) to the transmission sub-assembly and is configured to receive the modified rotational input from the transmission sub-assembly and to store the modified rotational input as mechanical energy.

In an aspect of the present disclosure, the flywheel sub-system includes a plurality of flywheels. In such aspects, at least one sensor associated with the at least one on-road energy collection sub-system is configured to sense vehicle data of an approaching vehicle. A flywheel of the plurality of flywheels of the flywheel sub-system is selected for use based upon the feedback from the at least one sensor.

In still another aspect of the present disclosure, the transmission sub-system is a first transmission sub-system and the system further includes a second transmission sub-system coupled to the flywheel sub-system and configured to receive the stored mechanical energy from the flywheel sub-system.

In an aspect of the present disclosure, the second transmission sub-system is configured to modify the received mechanical energy and provide the modified mechanical energy to downstream energy-generating electronics. The second transmission sub-system may include a continuously variable transmission (CVT) or other suitable transmission.

In another aspect of the present disclosure, at least one sensor is associated with the at least one on-road energy collection sub-system and configured to sense vehicle data of an approaching vehicle. The (first) transmission sub-system is configured to selectively modify the rotational input for transmission to the flywheel sub-system based upon feedback from the at least one sensor. The at least one sensor may be configured to sense at least one of: vehicle speed or vehicle mass. Other additional or alternative sensed data includes vehicle height, class of vehicle, make of vehicle, model of vehicle, etc.

In another aspect of the present disclosure, an algorithm is utilized to determine how to modify the rotational input for transmission to the flywheel sub-system based upon feedback from the at least one sensor.

In still another aspect of the present disclosure, the algorithm is remotely updated based upon prior data from other systems for converting vehicular kinetic energy.

In yet another aspect of the present disclosure, the (first) transmission sub-system includes at least one of an electronically-controlled transmission or a mechanical clutch transmission.

In another aspect of the present disclosure, the at least one on-road energy collection sub-system further includes at least one stowaway mechanism configured to move the at least one flap lever and the at least one flap lever shaft between a use position, wherein the at least one flap lever and the at least one flap lever shaft extend across at least a portion of a roadway, and a stowed position, wherein the at least one flap lever and the at least one flap lever shaft are displaced from the roadway.

In still yet another aspect of the present disclosure, the at least one stowaway mechanism includes first and second stowaway mechanisms configured to stow first and second portions of the at least one on-road energy collection sub-system.

In an aspect of the present disclosure, the at least one on-road energy collection sub-system further includes a height adjustment mechanism configured to adjust an initial height of the at least one flap lever. In such aspects, at least one sensor associated with the at least one on-road energy collection sub-system may be provided to sense vehicle data, e.g., vehicle ground clearance, of an approaching vehicle. In such aspects, the height adjustment mechanism is configured to adjust an initial height of the at least one flap lever based upon feedback from the at least one sensor.

In another aspect of the present disclosure, the least one flap lever includes first and second flap levers configured to pivot in response to a vehicle driving over at least one of the first or second flap levers.

In another aspect of the present disclosure, the at least one flap lever shaft is positioned at an end of the at least one flap lever. Alternatively, the at least one flap lever shaft is disposed at an intermediate position along the at least one flap lever.

BRIEF DESCRIPTION OF THE DRAWINGS

Various aspects and features of the present disclosure are described hereinbelow with reference to the drawings wherein like numerals designate identical or corresponding elements in each of the several views.

FIGS. 2A-1 and 2A-2 are perspective and side views, respectively, of an on-road energy collection sub-system configured for use with the system of FIG. 1 or any other suitable system in accordance with the present disclosure;

FIGS. 2B-1 and 2B-2 are perspective and side views, respectively, of another on-road energy collection sub-system configured for use with the system of FIG. 1 or any other suitable system in accordance with the present disclosure;

FIGS. 2C-1 and 2C-2 are perspective and side views, respectively, of another on-road energy collection sub-system configured for use with the system of FIG. 1 or any other suitable system in accordance with the present disclosure;

FIGS. 2D-1 and 2D-2 are perspective and side views, respectively, of still another on-road energy collection sub-system configured for use with the system of FIG. 1 or any other suitable system in accordance with the present disclosure;

FIGS. 2E-1 and 2E-2 are perspective and side views, respectively, of yet another on-road energy collection sub-system configured for use with the system of FIG. 1 or any other suitable system in accordance with the present disclosure;

FIG. 2F-1 is a side view of still yet another on-road energy collection sub-system configured for use with the system of FIG. 1 or any other suitable system in accordance with the present disclosure;

FIGS. 2F-2 and 2F-3 are enlarged views of portions of the on-road energy collection sub-system of FIG. 2F-1;

FIGS. 2G-1 and 2G-2 are perspective and side views, respectively, of another on-road energy collection sub-system configured for use with the system of FIG. 1 or any other suitable system in accordance with the present disclosure;

FIG. 2G-3 is an enlarged view of a portion of the on-road energy collection sub-system of FIGS. 2G-1 and 2G-2;

FIGS. 2H-1 and 2H-2 are top and side views, respectively, of still yet another on-road energy collection sub-system configured for use with the system of FIG. 1 or any other suitable system in accordance with the present disclosure;

FIG. 2H-3 is an enlarged view of a portion of the on-road energy collection sub-system of FIGS. 2H-1 and 2H-2;

FIGS. 2I-1 and 2I-2 are perspective and side views, respectively, of yet another on-road energy collection sub-system configured for use with the system of FIG. 1 or any other suitable system in accordance with the present disclosure;

FIG. 2I-3 is an enlarged, cross-sectional view of a portion of the on-road energy collection sub-system of FIGS. 2I-1 and 2I-2;

FIG. 2J is a side, partial cross-sectional view of still another on-road energy collection sub-system configured for use with the system of FIG. 1 or any other suitable system in accordance with the present disclosure;

FIG. 2K is a side, partial cross-sectional view of still yet another on-road energy collection sub-system configured for use with the system of FIG. 1 or any other suitable system in accordance with the present disclosure;

FIGS. 2P-1 and 2P-2 are side views, in various states of use, of another on-road energy collection sub-system configured for use with the system of FIG. 1 or any other suitable system in accordance with the present disclosure;

FIGS. 2R-1 and 2R-2 are side views, in various states of use, of another on-road energy collection sub-system configured for use with the system of FIG. 1 or any other suitable system in accordance with the present disclosure;

FIGS. 2S-1 and 2S-2 are side views, in various states of use, of another on-road energy collection sub-system configured for use with the system of FIG. 1 or any other suitable system in accordance with the present disclosure;

FIG. 2T-1 is a side view of still another on-road energy collection sub-system configured for use with the system of FIG. 1 or any other suitable system in accordance with the present disclosure shown in respective first and second positions;

FIG. 2T-2 is a top view of the gearing portion of the sub-system of FIG. 2T-1;

FIG. 2T-3 is a side view of still another on-road energy collection sub-system configured for use with the system of FIG. 1 or any other suitable system in accordance with the present disclosure;

FIG. 2T-4 is a top view of the gearing portion of the sub-system of FIG. 2T-3;

FIG. 2U-1 is a side view of yet another on-road energy collection sub-system configured for use with the system of FIG. 1 or any other suitable system in accordance with the present disclosure;

FIG. 2U-2 is a side view of another hydraulic assembly configured for use with the on-road energy collection sub-system of FIG. 2U-1;

FIG. 3 is a schematic illustration of a transmission sub-system configured for use with the system of FIG. 1 or any other suitable system in accordance with the present disclosure;

FIG. 4 is a schematic illustration of a flywheel activator sub-system configured for use with the system of FIG. 1 or any other suitable system in accordance with the present disclosure;

FIG. 7A is a top view of a roadway including the system of FIG. 1 disposed thereon, including a traffic analysis electronics sub-system in accordance with the present disclosure;

FIG. 7B is a schematic illustration of the traffic analysis electronics sub-system of FIG. 7A;

FIG. 7D is a look-up table matrix configured for use by the traffic analysis electronics sub-system of FIG. 7A in accordance with the present disclosure;

FIGS. 10A and 10B are side views, in various states of use, of another on-road energy collection sub-system configured for use with the system of FIG. 1 or any other suitable system in accordance with the present disclosure;

FIG. 16A is a side view of still another on-road energy collection sub-system configured for use with the system of FIG. 1 or any other suitable system in accordance with the present disclosure;

FIG. 16B is a side view of the gearing portion of the sub-system of FIG. 16A;

FIGS. 17A and 17B are side views, in various states during use, of still yet another on-road energy collection sub-system configured for use with the system of FIG. 1 or any other suitable system in accordance with the present disclosure;

FIG. 17C is an enlarged, side view of a portion of the on-road energy collection sub-system of FIGS. 17A and 17B;

FIG. 24 is a side view of still another on-road energy collection sub-system configured for use with the system of FIG. 1 or any other suitable system in accordance with the present disclosure; and FIG. 25 is a side view of another configuration of the on-road energy collection sub-system of FIG. 24.

DETAILED DESCRIPTION

Figure 1:
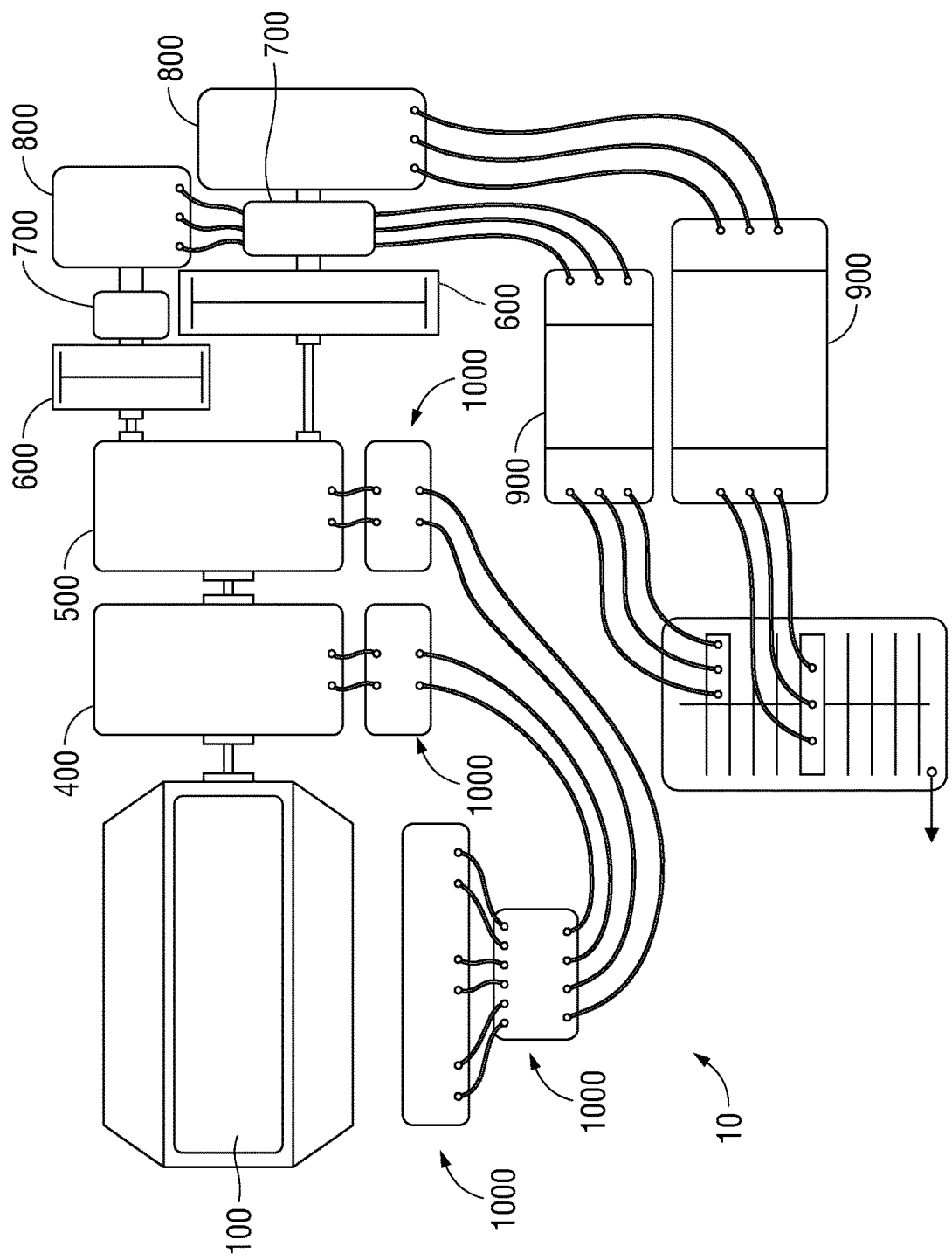
FIG. 1 is a schematic illustration of a system provided in accordance with the present disclosure for converting vehicular kinetic energy into electricity.

Referring to FIG. 1, the present disclosure provides a system 10 for converting vehicular kinetic energy into electricity. System 10 includes a plurality of sub-systems: an on-road energy collection sub-system 100; a first transmission sub-system 400, e.g., a gearbox/continuously variable transmission (CVT)/electronically-controlled transmission/ etc.; a flywheel activator sub-system 500; one or more flywheel assembly sub-systems 600 (sub-systems 500, 600 may collectively or individually be referred to herein as simply "flywheel assembly or "flywheel sub-system"); one or more second transmission sub-systems, e.g., a gearbox/ continuously variable transmission (CVT)/electronically-controlled transmission/etc. sub-system 700; one or more energy generator sub-systems 800; one or more power electronics sub-systems 900; and a traffic analysis electronics sub-system 1000. In the illustrated embodiment of system 10, energy collection sub-system 100 is coupled to the first transmission sub-system 400, which is coupled to flywheel activator sub-system 500, which is coupled to flywheel assembly sub-system(s) 600, which is coupled to gearbox/CVT sub-system(s) 700, which is coupled to energy generator sub-system(s) 800, which is coupled to power electronics sub-system(s) 900. Traffic analysis electronics sub-system 1000 is coupled to either or both transmission sub-system 400 and flywheel activator sub-system 500.

However, in other embodiments of system 10, one or more of the above-detailed sub-systems may be omitted and/or rearranged. For example, in embodiments, gearbox/ CVT sub-system 700 is omitted and flywheel assembly sub-system 600 is coupled to energy generator sub-system 800. In additional or alternative embodiments, flywheel activator sub-system 500 is omitted and transmission sub-system 400 is coupled to flywheel assembly sub-system 600. In additional or alternative embodiments, traffic analysis electronics sub-system 1000 is omitted. In additional or alternative embodiments, first transmission sub-system 400 is omitted and energy collection sub-system 100 is coupled to flywheel activator sub-system 500 (if provided) or flywheel assembly sub-system 600 (if flywheel activator sub-system 500 is not provided). Further still, in embodiments, a single transmission sub-system functions as both of the first and second transmission sub-systems 400, 700, e.g., wherein the single transmission sub-system is coupled both before and after the flywheel sub-system, similar to a kinetic energy recovery system (KERS), as known in the art.

Various embodiments of the on-road energy collector sub-system 100 configured for use with system 10 or any other suitable system (such as those detailed herein) are detailed below. However, although detailed as on-road, it is contemplated that some or all of the sub-systems detailed below may also be configured for in-road or partial-in-road configurations. Similar components or features among multiple embodiments are not repeatedly described in detailed for purposes of brevity. Further, although particular embodiments are detailed below, it is understood that, to the extent consistent, the various components and features of any of these embodiments may be utilized in any suitable combination and are not limited to the particular embodiments shown and described.

Figures 1, 2A:
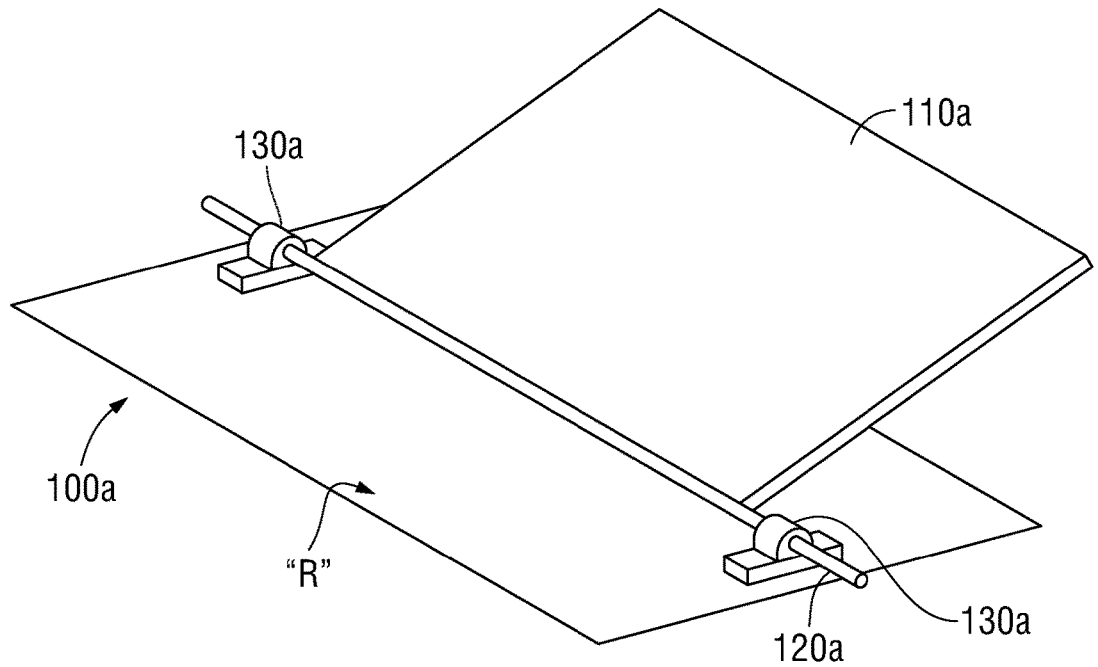
Figures 2, 2A:
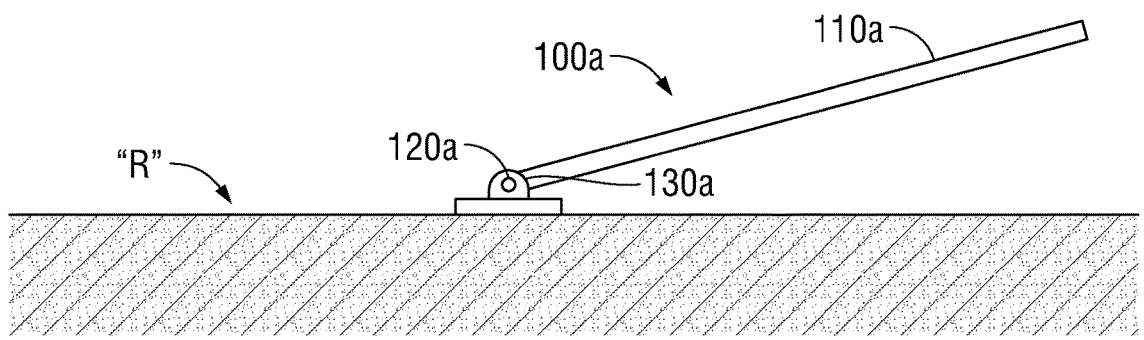

Referring to FIGS. 2A-1 and 2A-2, one embodiment of an on-road energy collection sub-system configured for use with system 10 (FIG. 1) or any other suitable system (such as those detailed herein) is illustrated generally identified by reference numeral 100a. Sub-system 100a includes a flap lever 110a, a shaft 120a, and a pair of mounted bearings 130a. Flap lever 110a is coupled to shaft 120a such that movement of flap lever 110a, e.g., pivoting thereof about the longitudinal axis defied through shaft 120a, rotates shaft 120a about its longitudinal axis. Flap lever 110a defines a generally planar, plate-like configuration, although other configurations are also contemplated. Opposing end portions of shaft 120a are rotatably supported by mounted bearings 130a. Mounted bearings 130a may be mounted in various positions such as in pillow block or mounted configurations. Shaft 120a is ultimately coupled to the transmission sub-system (detailed below; not shown in FIG. 2A-1 or 2A-2) to impart the rotational motion thereof to the transmission sub-system. All components of sub-system 100a, e.g., flap lever 110a, shaft 120a, and mounted bearings 130a, are configured for positioning atop a roadway "R" with, in embodiments, mounted bearings 130a resting on or mounted thereto.

Flap lever 110a is initially disposed in an elevated or spaced-apart position from the roadway "R" and may be moved into approximation therewith upon a vehicle driving over flap lever 110a. Flap lever 110a is biased towards the initial position such that flap lever 110a returns to the initial position after a vehicle clears sub-system 100a.

In use, as a vehicle drives over sub-system 100a and, more specifically, flap lever 110a thereof, flap lever 110a is moved, e.g., pivoted, by the moving vehicle, thereby rotating shaft 120a. This rotational kinetic energy of shaft 120a is imparted to the transmission sub-system to ultimately enable the conversion thereof into electrical energy, as detailed below. The term "shaft" or "flap lever shaft" as utilized herein need not be a continuous structure extending the width of the flap lever but may also include split shafts, shaft segments, and other generally cylindrical structures or sets of structures configured to provide rotational and/or translational output. Further, the "shaft" or "flap lever shaft" need not be disposed at an end of the flap lever or directly coupled to the flap lever.

Figures 1, 2B:
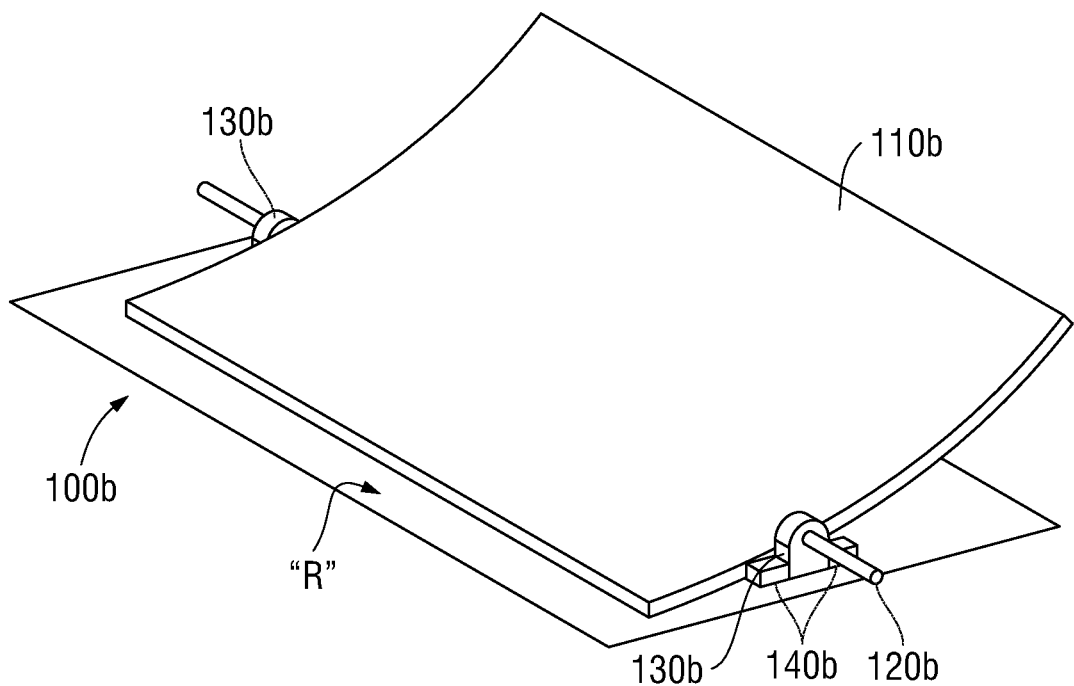
Figures 2, 2B:
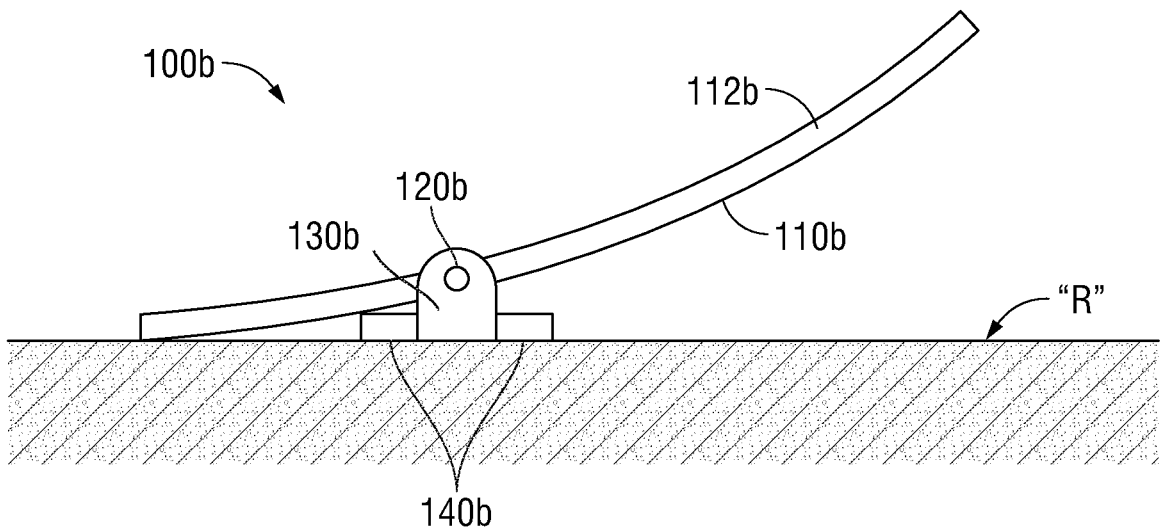

With reference to FIGS. 2B-1 and 2B-2, another embodiment of an on-road energy collection sub-system, sub-system 100b, configured for use with system 10 (FIG. 1) or any other suitable system (such as those detailed herein) is similar to sub-system 100a (FIGS. 2A-1 and 2A-2) except as detailed below. Sub-system 100b includes a curved flap lever 110b defining a concave vehicle-contacting surface 112b, a shaft 120b, a pair of mounted bearings 130b, and bearing feet 140b. The concavity of vehicle-contacting surface 112b of flap lever 110b may approximate that of a particular, median, or average vehicle tire radius, thus enabling a low impact and smooth transition of a moving vehicle from the roadway "R" to curved flap lever 110b.

Each mounted bearing 130b of sub-system 100b is mounted to a bearing foot 140b which makes contact with the roadway "R" or ground surface. Bearing feet 140b may rest on the roadway "R" or ground surface or may be fastened (temporarily or permanently) to the roadway "R" or ground surface, e.g., in any suitable manner such as how speed breakers, traffic monitoring equipment are fastened. Alternatively, bearing feet 140b may be disposed in any other suitable manner.

Figures 1, 2C:
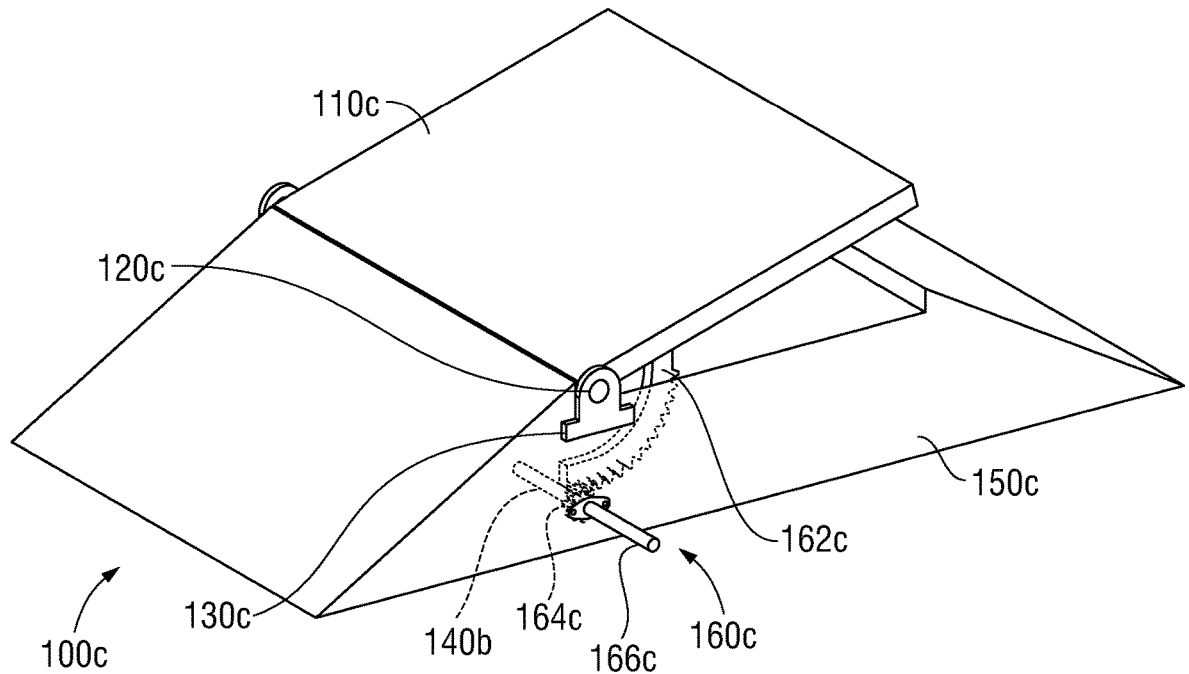
Figures 2, 2C:
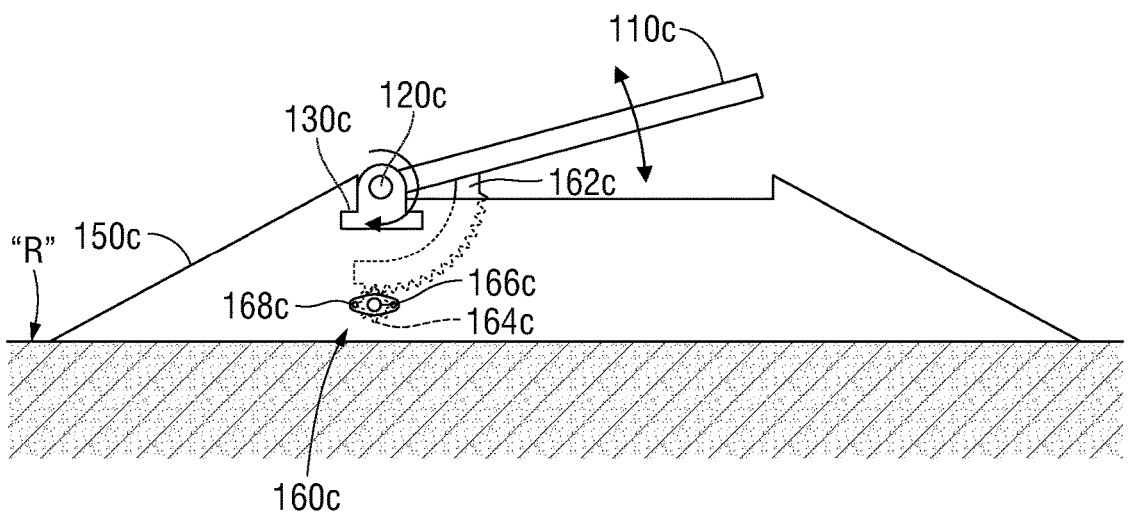

As illustrated in FIGS. 2C-1 and 2C-2, sub-system 100c is another embodiment of an on-road energy collection sub-system configured for use with system 10 (FIG. 1) or any other suitable system (such as those detailed herein) and includes a flap lever 110c, a flap lever shaft 120c, mounted bearings 130c, a ramp structure 150c, and a gear assembly 160c including a curved rack gear 162c, a pinion gear 164c, a gear output shaft 166c, and shaft support bearings 168c.

Mounted bearings 130c are coupled, e.g., fastened, to ramp structure 150c, which is made of high strength steel, alloy, durable composite material, or other suitable material(s) and is hollow or solid. Ramp structure 150c includes a slanted up-ramp portion, a tabletop portion, and a slanted down ramp portion. Flap lever 110c is disposed on and defines at least a portion of the vehicle-contacting surface of the tabletop portion of ramp structure 150c. Flap lever 110c may initially be disposed in (and biased towards) an elevated or spaced-apart position from the tabletop portion of ramp structure 150c and may be moved into approximation therewith upon a vehicle driving over flap lever 110c. Ramp structure 150c is seated atop or mounted atop the roadway "R."

Gear assembly 160c includes curved rack gear 162c which is coupled, e.g., fastened, to flap lever 110c, and pinion gear 164c, which is disposed in meshed engagement with curved rack gear 162c. Pinion gear 164c, in turn, is coupled to, e.g., engaged about, gear output shaft 166c which, is supported by shaft support bearings 168c fastened or otherwise coupled to ramp structure 150c. Gear output shaft 166c is ultimately coupled to the transmission sub-system (detailed below; not shown in FIG. 2C-1 or 2C-2) to impart the rotational motion thereof to the transmission sub-system.

In use, a vehicle drives up the slanted up-ramp portion of ramp structure 150c and onto flap lever 110c at the tabletop portion of ramp structure 150c, thereby pivoting flap lever 110c which, in turn, rotates flap lever shaft 120c. Rotation of flap lever shaft 120c rotates curved rack gear 162c which, in turn, rotates pinion gear 164c. Rotation of pinion gear 164c rotates gear output shaft 166c. This rotational kinetic energy of gear output shaft 166c is imparted to the transmission sub-system to ultimately enable the conversion thereof into electrical energy, as detailed below.

Suitable gear amplification or attenuation may be utilized to achieve a desired rotation of gear output shaft 166c based upon a rotational input from flap lever shaft 120c. Further, the configuration of ramp structure 150c of sub-system 100c and, more specifically, the up-ramp section thereof loads the vehicle suspension prior to the vehicle engaging flap lever 110c. Because the vehicle suspension has been loaded, most of the vehicle weight can be utilized at flap lever 110c, thus allowing more kinetic energy to be transmitted to flap lever 110c.

Figures 1, 2D:
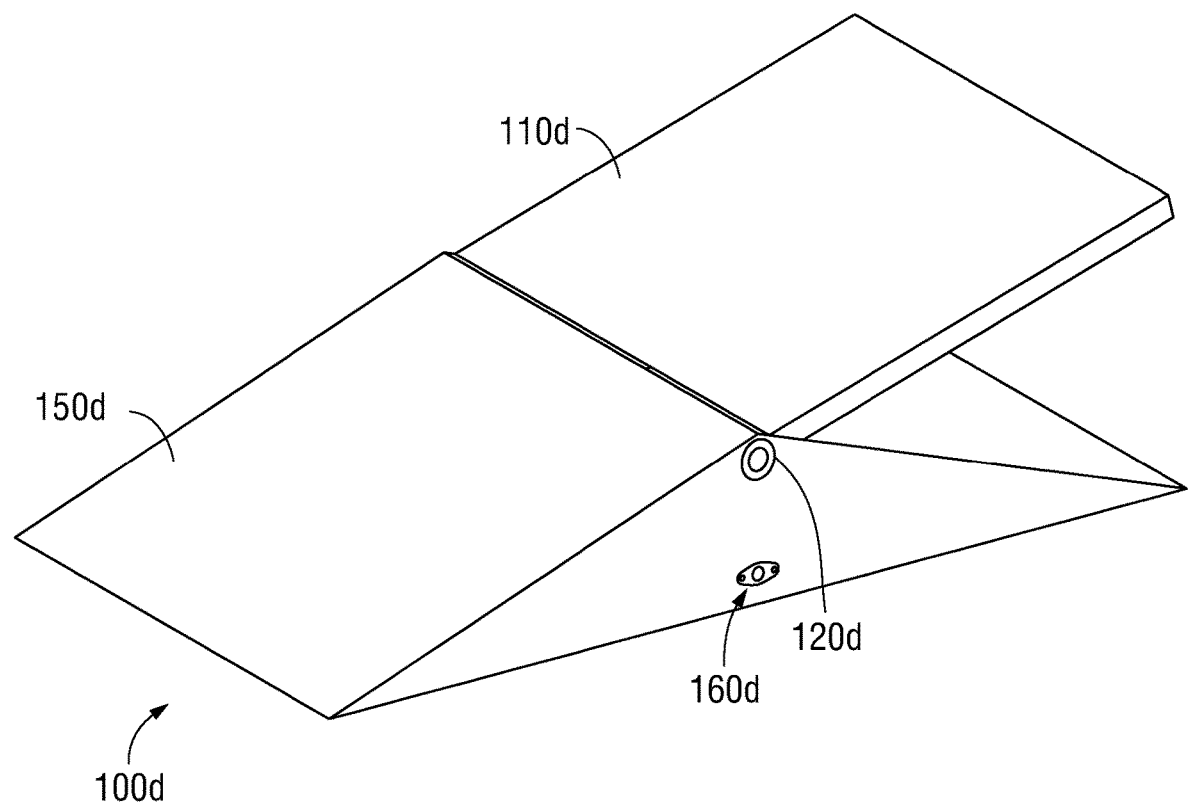
Figures 2, 2D:
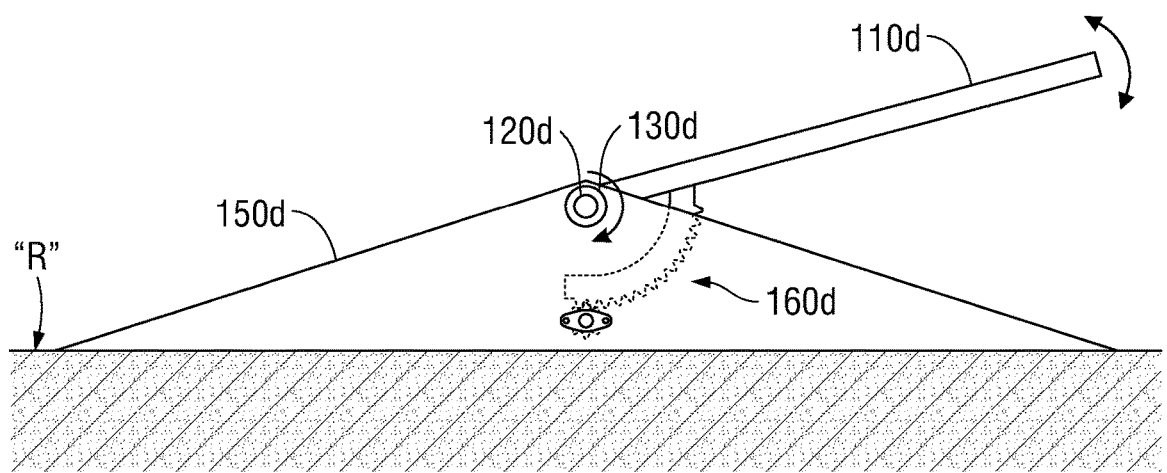

Referring to FIGS. 2D-1 and 2D-2, another embodiment of an on-road energy collection sub-system configured for use with system 10 (FIG. 1) or any other suitable system (such as those detailed herein) is illustrated generally identified by reference numeral 100d. Sub-system 100d includes a flap lever 110d, a flap lever shaft 120d, mounted bearings 130d, a ramp structure 150d, a gear assembly 160d. Gear assembly 160d is similar to gear assembly 160c (FIGS. 2C-1 and 2C-2).

Ramp structure 150d includes a slanted up-ramp portion and slanted down-ramp portion and is seated atop or mounted atop the roadway "R." Flap lever 110d is disposed on and defines at least a portion of the vehicle-contacting surface of the down-ramp portion of ramp structure 150d. Flap lever 110d may initially be disposed in (and biased towards) an elevated or spaced-apart position from the down-ramp portion of ramp structure 150d and may be moved into approximation therewith upon a vehicle driving over flap lever 110d.

Operation of sub-system 100d is similar to that of sub-system 100c (FIGS. 2C-1 and 2C-2), wherein, in response to a vehicle driving over flap lever 110d, a rotational output from gear assembly 160d is provided to the transmission sub-system. In embodiments, the rotation of flap lever shaft 120d is also output to the same or a different transmission sub-system. Sub-system 100d, similar to sub-system 100c (FIGS. 2C-1 and 2C-2), is configured such that ramp structure 150d loads the suspension of a vehicle driving over sub-system 100d prior to engaging flap lever 110d. Further, after clearing the peak-point of ramp structure 150d, a vehicle is influenced by gravity, thus allowing this potential energy to be transferred to flap lever 110d as the vehicle drives down the down-ramp portion to the roadway "R" or ground.

Figures 1, 2E:
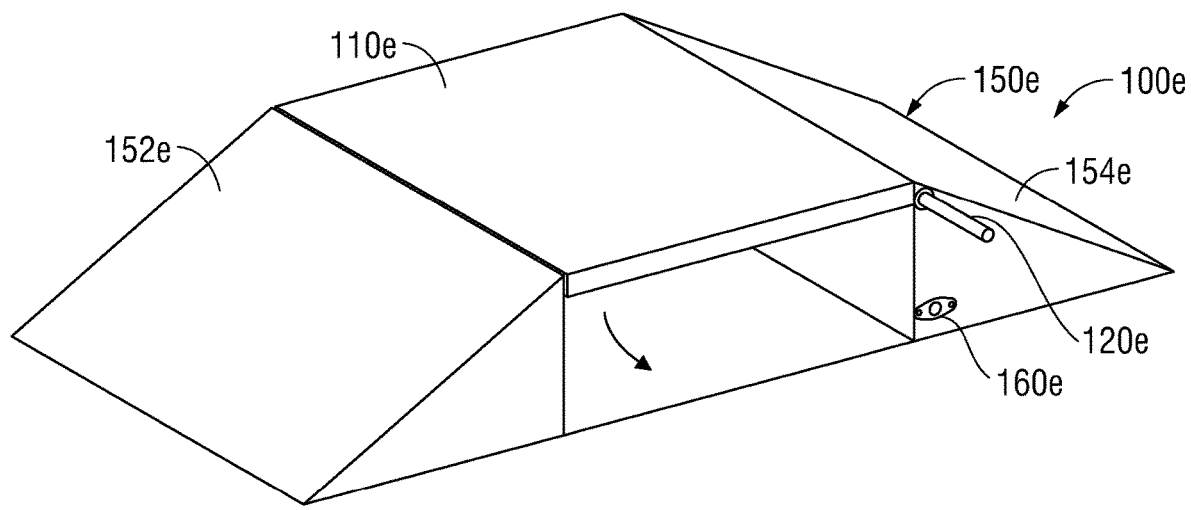
Figures 2, 2E:
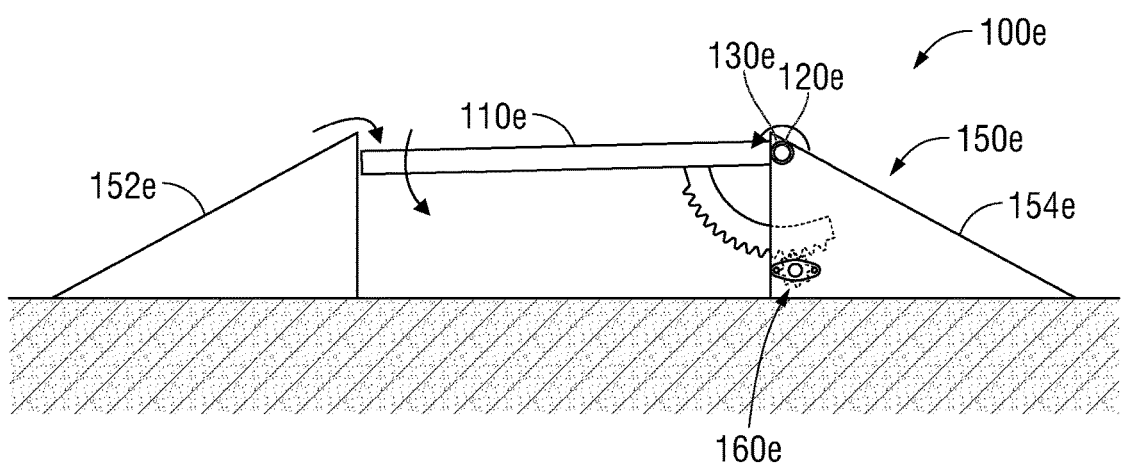

With reference to FIGS. 2E-1 and 2E-2, another embodiment of an on-road energy collection sub-system, subsystem 100e, configured for use with system 10 (FIG. 1) or any other suitable system (such as those detailed herein) includes a flap lever 110e, flap lever shaft 120e, shaft support bearings 130e, a pair of ramp structures 150e, and gear assembly 160e. Ramp structures 150e include an up-ramp structure 152e and a down-ramp structure 154e spaced-apart from one another and seated atop or mounted atop the roadway "R." Flap lever 110e is pivotably coupled with down-ramp structure 154e via flap lever shaft 120e and extends from down-ramp structure 154e to up-ramp structure 152e thus defining a tabletop of ramp structures 150e in an initial position. Gear assembly 160e is operably coupled to down-ramp structure 154e.

In use, a vehicle drives up up-ramp structure 152e and onto flap lever 110e, pivoting flap lever 110e downwardly from its initial, biased position to a deflected position between ramp structures 150e. This pivoting motion of flap lever 110e generates rotational mechanical energy that it output by gear assembly 160e to the transmission sub-system. Sub-system 100e provides a configuration wherein flap lever 110e is inversely positioned and movable compared to previous embodiments. This configuration allows the vehicle driving over sub-system 100e to engage flap lever 110e at a full-length distance from flap lever shaft 120e, thus imparting maximum torque on flap lever shaft 120e. Further, once the front tires of the vehicle clear flap lever 110e, the process is repeated with the rear tires.

As illustrated in FIGS. 2F-1 through 2F-3, sub-system 100f is another embodiment of an on-road energy collection sub-system configured for use with system 10 (FIG. 1) or any other suitable system (such as those detailed herein) and includes ramp structures 150f having an up-ramp structure 152f and a down-ramp structure 154f spaced-apart from one another and seated atop or mounted atop the roadway "R." A plurality of flap levers 110f and associated flap lever shafts 120f, shaft supports 130f, and gear assemblies 160f are serially disposed between up and down-ramp structures 152f, 154f. That is, rather than a single flap lever, flap lever shaft, shaft support, and gear assembly as in sub-system 100e (FIGS. 2E-1 and 2E-2), sub-system 100f includes a plurality.

In use, a vehicle drives onto up-ramp structure 152f and then onto the first flap lever 110f, pivoting the first flap lever 110f downwardly. As the vehicle continues, the other flap levers 110f are serially pivoted downwardly until the vehicle reaches and descends down-ramp structure 154f. The gear assembly 160f associated with each flap lever 110f provides its own rotational mechanical energy that it output to the transmission sub-system (or multiple transmission sub-assemblies). By providing multiple flap levers 110f and their associated components, the length of sub-system 100f may be greatly extended without limitation simply by adding additional flap levers 110f and associated components.

Referring to FIGS. 2G-1 through 2G-3, another embodiment of an on-road energy collection sub-system configured for use with system 10 (FIG. 1) or any other suitable system (such as those detailed herein) is illustrated generally identified by reference numeral 100g. Sub-system 100g includes a base plate 102g having operably coupled thereon or thereto a flap lever 110g, a flap lever shaft 120g, flap lever mounted bearings 130g, an on-ramp structure 150g, and a leverage slider assembly 170g including a slider pin 172g, supports 174g each defining a slider slot 176g, leverage support bearings 178g pivotably supporting supports 174g, and at least one output shaft 180g.

Base plate 102g is configured to sit atop a roadway "R" and may include gripping structures (not explicitly shown), e.g., rubber grippers, configured to retain base place 102g in position on the roadway "R" without the need for invasive or disruptive structures. On-ramp structure 150g is positioned adjacent the first end of flap lever 110g on base plate 102g to define a smooth transition from the roadway "R" to base plate 102g and flap lever 110g.

A first end of flap lever 110g is coupled to flap lever shaft 120g, which is rotatably supported by flap lever mounted bearings 130g. The second, opposite end of flap lever 110g is coupled to slider pin 172g, which is received within opposite slider slots 176g defined within the opposed supports 174g. A transverse plate 182g, in embodiments, interconnects supports 174g and may be integrally formed therewith or otherwise engaged thereto. Leverage support bearings 178g pivotably support supports 174g atop base plate 102g via at least one output shaft 180g that is configured to output rotational mechanical energy to the transmission sub-system.

In use, a vehicle drives up on-ramp structure 150g and onto flap lever 110g, thereby pivoting flap lever 110g from its initial, biased position, about flap lever shaft 120g. The pivoting of flap lever 110g about flap lever shaft 120g drives the second end of flap lever 110g forward relative to leverage slider assembly 170g, e.g., as flap lever 110g approaches a more-parallel orientation relative to base plate 102g. As a result, slider pin 172g is moved through the slider slots 176g and supports 174g are urged to rotate about leverage support bearings 178g, thereby generation rotational mechanical energy at output shaft 180g.

In embodiments, flap lever 110g exhibits spring-like properties that allow resilient flexion thereof to absorb vehicle impact force and to load the vehicle's suspension, thus enabling more energy transfer. Coupling flap lever 110g at both the ends thereof also allows a more gradual initial ascent for the vehicle traveling therealong, thus helping to reduce and regulate the torque curve applied at output shaft 180g.

With reference to FIGS. 2H-1 through 2H-3, another embodiment of an on-road energy collection sub-system, sub-system 100h, configured for use with system 10 (FIG. 1) or any other suitable system (such as those detailed herein) includes a base plate 102h having operably coupled thereon or thereto a flap lever 110h, a flap lever shaft 120h, flap lever mounted bearings 130h, ramp structures 150h including an on-ramp structure 152h and an off-ramp structure 154h, and a leverage slider assembly 170h. Leverage slider assembly 170h is similar to leverage slider assembly 170g (FIGS. 2G-1 through 2G-3) except that rather than pivoting from its initial, biased position in a clockwise direction in response to a vehicle driving onto the flap lever (as with leverage slider assembly 170g (FIGS. 2G-1 through 2G-3)), leverage slider assembly 170h is configured to pivot from its initial, biased position in a counter-clockwise direction in response to a vehicle driving onto flap lever 110h.

As illustrated in FIGS. 2I-1 through 2I-3, sub-system 100i is another embodiment of an on-road energy collection sub-system configured for use with system 10 (FIG. 1) or any other suitable system (such as those detailed herein) and includes a base plate 102i; first and second flap levers 112i, 114i; first, second, and third flap lever shafts 122i, 124i, 126i; flap lever mounted bearings 130i; and a rack and pinion mechanism 190i. Rack and pinion mechanism 190i includes a push-rack 191i, a pinion gear 192i, a pinion gear shaft 193i, one or more push-rack roller bearings 194i, one or more pinion gear shaft bearing supports 195i, one or more push-rack slider guides 196i, and a push-rack slider rod 197i. Although detailed as shafts 124i, 126i to enable pivoting thereabout, other suitable hinge mechanisms in this and other embodiments detailed herein are also contemplated.

A first end of first flap lever 112i is pivotably coupled to flap lever mounted bearings 130i via first flap lever shaft 122i, which is fastened or otherwise disposed on base place 102i. A second, opposite end of first flap lever 112i is pivotably coupled to a first end of second flap lever 114i via second flap lever shaft 124i. The second end of second flap lever 114i is pivotably coupled to rack and pinion mechanism 190i via third flap lever shaft 126i.

Rack and pinion mechanism 190i, more specifically, includes push-rack 191i pivotably coupled to the second end of second flap lever 114i via third flap lever shaft 126i. Push-rack 191i is disposed in meshed engagement with pinion gear 192i, which is engaged about pinion gear shaft 193i. Push-rack slider rod 197i is engaged with push-rack 191i and slidably received within push-rack slider guide 196i to guide translation of push-rack 191i, while push-rack roller bearings 194i enable reduced-friction translation of push-rack 191i along base plate 102i or a roadway "R." Pinion gear shaft bearing supports 195i receive pinion gear shaft 193i and enable rotation thereof in response to rotation of pinion gear 192i. Pinion gear shaft 193i, in turn, is configured to output rotational mechanical energy to the transmission sub-system.

In use, a vehicle drives onto first flap lever 112i, first and second flap levers 112i, 114i are pivoted and forwardly moved from their respective initial, biased positions towards more-flat positions, thereby translating push-rack 191i forwardly to, in turn, rotate pinion gear 192i and, thus, pinion gear shaft 193i. Once the vehicle clears sub-system 100i, push-rack 191i is returned to its initial, more-rearward position, while first and second flap levers 112i, 114i are returned to their initial, more protruding or angled positions.

With reference to FIG. 2J, another embodiment of an on-road energy collection sub-system, sub-system 100j, configured for use with system 10 (FIG. 1) or any other suitable system (such as those detailed herein) include a pair of base plates 102j 104j; first and second flap levers 112j, 114j; first, second, and third flap lever shafts 122j, 124j, 126j; flap lever mounted bearings 130j; and a hydraulic mechanism 200j. Hydraulic mechanism 200j.

Sub-system 100j is similar to sub-system 100i (FIGS. 2I-1 through 2I-3) except that rather than providing a rack and pinion mechanism, sub-system 100j includes hydraulic mechanism 200j. Hydraulic mechanism 200j includes a hydraulic piston 202j pivotably coupled to second flap lever 114j via third flap lever shaft 126j; a piston guide 204j configured to guide translation of piston 202j; a hydraulic body 206j configured to slidably receive piston 202j; a body mount 208j configured to support body 206j; and hydraulic input and outputs 212j, 214j, respectively, each including a one-way valve to inhibit backflow. As an alternative to separate hydraulic input and outputs 212j, 214j, a single hydraulic line may be provided to function as both the input and output (such as, for example, including a configuration similar to that detailed in FIGS. 2U-1 and 2U-2).

In use, a vehicle driving onto first and second flap levers 112j, 114j causes hydraulic piston 202j to slide further into hydraulic body 206j to displace hydraulic fluid and force the fluid out through hydraulic output 214j, which is coupled to the transmission sub-system, e.g., a hydraulic transmission. Once the vehicle leaves sub-system 100j, flap levers 112j, 114j are returned to their initial, biased position and piston 202j is returned to extend further from hydraulic body 206j, thereby drawing hydraulic fluid from hydraulic input 212j into body 206j. Alternatively or additionally, fluid may be pulled under vacuum into hydraulic body 206j to return flap levers 112j, 114j to their initial position and piston 202j to extend further from hydraulic body 206j.

Referring to FIG. 2K, another embodiment of an on-road energy collection sub-system configured for use with system 10 (FIG. 1) or any other suitable system (such as those detailed herein) is illustrated generally identified by reference numeral 100k. Sub-system 100k includes a flap lever 110k, a shaft 120k, a pair of mounted bearings 130k, and a hydraulic mechanism 200k. Flap lever 110k is coupled to shaft 120k which is rotatably mounted on mounted bearings 130k. Hydraulic mechanism 200k is similar to hydraulic mechanism 200j (FIG. 2J) except that hydraulic mechanism 200k includes an arm 216k coupling piston 202k of hydraulic mechanism 200k with shaft 120k such that pivoting of flap lever 110k rotates shaft 120k to thereby move arm 216k to translate piston 202k.

Figures 2, 2G, 3:
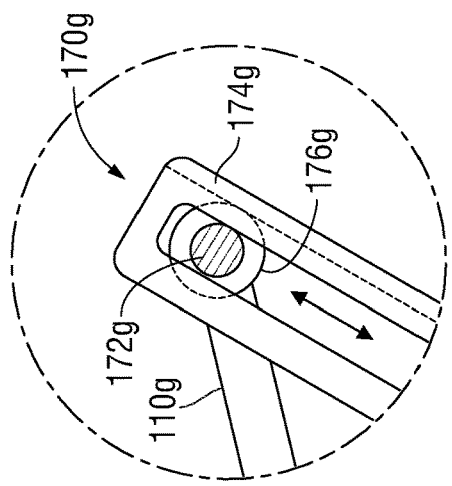
Figures 1, 2G:
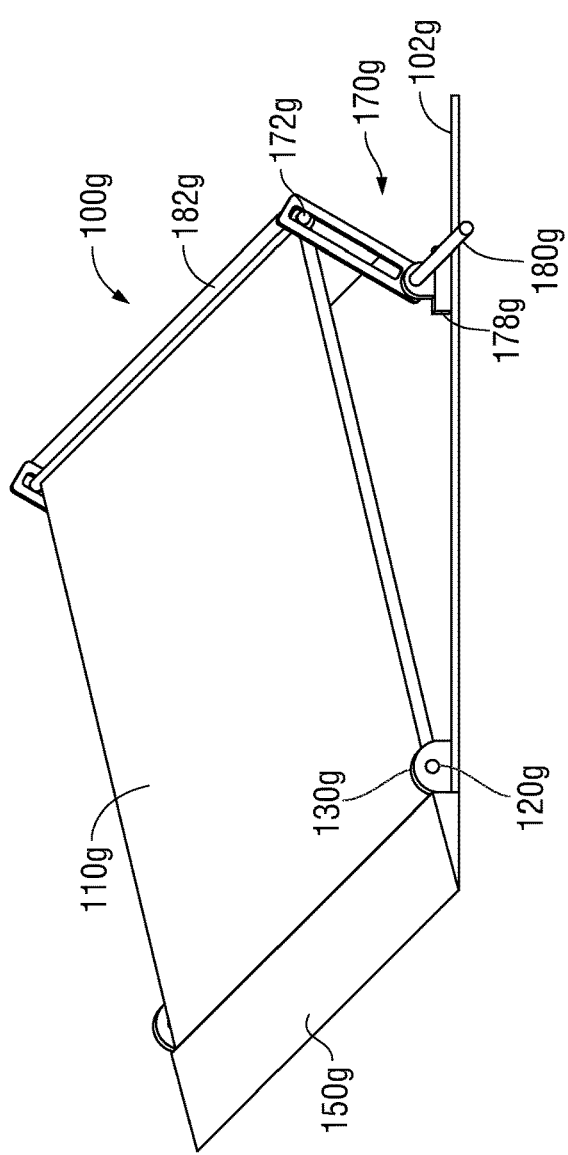
Figures 2, 2G:
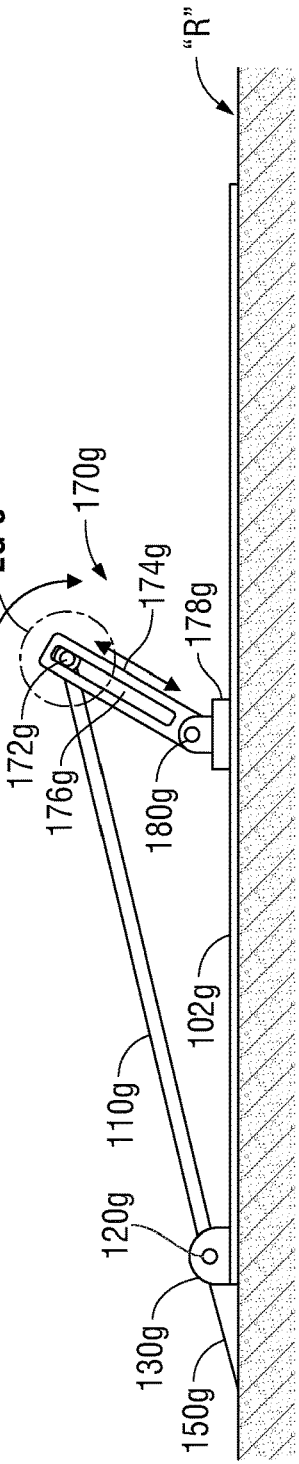
Figures 1, 2I:
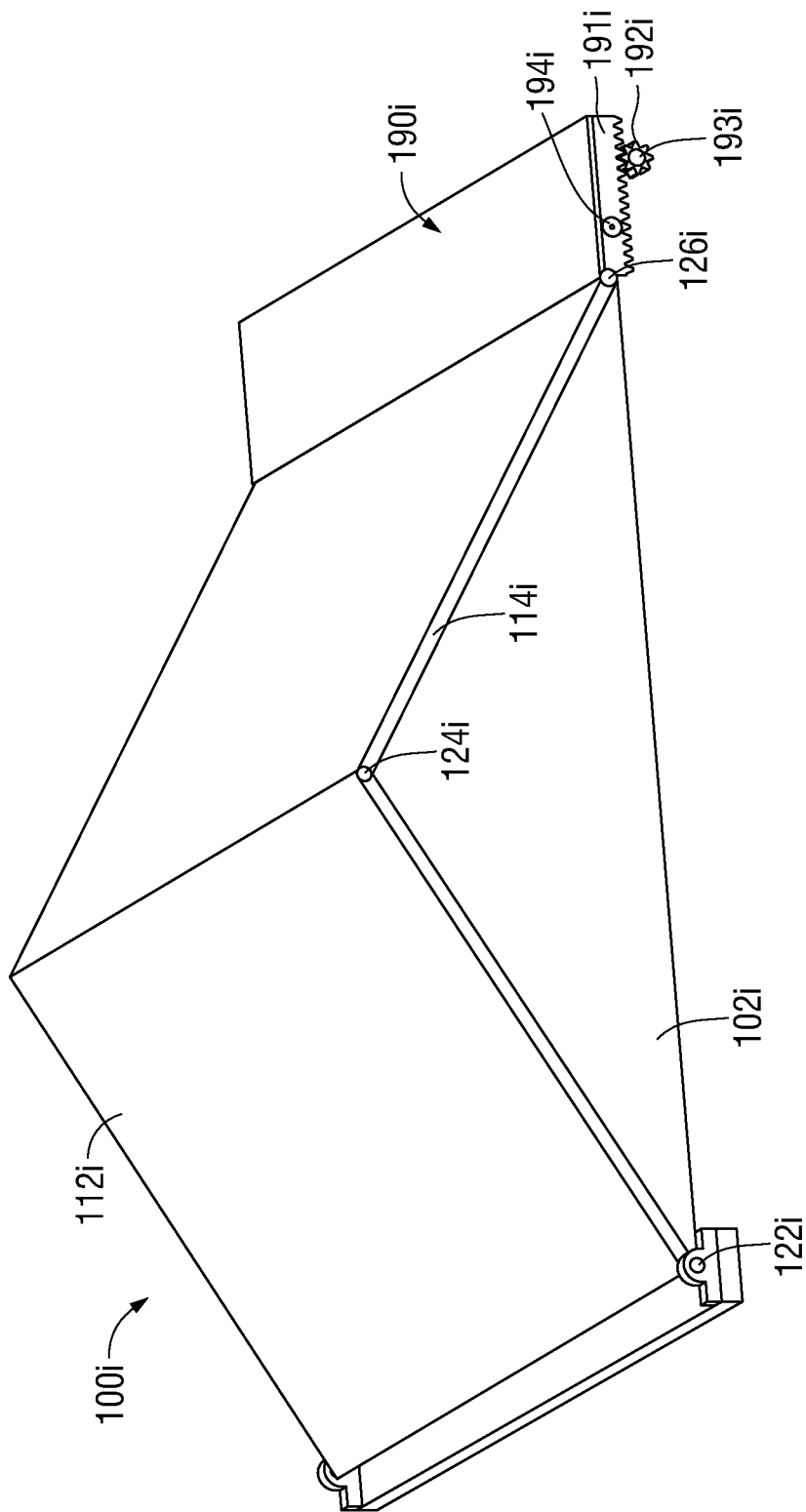
Figure 2L:
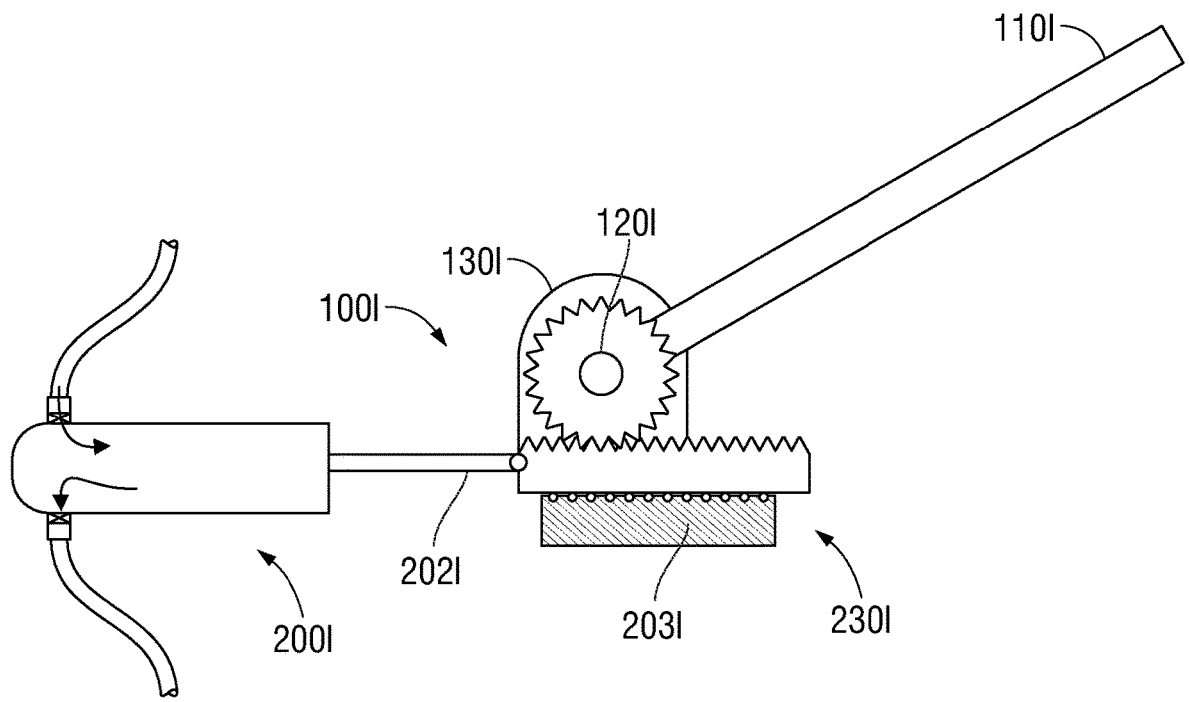
FIG. 2L is a side, partial cross-sectional view of another on-road energy collection sub-system configured for use with the system of FIG. 1 or any other suitable system in accordance with the present disclosure.

Turning to FIG. 2L, another embodiment of an on-road energy collection sub-system configured for use with system 10 (FIG. 1) or any other suitable system (such as those detailed herein) is illustrated generally identified by reference numeral 100l. Sub-system 100l includes a flap lever 110l, a shaft 120l, a pair of mounted bearings 130l, a hydraulic mechanism 200l, and a rack and pinion mechanism 230l coupled between shaft 120l and hydraulic mechanism 200l to convert rotation of shaft 120l into translation of piston 202l of hydraulic mechanism 200l. A guide 203l, e.g., roller bearing or other suitable guide, supports the rack of rack and pinion mechanism 230l to enable smooth, linear translation thereof.

Figure 2M:
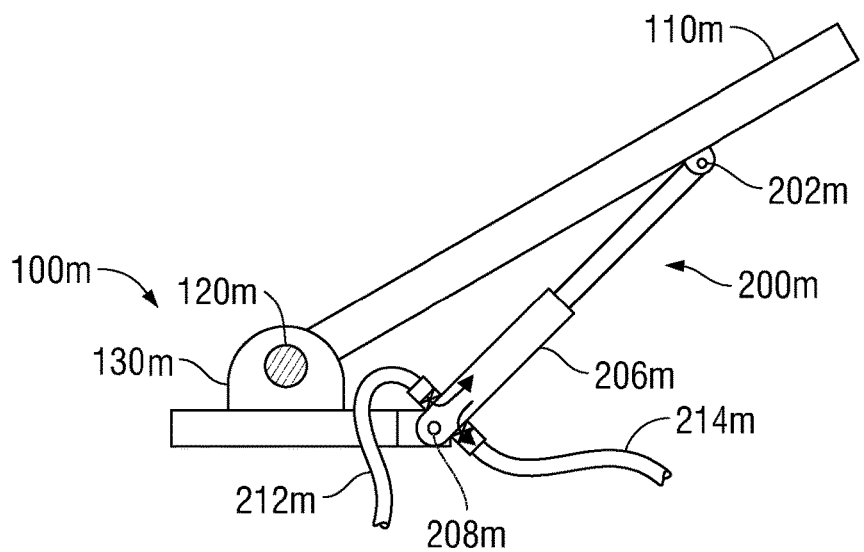
FIG. 2M is a side, partial cross-sectional view of yet another on-road energy collection sub-system configured for use with the system of FIG. 1 or any other suitable system in accordance with the present disclosure.

FIG. 2M illustrates another embodiment of an on-road energy collection sub-system, sub-system 100m, configured for use with system 10 (FIG. 1) or any other suitable system (such as those detailed herein) and including a flap lever 110m, a shaft 120m about which the flap lever 110m pivots, a pair of mounted bearings 130m rotatably supporting shaft 120m, and a hydraulic mechanism 200m.

Hydraulic mechanism 200m includes a hydraulic piston 202m pivotably coupled to flap lever 110m at one end of piston 202m, a hydraulic body 206m configured to slidably receive piston 202m, a body mount 208m configured to pivotably support body 206m; and hydraulic input and outputs 212m, 214m, respectively, which may function similarly as detailed above with respect to hydraulic mechanism 200j (FIG. 2J). Pivoting of flap lever 110m, e.g., in response to a vehicle driving thereon, pivots and compresses hydraulic mechanism 200m to drive fluid from body 206m into output 214m. One-way valves associated with hydraulic input and outputs 212m, 214m, respectively, are provided to inhibit backflow. As an alternative to separate hydraulic input and outputs 212m, 214m, a single hydraulic line may be provided to function as both the input and output (such as, for example, including a configuration similar to that detailed in FIGS. 2U-1 and 2U-2).

Figure 2N:
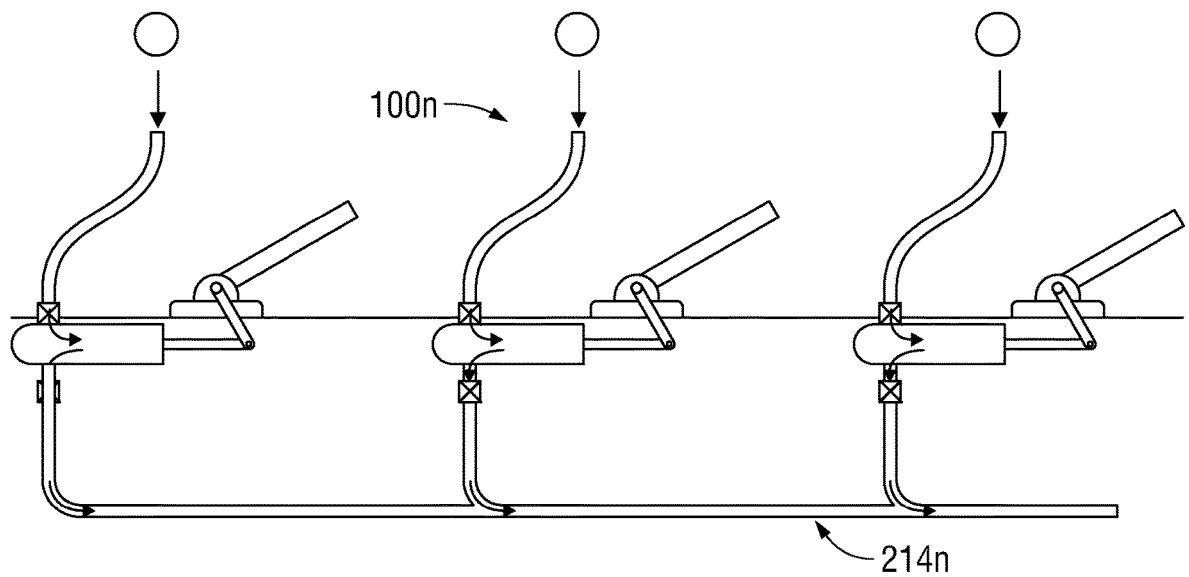
FIG. 2N is a side, partial cross-sectional view of still another on-road energy collection sub-system configured for use with the system of FIG. 1 or any other suitable system in accordance with the present disclosure.

As shown in FIG. 2N, in embodiments, an on-road energy collection sub-system 100n configured for use with system 10 (FIG. 1) or any other suitable system (such as those detailed herein) can include a plurality of serially-arranged hydraulic sub-systems like sub-systems 100k (FIG. 2K), 100l (FIG. 2L), 100m (FIG. 2M), or any other suitable sub-system(s), attached to separate or a common outflow 214n.

Figure 2O:
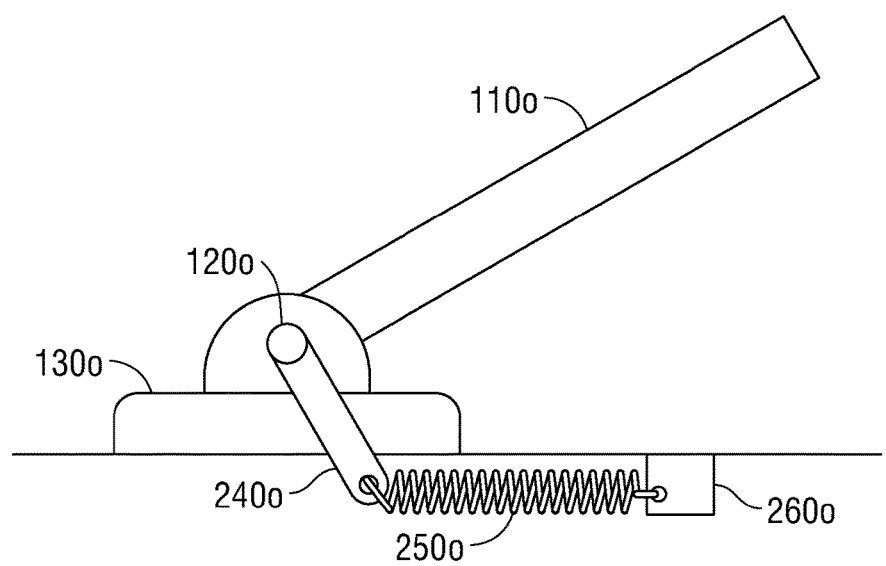
FIG. 2O is an enlarged, side view of a portion of another on-road energy collection sub-system configured for use with the system of FIG. 1 or any other suitable system in accordance with the present disclosure.

A biasing arrangement for biasing and/or returning a flap lever 110o towards an initial position is provided in FIG. 2O wherein flap lever 110o is engaged with a shaft 120o about which the flap lever 110o pivots and which itself is rotatably supported by a pair of mounted bearings 130o. An arm 240o extends from shaft 120o and is engaged with a first end of a biasing member 250o, e.g., a spring, that is grounded at the second opposite end thereof to, e.g., a fixture 260o. Thus, biasing member 250o biases arm 240o forwardly, thereby biasing shaft 120 in a counter-clockwise direction such that flap lever 110o is biased in an angled, elevated position.

Figures 1, 2P:
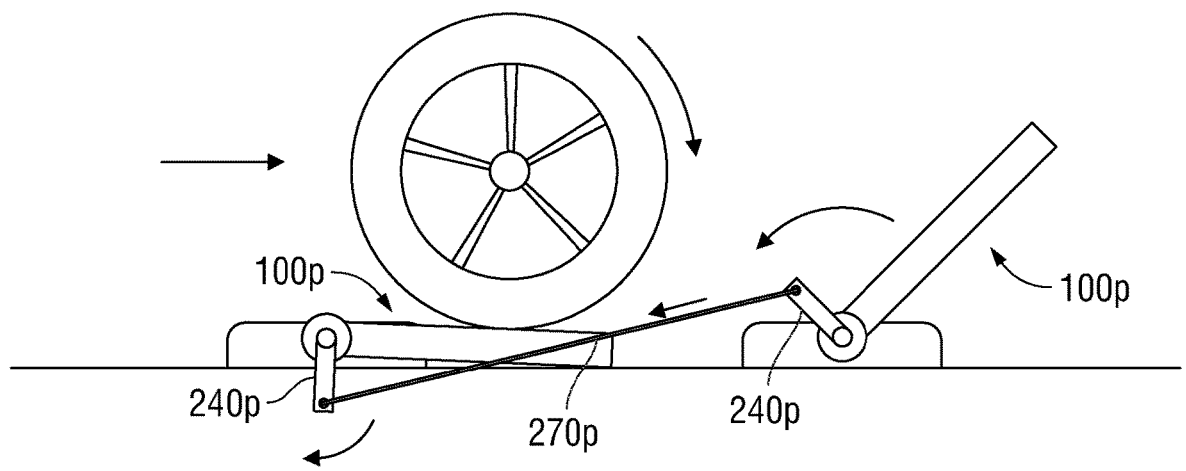
Figures 2, 2P:
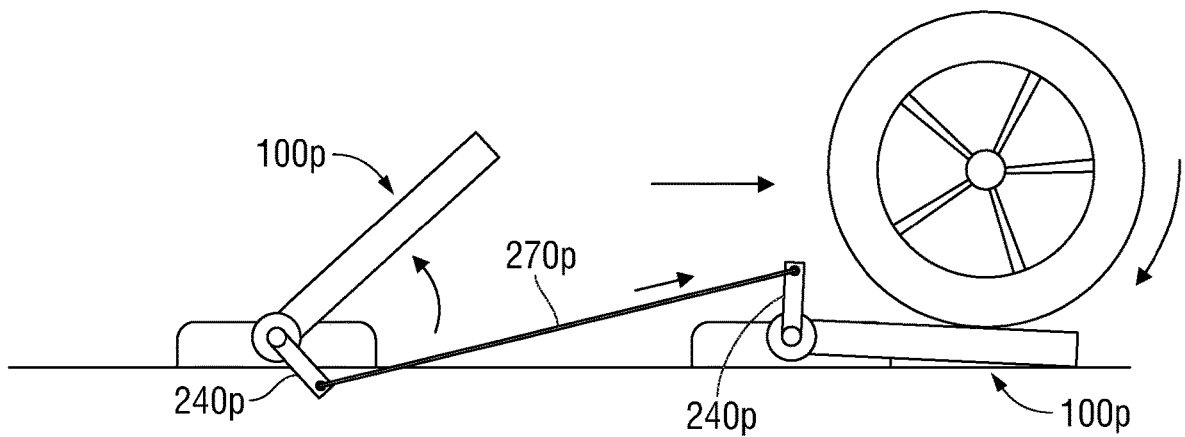

Referring to FIGS. 2P-1 and 2P-2, return arrangement is shown including a plurality of serially-arranged sub-systems 100p similar to sub-system 100o except that, rather than a biasing member, a linkage 270p interconnects the arms 240p of adjacent sub-systems 100p such that as a vehicle drives over a subsequent sub-system 100p, the previous sub-system 100p is pulled back to its initial position via linkage 270p.

Figure 2Q:
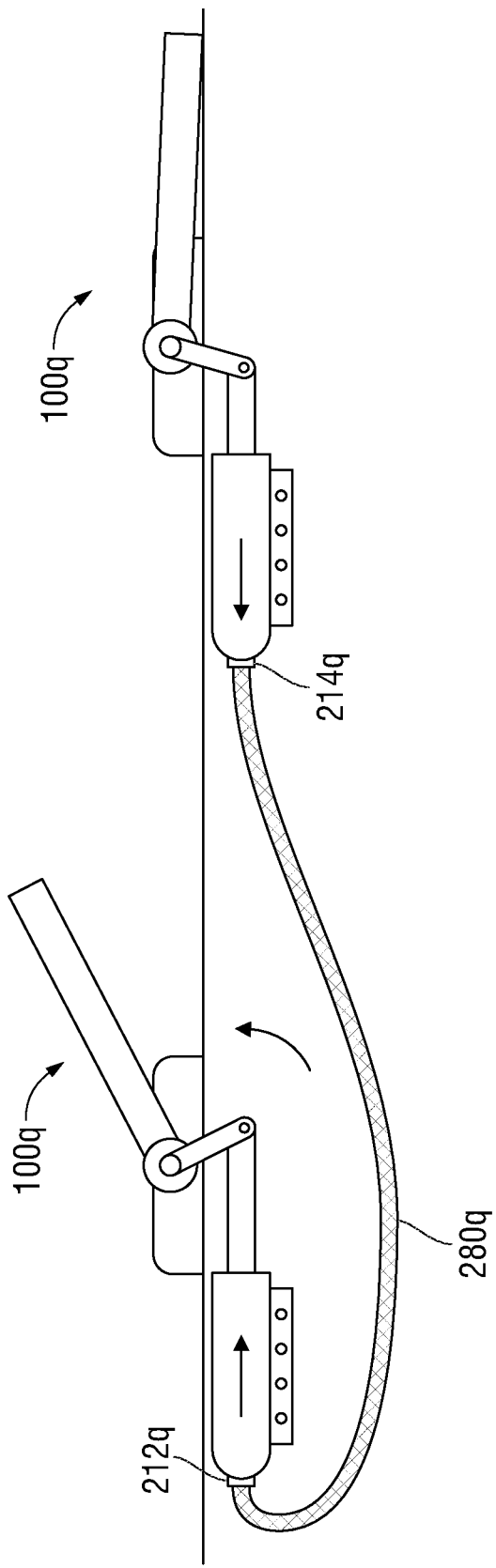
FIG. 2Q is a side, partial cross-sectional view of still yet another on-road energy collection sub-system configured for use with the system of FIG. 1 or any other suitable system in accordance with the present disclosure.

Referring to FIG. 2Q, return may alternatively be provided where a plurality of serially-arranged sub-systems 100q similar to sub-system 100k (FIG. 2K) are utilized, via interconnecting the hydraulic input 212q of one sub-system 100q with the hydraulic output 214q of an adjacent sub-system 100q. In such a configuration, as a vehicle drives over a subsequent sub-system 100q, fluid is urged from the output 214q of that sub-system 100q through hydraulic interconnect line 280q to the input 212q of the previous sub-system 100q to pull that sub-system 100q back to its initial position.

As illustrated in FIGS. 2R-1 and 2R-2, sub-system 100r is another embodiment of an on-road energy collection sub-system configured for use with system 10 (FIG. 1) or any other suitable system (such as those detailed herein) and includes a plurality of flap lever mechanisms 101r, each including first and second flap levers 112r, 114r; first, second, and third flap lever shafts 122r, 124r, 126r; flap lever mounted bearings 130r; and a roller 290r.

A first end of first flap lever 112r of each flap lever mechanism 101r is pivotably coupled to flap lever mounted bearings 130r thereof via first flap lever shaft 122r thereof. A second, opposite end of first flap lever 112r of each flap lever mechanism 101r is pivotably coupled to a first end of second flap lever 114r thereof via second flap lever shaft 124r thereof. The second end of second flap lever 114r of each flap lever mechanisms 101r, is pivotably coupled to roller 290r, which is configured to roll along the first flap lever 112r of a subsequent flap lever mechanism 101r.

In this manner, as a vehicle drives over a first flap lever mechanism 101r to flatten out and invert the first and second flap levers 112r, 114r thereof, the roller 290r thereof is urged into and rolled along the first flap lever 112r of a subsequent flap lever mechanism 101r, to thereby begin the flattening thereof. This allows for a steeper initial position of the first flap levers 112r which, in turn, enables greater rotation thereof to drive the downstream power transmission components. This configuration also helps dampen the impact felt by the vehicle driver.

The first flap lever shaft 122r of each flap lever mechanism 101r is utilized similarly as detailed above to generate rotational mechanical energy for output to the transmission sub-system. Further, as illustrated in FIG. 2R-2, the first flap lever mechanism 101r' may include a single flap lever 112r' eliminating the second flap lever and second shaft, so as to define an initial ramp for a vehicle driving over sub-system 100r.

As illustrated in FIGS. 2S-1 and 2S-2, sub-system 100s is another embodiment of an on-road energy collection sub-system configured for use with system 10 (FIG. 1) or any other suitable system (such as those detailed herein) and includes a plurality of flap lever mechanisms 101s, each including a flap lever 110s; first and second flap lever shafts 122s, 124s; flap lever mounted bearings 130s; and a roller 290s Subsystem 100s further includes a chain 300s fixed at a first end thereof via anchor 310s and coupled at a second end thereof to a tensioner 320s configured to maintain an appropriate tension on chain 300s. As an alternative to chain 300s, a high strength fabric or other suitable articulating structure may be provided, e.g., a mat, belt, other linked or weaved structure, etc.

A first end of the flap lever 110s of each flap lever mechanism 101s is pivotably coupled to flap lever mounted bearings 130s thereof via first flap lever shaft 122s thereof. A second, opposite end of the flap lever 110s of each flap lever mechanism 101s includes the roller 290s thereof coupled thereto via second flap lever shaft 124s. Rollers 290s support chain 300s thereon.

In this manner, as a vehicle drives onto and over chain 300s, flap levers 110s are serially deflected downwardly as rollers 290 are rolled along an underside of chain 300s. Further, the rotation of first flap lever shafts 122s effected in response to a vehicle driving onto and over chain 300s is rotational mechanical energy that is output to the transmission sub-system.

Tensioner 320s may be mechanically controlled, e.g., via a spring, or electronically controlled, and allows for reset of flap levers 110s to their initial positions after the vehicle drives over flap levers 110s. This configuration smoothens the transition for the vehicle from one flap lever 110s to the next flap lever 110s.

Figures 1, 2T:
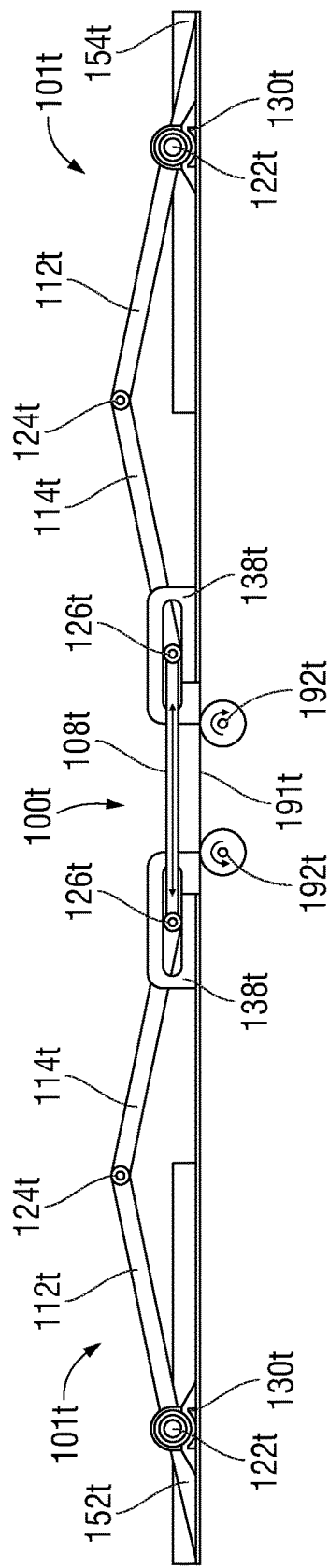
Figures 2, 2T:
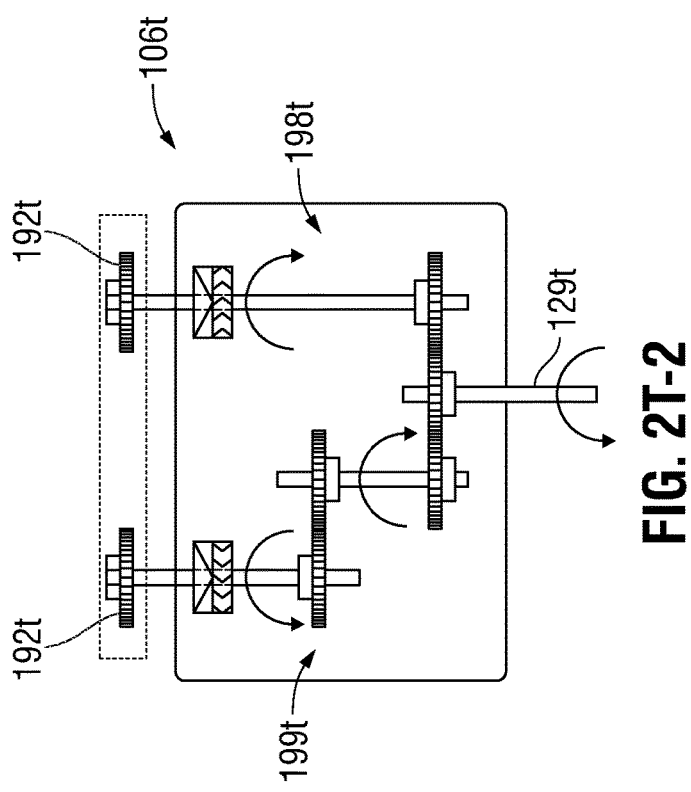

As illustrated in FIGS. 2T-1 and 2T-2, sub-system 100t is another embodiment of an on-road energy collection sub-system configured for use with system 10 (FIG. 1) or any other suitable system (such as those detailed herein) and includes a pair of pivoting flap assemblies 101t opposing one another, a gearing assembly 106t coupled between the opposed pivoting flap assemblies 101t, and a connector plate 108t coupled between the opposed pivoting flap assemblies 101t.

Each pivoting flap assembly 1014t includes first and second flap levers 112t, 114t; first, second, and third flap lever shafts 122t, 124t, 126t; and flap lever mounted bearings 130t. A first end of the first flap lever 112t of each assembly 101t is pivotably coupled to one of the flap lever mounted bearings 130t thereof via the first flap lever shaft 122t thereof. A second, opposite end of first flap lever 112t of each assembly 101t is pivotably coupled to a first end of the second flap lever 114t thereof via the second flap lever shaft 124t of that assembly 101t. The second end of second flap lever 114t of each assembly 101t, in turn, is pivotably coupled to an end of connector plate 108t via the third flap lever shaft 126t thereof. The third flap lever shafts 126t are also slidably received within slots defined within connector plate mounted bearings 138t. In embodiments, rather than a connector plate 108t and separate connector plate mounted bearings 138t, the third flap lever shafts 126t of the assemblies 101t may be the same component and slidably disposed within a slot defined within a single, shared connector plate mounted bearing 138t.

Gearing assembly 106t includes a rack 191t secured to connector plate 108t, first and second pinion gears 192t disposed in meshed engagement with rack 191t and including one-way clutches (not explicitly shown) coupled thereto, a forward gear set 198t disposed in meshed engagement with the first pinion gear 192t, and a reverse gear set 199t disposed in meshed engagement with the second pinion gear 192t. An output shaft 129t is coupled to both forward gear set 198t and reverse gear set 199t and extends from gearing assembly 106*t* to provide the rotational mechanical energy produced thereby to the transmission sub-system.

In use, as a vehicles front wheels drive onto sub-system 100*t*, the vehicle first encounters a rigid ramp 152*t* that serves to absorb some of the vehicle's initial shock and to load its suspension. After driving over the rigid ramp 152*t*, the vehicle moves onto the first flap lever 112*t* of the first pivoting flap assembly 101*t* such that the first and second flap levers 112*t*, 114*t* thereof are pivoted to a more-flattened position, thereby urging connector plate 108*t* forwardly, thus moving rack 191*t* forwardly to rotate first pinion 192*t*, thereby operating forward gear set 198*t* to provide a rotational output at output shaft 129*t*. Although second pinion 192*t* is also rotated via the movement of rack 191*t*, a one-way clutch of reverse gear set 199*t* inhibits further transmission of this rotation and, thus, reverse gear set 199*t* remains inactive.

As the vehicle continues to the second flap lever 114*t* of the second pivoting flap assembly 101*t*, the first and second flap levers 112*t*, 114*t* thereof are pivoted to a more-flattened position, thereby urging connector plate 108*t* rearwardly, thus moving rack 191*t* rearwardly to rotate second pinion 192*t*, thereby operating reverse gear set 199*t* to provide a rotational output at output shaft 129*t* in the same direction as with the forward gear set 198*t*. Although first pinion 192*t* is also rotated via the movement of rack 191*t*, a one-way clutch of forward gear set 198*t* inhibits further transmission of this rotation and, thus, forward gear set 198*t* remains inactive. Further, the movement of second pivoting flap assembly 101*t* serves to reset first pivoting flap assembly 101*t* back to its initial, elevated position for a subsequent vehicle. The vehicle may finally drive over a rigid ramp 154*t* and leave sub-system 100*t*. Of course, sub-system 100*t* may alternatively be configured to receive a vehicle traveling in the opposite direction, thus effecting the opposite of the above.

As detailed above, the reciprocating motion of sub-system 100*t* as a vehicle is engaged therewith is converted into unidirectional output at output shaft 129*t*. Further, although gearing assembly 106*t* appears below the remainder of sub-system 100*t* in FIGS. 2T-1 and 2T-2, such is a result of the converting a three-dimensional sub-system into a two-dimensional drawing and is not the case in actuality; rather, sub-system 100*t* is an on-road sub-system wherein gearing assembly 106*t* extends off the road laterally from the remainder of sub-system 100*t*.

As illustrated in FIGS. 2T-3 and 2T-4, sub-system 100*t'* is another embodiment of an on-road energy collection sub-system configured for use with system 10 (FIG. 1) or any other suitable system (such as those detailed herein) similar to sub-system 100*t* (FIGS. 2T-1 and 2T-2), except as distinguished below.

Sub-system 100*e* includes a pair of pivoting flap assemblies 101*t'* and a gearing assembly 106*t'* coupled between the pivoting flap assemblies 101*t'*. Gearing assembly 106*t'* includes a rack 191*t'*, a common pinion gear 192*t'* disposed in meshed engagement with rack 191*t'*, a forward gear set 198*t'*, and a reverse gear set 199*t'*. A coupling gear 193*t'* couples common pinion gear 192*t'* to the input gears of forward gear set 198*t'* and reverse gear set 199*t'*, which each includes a one-way clutch associated therewith. Coupling gear 193*t'*, more specifically, is disposed between the input gears of forward and reverse gear sets 198*t'*, 199*t'* such that rotation of coupling gear 193*t'* rotates the input gears of forward and reverse gear sets 198*t'*, 199*t'* in the same direction. The one-way clutches are disposed between the input gears and the remaining gears of the forward and reverse gear sets 198*t'*, 199*t'*.

In use, as a vehicle drives over the first pivoting flap assembly 101*t'*, rack 191*t'* is moved forwardly to rotate common pinion gear 192*t'*, thereby rotating coupling gear 193*t'* to operate forward gear set 198*t'* to provide a rotational output at output shaft 129*t'*. Although the input gear of reverse gear set 199*t'* is also rotated via the rotation of coupling gear 193*t'*, the one-way clutch of reverse gear set 199*t'* inhibits further transmission of this rotation and, thus, reverse gear set 199*t'* remains inactive.

As the vehicle continues to the second pivoting flap assembly 101*t'*, rack 191*t'* is moved rearwardly to rotate common pinion gear 192*t'* in the opposite direction, thereby rotating coupling gear 193*t'* to operate reverse gear set 199*t'* to provide a rotational output at output shaft 129*t'* in the same direction as with the forward gear set 198*t'*. Although the input gear of forward gear set 198*t'* is also rotated, the one-way clutch of forward gear set 198*t'* inhibits further transmission of this rotation and, thus, forward gear set 198*t'* remains inactive.

Figures 2, 2U:
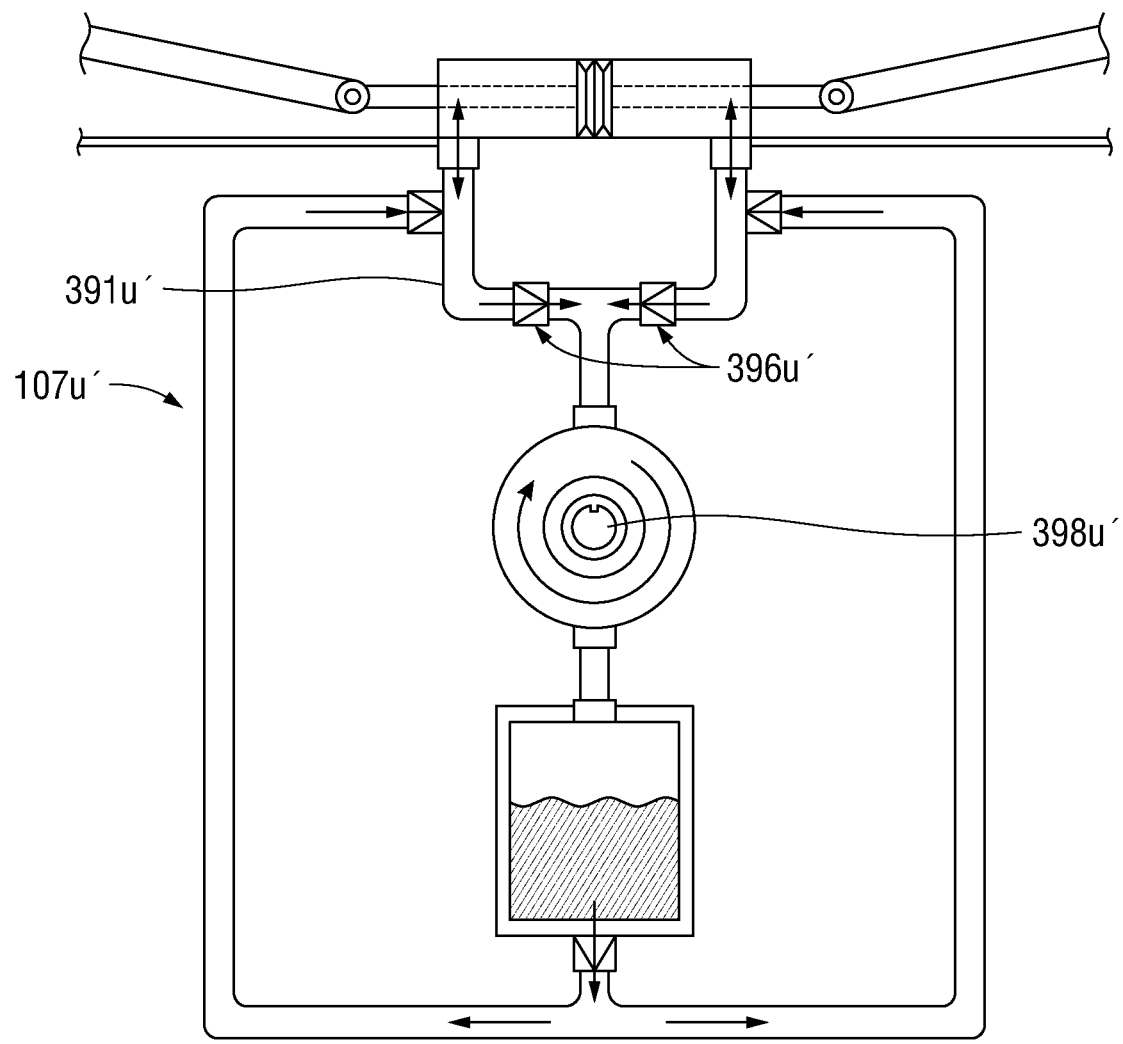

FIG. 2U-1 illustrates another on-road energy collection sub-system 100*u* configured for use with system 10 (FIG. 1) or any other suitable system (such as those detailed herein) that is similar to sub-system 100*t* (FIGS. 2T-1 and 2T-2) except that, rather than using a gearing assembly, sub-system 100*u* provides a hydraulic assembly 107*u* that coverts the reciprocating motion of sub-system 100*u* as a vehicle is engaged therewith into unidirectional output.

Hydraulic assembly 107*u* includes a dual-direction piston 390*u*, a U-shaped connector 391*u* coupled to both portions of the dual-direction piston 390*u*, a first reset flow path 392*u* coupled to one side of U-shaped connector 391*u*, a second reset flow path 394*u* coupled to the other side of U-shaped connector 391*u*, first and second one-way valves 396*u* disposed between the respective first and second reset flow paths 392*u*, 394*u* and U-shaped connector 391*u*, a hydraulic motor 398*u* coupled to an output shaft 129*u* and including a fluid reservoir associated therewith, a third one-way valve 396*u* coupled between the U-shaped connector 391*u* and hydraulic motor 398*u*, and a fourth one-way valve 396*u* coupled between first and second reset flow paths 392*u*, 394*u* and the fluid reservoir associated with hydraulic motor 398*u*. With momentary additional reference to FIG. 2U-2, in the embodiment of hydraulic assembly 107*u'*, as an alternative to a single third one-way valve 396*u* (FIG. 2U-1), a pair of third one-way valves 396*u'* may be provided along U-shaped connector 391*u'* on opposing sides of hydraulic motor 398*u'* to inhibit fluid from traveling completely along U-shaped connector 391*u'* and, thus, short-circuiting hydraulic motor 398*u'*. Hydraulic assembly 107*u'* may otherwise be similar to hydraulic assembly 107*u* (FIG. 2U-1).

In use, when piston 390*u* is urged in a forward direction via the first pivoting flap assembly 101*u*, fluid is urged through one side of U-shaped connector 391*u* and to hydraulic motor 398*u* to drive hydraulic motor 398*u* to thereby rotate output shaft 129*u*, before the fluid ends up in the fluid reservoir associated with hydraulic motor 398*u*. As this occurs, vacuum is created through the other side of U-shaped connector 391*u* and first reset flow path 392*u* to draw fluid from the fluid reservoir therethrough and into dual-direction piston 390*u*. One-way valves 396*u*, as understood, inhibit backflow and help maintain suitable pressure and vacuum for urging and withdrawing fluid, respectively. As alternative to one-way valves 396*u* (or any other mechanical valving detailed herein), electronically-controlled or other suitable valves are also contemplated.

When piston 390*u* is urged in a rearward direction via the second pivoting flap assembly 101*u*, fluid is urged through the other side of U-shaped connector 391u and to hydraulic motor 398u to drive hydraulic motor 398u to thereby rotate output shaft 129u in the same direction as the forward direction. The fluid eventually ends up in the fluid reservoir associated with hydraulic motor 398u. As fluid is urged to hydraulic motor 398u, vacuum is created through the first, other side of U-shaped connector 391u and second reset flow path 394u to draw fluid from the fluid reservoir therethrough and into dual-direction piston 390u. One-way valves 396u, similarly as above, inhibit backflow and help maintain suitable pressure and vacuum.

Actuation in the rearward direction resets first pivoting flap assembly 101u back to its initial, elevated position for a subsequent vehicle and, likewise, actuation in the forward direction resets second pivoting flap assembly 101u to an elevated position for further travel of the vehicle thereover.

Although hydraulic assembly 107u appears below the remainder of sub-system 100u in FIG. 2U, such is a result of the converting a three-dimensional sub-system into a two-dimensional drawing and is not the case in actuality; rather, sub-system 100u is an on-road sub-system wherein hydraulic assembly 107u extends off the road laterally from the remainder of sub-system 100u. Further, hydraulic assembly 107u may be utilized with any of the hydraulically-activated subsystems (including systems including plural flap assemblies) detailed above and is not limited to use with pivoting flap assemblies 101u.

An embodiment of the first transmission sub-system 400 configured for use with system 10 (FIG. 1) or any other suitable system (such as those detailed herein) is illustrated in FIG. 3. First transmission sub-system 400 includes a secondary shaft 410 configured to receive the rotational mechanical energy provided by sub-system 100, a housing 420 housing a gear set 430, e.g., a geartrain or gearbox, coupled to secondary shaft 410, an output shaft 440 coupled to gear set 430, and a transmission electrical control unit (ECU) 450 including, for example, a processor and memory storing instructions to be executed by the processor. As noted above, secondary shaft 410 of first transmission sub-system 400 is configured to receive the rotational mechanical energy provided by sub-system 100 (FIG. 1) and provide the same to gear set 430 which modifies the rotational mechanical energy, e.g., by changing the speed and/or torque thereof. The modified rotational mechanical energy is then output to output shaft 440 for input to the flywheel sub-system, e.g., flywheel activator sub-system 500 (if provided) or flywheel assembly sub-system 600 (if flywheel activator sub-system 500 is not provided) (see FIG. 1).

ECU 450 electronically controls gear set 430 to automatically modify and set a transmission ratio, e.g., a gear ratio, to achieve appropriate modification, e.g., amplification or attenuation, of the speed and/or torque of the input rotational mechanical energy. ECU 450, in turn, may be controlled by traffic analysis electronics sub-system 1000 (FIG. 1), as detailed below. The transmission ratio set may depend on, for example, sensed data, e.g., speed, make, model, weight, size, ground clearance, drive-train, etc., relating to the currently interacting vehicle and/or other information, e.g., weather conditions, traffic volume, etc. Based on this information, traffic analysis electronics subs-system 1000 (FIG. 1) instructs ECU 450 to, in turn, manipulate gear set 430 to achieve the appropriate transmission ratio. The transmission ratio may be selected from a plurality of discrete ratios, e.g., low, medium, and high, or may be continuously variable to achieve any desired ratio within a ratio range of the gear set 430. As an alternative to electronic-based configurations, e.g., electronically controlled gears, mechanical configurations may be utilized, e.g., using mechanical clutches (for example, centrifugal clutches).

Figure 4:
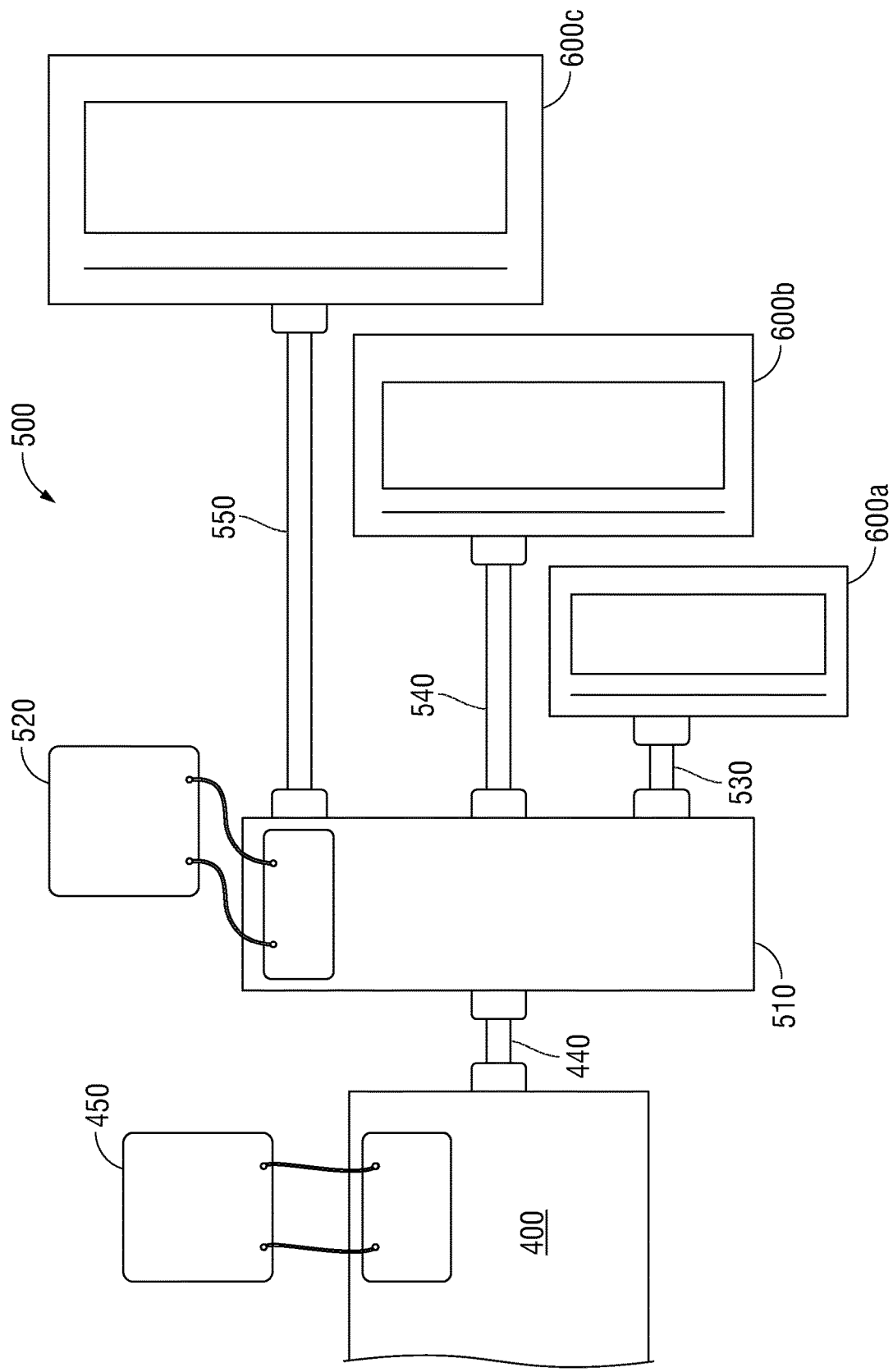

Illustrated in FIG. 4 is an embodiment of the flywheel activator sub-system 500 configured for use with system 10 (FIG. 1) or any other suitable system (such as those detailed herein). Sub-system 500 includes an activator gear set 510, e.g., a geartrain or gearbox, a flywheel activator electrical control unit (ECU) 520, a small activator shaft 530, a medium activator shaft 540, and a large activator shaft 550. Activator gear set 510 is configured to receive the modified rotational mechanical energy output from output shaft 440 of first transmission sub-system 400 and relay this energy (with or without modification) to one of the activator shafts 530, 540, 550. Selection of the particular output shaft 530, 540, 550 is controlled by ECU 520 which, in turn, may be controlled by the traffic analysis electronics sub-system 1000 similarly as noted above and as detailed further below (see FIG. 1). ECU 520 may include, for example, a processor and memory storing instructions to be executed by the processor. Each output shaft 530, 540, 550 is coupled to its own flywheel assembly sub-system 600a, 600b, 600c.

Figure 5:
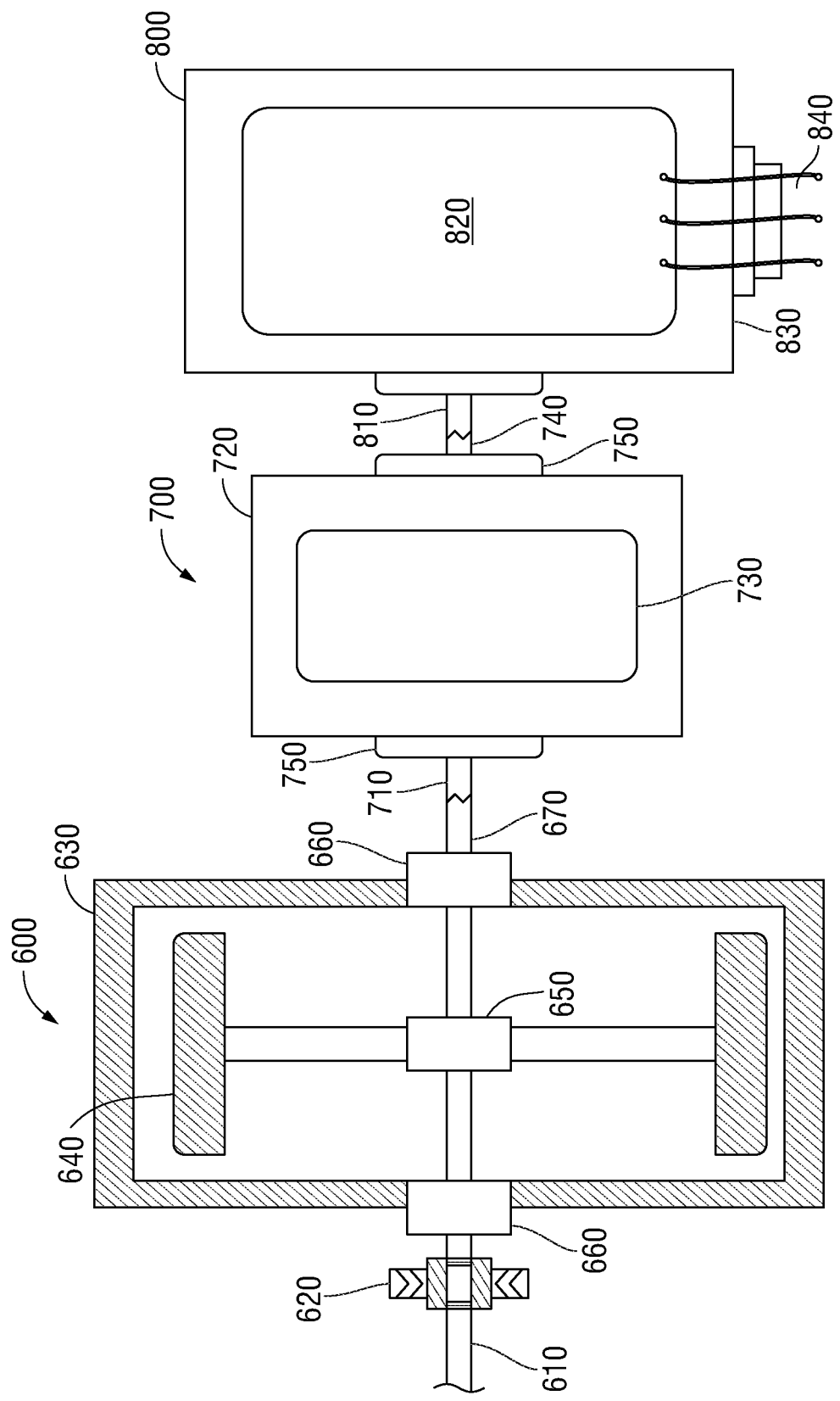
FIG. 5 is a schematic illustration of flywheel assembly, gear box/continuous variable transmission (CVT), and energy generator sub-systems configured for use with the system of FIG. 1 or any other suitable system in accordance with the present disclosure.

Referring to FIG. 5, an embodiment of the flywheel assembly sub-system 600, gearbox/CVT sub-system 700, and energy generator sub-system 800 configured for use with system 10 (FIG. 1) or any other suitable system (such as those detailed herein) are illustrated. As noted above, each shaft output from flywheel activator sub-system 500 (FIG. 4) may be connected to its own set of sub-systems 600, 700, 800; however, for purposes of brevity and to avoid repetition, only one set of sub-systems 600, 700, 800 are detailed hereinbelow.

Flywheel assembly subsystem 600 includes a flywheel input shaft 610 coupled to the corresponding output shaft 530, 540, 550 of flywheel activator sub-system 500 (FIG. 4); a one-way shaft clutch 620 coupled to the flywheel input shaft 610; a flywheel housing 630 retaining therein a flywheel 640 and flywheel hub assembly 650 that couples flywheel 640 with input shaft 610. Input shaft 610 is configured to provide the input to flywheel 640 and is coupled to flywheel housing 630 via one of flywheel shaft support bearings 660. An output shaft 670 coupled to flywheel 640 via flywheel hub assembly 650 is configured to receive the output from flywheel 640 and is coupled to flywheel housing 630 via another flywheel shaft support bearing 660.

In use, rotational mechanical energy input via input shaft 610 is transmitted to flywheel 640 to store energy and selectively provide a sustained output energy profile for output via output shaft 670. More specifically, the initial energy profile provided via input shaft 610 is a spiked and/or pulsed input. Flywheel 640 functions to establish a smooth and consistent energy profile over an extended period of time by storing and selectively outing the energy via output shaft 670 to the second transmission sub-system, e.g., gearbox/CVT sub-system 700. In embodiments, multiple flywheels 640 are provided.

Continuing with reference to FIG. 5, the second transmission sub-system, e.g., gearbox/CVT sub-system 700, includes an input shaft 710 configured to receive the output from output shaft 670, a housing 720 housing therein a gear set 730, e.g., a gear box, CVT, or gear train, coupled at an input end to input shaft 710, an output shaft 740 coupled to an output end of gear set 730. Input and output shafts 710, 740 are rotatably coupled to housing 720 via shaft support bearings 750. Gear set 730 modifies the rotational energy input via input shaft 710 by changing the speed and/or torque thereof and outputs the modified energy via output shaft 740. Gear set 730 may be an electronically-controlled variable transmission or may a mechanically-controlled variable transmission, e.g., incorporating a centrifugal clutch.

Energy generator sub-system 800 includes a generator input shaft 810, an electricity generator 820, and a generator mount structure 830. Generator input shaft 810 receives the rotational energy transferred from output shaft 740 and rotates a rotor (or other suitable mechanism) within electricity generator 820 to generate electricity. Any suitable electricity generator 820 configured to convert rotational mechanical energy into electrical energy is contemplated and configured for use in accordance with energy generator sub-system 800. Generator 820 outputs the generated electricity through wiring 840 to power electronics sub-system 900 (FIG. 1). In embodiments, energy generator sub-system 800 is incorporated into housing 720 of gearbox/CVT sub-system 700.

Figure 6:
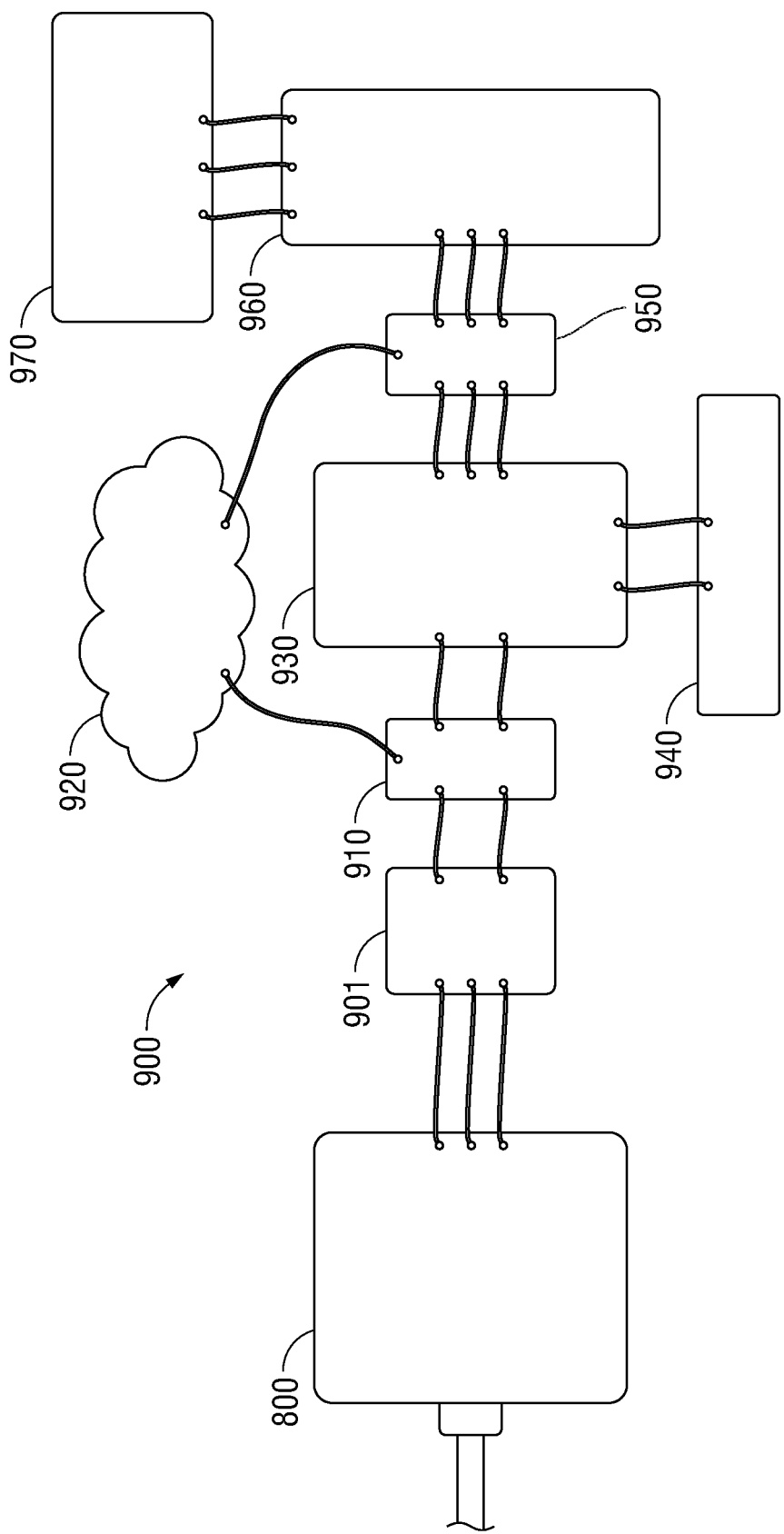
FIG. 6 is a schematic illustration of a power electronics sub-system configured for use with the system of FIG. 1 or any other suitable system in accordance with the present disclosure.

Turning to FIG. 6, an embodiment of the power electronics sub-system 900 configured for use with system 10 (FIG. 1) or any other suitable system (such as those detailed herein) is illustrated. As noted above, wherein flywheel activator sub-system 500 (FIG. 4) includes multiple outputs, multiple power electronics sub-systems 900 may be provided; however, for purposes of brevity and to avoid repetition, only one is detailed hereinbelow.

Power electronics sub-system 900 includes an AC to DC electrical rectifier 901, a networked DC power analyzer 910, an internet connection 920, a grid-tied power inverter 930, a load 940, an AC power analyzer 950, a grid-tied electrical panel 960, and an electrical utility/grid 970. Power electronics sub-system 900 converts the electrical energy transmitted thereto by electricity generator sub-system 800 into utility-grade electricity. Although detailed in one manner below, other suitable power electronics sub-systems 900 for converting "raw" electricity into utility-grade electricity are also contemplated.

In use, generator sub-system 800 outputs AC electricity that is fed via wiring to AC to DC electrical rectifier 901. Rectifier 901 converts the AC electricity to DC electricity that is then fed to networked DC power analyzer 910. Analyzer 910 measures various DC energy output parameters in real time and streams this data to an internet connected server via internet connection 920. Analyzer 910 is also electrically connected to grid-tied power inverter 930. The DC electricity passes through analyzer 910 without interruption to inverter 930 via wiring. Inverter 930 converts the DC electricity into utility grid-grade electricity and may be any suitable grid-tied power inverter 930. Inverter 930 also includes analysis components that measure various electrical parameters, e.g., voltage, current, frequency, and/or resistance, of the electricity. These analysis components allow inverter 930 to produce a steady and accurate stream of grid-grade AC electricity.

Connected downstream of inverter 930 is load 940, e.g., a dump load or resistor, a charge controller-tied battery storage bank, or other suitable load. Built in over-current protection systems and/or other safety equipment allow inverter 930 to automatically redirect high, unsafe and potentially damaging levels of electricity to load 940. Load 940 converts this unsuitable electricity to heat via built-in resistance.

The transformed and inverted AC electricity created by inverter 930 passes through networked AC power analyzer 950 which measures various AC energy inverter output parameters in real time and streams this data to an internet connected server via internet connection 920 in the same way networked DC power analyzer 910 streams its data. Once passing through analyzer 950, uninterrupted, the AC electricity is transmitted to electrical/breaker panel 960 that is directly connected to the local electrical utility grid 970 for providing the electricity thereto. As an alternative or in addition to local electrical utility grid 970, the electricity may be provided to a microgrid, an electricity storage system (e.g., battery or batteries), directly to an energy-consuming facility, etc.

An embodiment of the traffic analysis electronics sub-system 1000 configured for use with system 10 (FIG. 1) or any other suitable system (such as those detailed herein), illustrated in FIGS. 7A and 7B includes a traffic electrical control unit (ECU) 1100, a radar/speed sensor 1110, a traffic camera 1120, a vehicle weight sensor 1130, and/or any other suitable sensor equipment for determining vehicle data, traffic data, environment data, etc. Traffic analysis electronics sub-system 1000 may also interface with internet-based services, via internet connection 1140, that collect and/or disseminate traffic, weather, and/or vehicle data to retrieve data therefrom.

Figure 7C:
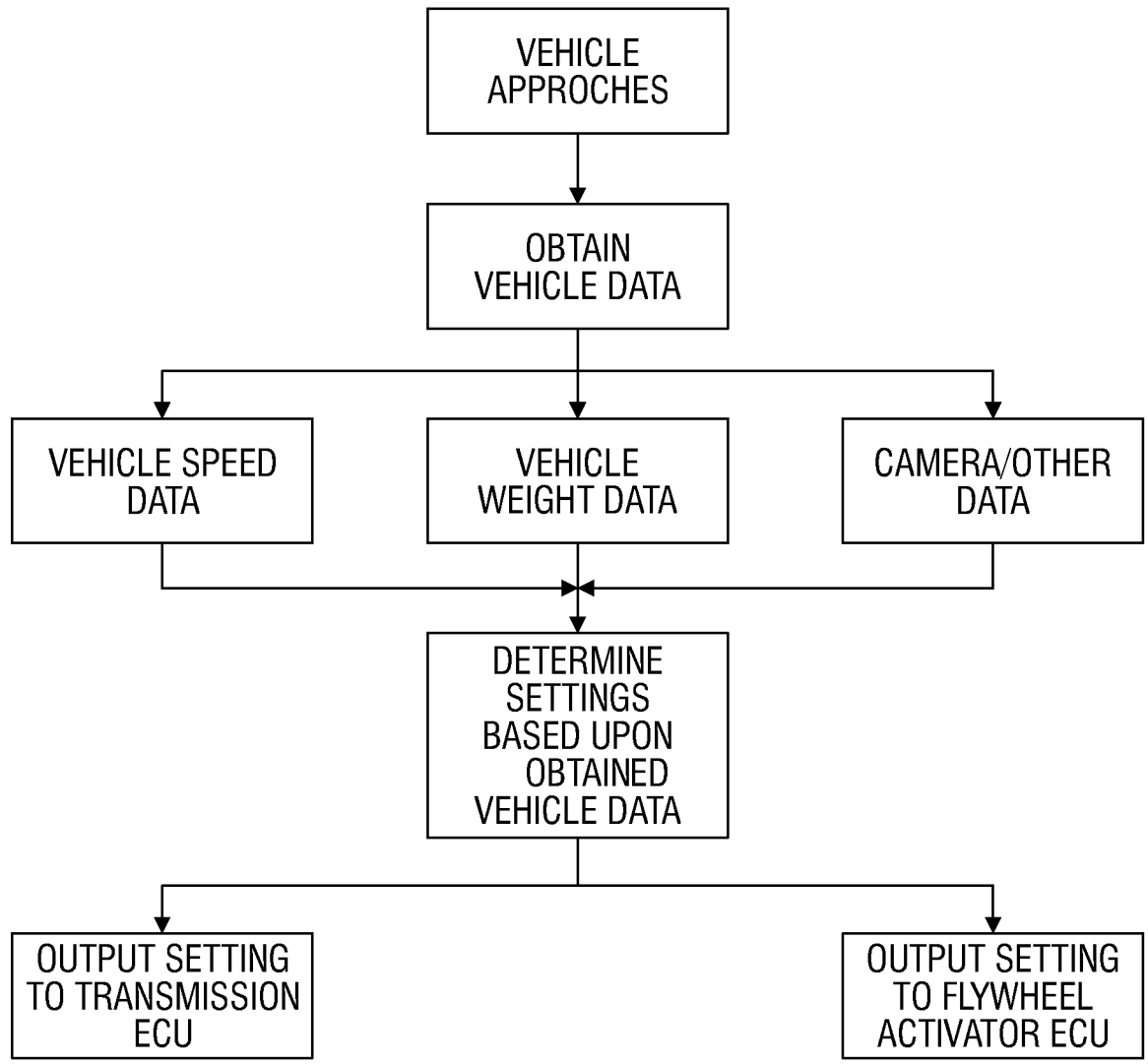
FIG. 7C is a flowchart illustrating a method of use of traffic analysis electronics sub-system of FIG. 7A in accordance with the present disclosure.

Vehicles vary greatly in size, mass, and configuration, and can obviously travel at vastly different speeds. Larger vehicles contain more kinetic energy than smaller ones and faster vehicles contain more kinetic energy than slower ones. Within this energy matrix lies a wide range of possible kinetic energies contained in any single moving vehicle. Referring also to FIG. 7C, traffic analysis electronics sub-system 1000 is configured, when a vehicle is approaching, to obtain informative data (such as that from the sensors/connections above and/or other suitable data) of the approaching vehicle, determine where on the kinetic energy spectrum the approaching vehicle lies (or otherwise determining setting information suitable for the approaching vehicle) and, based thereon, instruct the transmission ECU 450 and flywheel activator ECU 520 to set an appropriate transmission ratio and activator shaft/flywheel configuration, respectively. More specifically, ECU 1100 collects available data, determines the appropriate settings, and output the same to ECU's 450, 520 prior to a vehicle interacting with the on-road energy collection sub-system 100. ECU 1100 may include, for example, a processor and memory storing instructions to be executed by the processor.

With additional reference to FIG. 7D, ECU 1100, in embodiments, may access a lookup table including a matrix of, for example, vehicle mass and vehicle velocity, as illustrated in FIG. 7D, in order to determine the appropriate settings to be output to ECU's 450, 520. However, other lookup tables or methods of determining the appropriate settings to be output are also contemplated such as, for example, algorithms, artificial intelligence protocols, etc. Historical data of vehicles, the components of system 10 (FIG. 1), the power generated, the transmission, flywheel, and/or other system settings selected, traffic conditions, etc., from plural systems can also be used to improve the setting determination by ECU 1100, via a feedback loop, machine learning algorithm, to fine tune the look-up table matrix, etc. This may accomplished in real-time, periodically, or the data may be utilized for off-line analysis, e.g., to continually improve the programs, algorithms, collection and/or use of data, etc. for implementation in software updates, firmware updates, etc. These updates may be provided wirelessly, e.g., over WiFi, cellular networks, or in any other suitable manner, to one or more systems from a central location or locations. Further, the updating may be done universally for all systems or individually (and specifically tailored) for individual systems or groups of systems.

Continuing with reference to FIG. 7C, in embodiments, traffic analysis electronics sub-system 1000 is configured with appropriate sensor(s), e.g., machine vision, LIDAR, lasers, etc., to assess vehicle ground clearance of an approaching vehicle and, based on the determined ground clearance, make a decision to either maintain the height of the on-road flap lever system or adjust the height of the on-road flap lever system (or to move the on-road flap lever system to a stowaway condition removed from the roadway). Once the vehicle passes, traffic analysis electronics sub-system 1000 resets the on-road flap lever system back to the default height.

In addition to vehicle ground clearance, the above-detailed adjustments may also be made in response to one or more other sensed properties of an approaching vehicle, e.g., speed, mass, etc., considered alone or in combination with other sensed properties.

Figure 8:
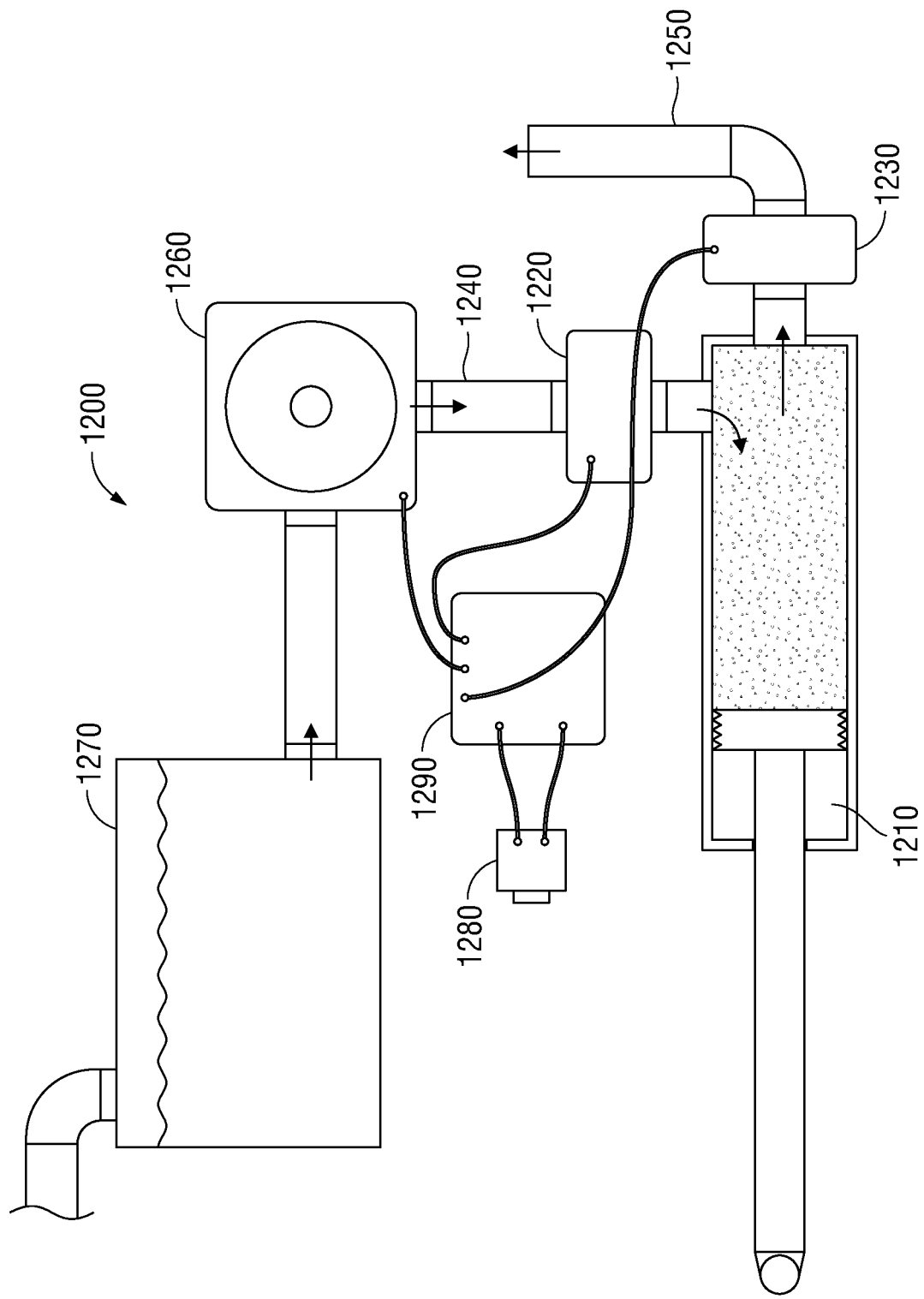
FIG. 8 is a schematic illustration of a hydraulic control assembly in accordance with the present disclosure for use with hydraulic implementations of the system of FIG. 1 or any other suitable system.

Turning to FIG. 8, with respect to embodiments where the on-road energy collection sub-system 100 (FIG. 1) is hydraulic, a hydraulic control assembly 1200 may be utilized. Hydraulic control assembly 1200 includes a hydraulic actuator assembly 1210, an electronically controlled entry valve 1220, an electronically controlled exit valve 1230, a hydraulic line-in 1240, a hydraulic line-out 1250, an electronically controlled hydraulic pump 1260, a hydraulic reservoir 1270, a position sensor 1280, and an electronic controller 1290.

Hydraulic actuator assembly 1210 collects energy via the on-road energy collection sub-system 100 (FIG. 1) and resets the on-road energy collection sub-system 100 (FIG. 1), if not otherwise provided. More specifically, activation of the flap lever of the on-road energy collection sub-system 100 (FIG. 1) by a moving vehicle or the position of the piston of hydraulic actuator assembly 1210 trigger sensor 1280 to signal controller 1290 to direct pump 1260, valve 1220, and valve 1230. That is, when sensor 1280 detects that the on-road energy collection sub-system 100 (FIG. 1) is activated, controller 1290 instructs pump 1260 to deliver fluid to hydraulic actuator assembly 1210 and directs valve 1220 to open, while valve 1230 remains closed. As hydraulic actuator assembly 1210 fills up, the piston thereof is repositioned and the flap lever of the on-road energy collection sub-system 100 (FIG. 1) is fully depressed. Sensor 1280 detects this and, in response, resets the system to its starting position, shutting down pump 1260, closing valve 1220, and opening valve 1230. The fluid that leaves hydraulic actuator assembly 1210 via valve 1230 is used by downstream sub-systems such as a hydraulic motor or transmission for eventually converting the same into electrical energy.

Figure 9A:
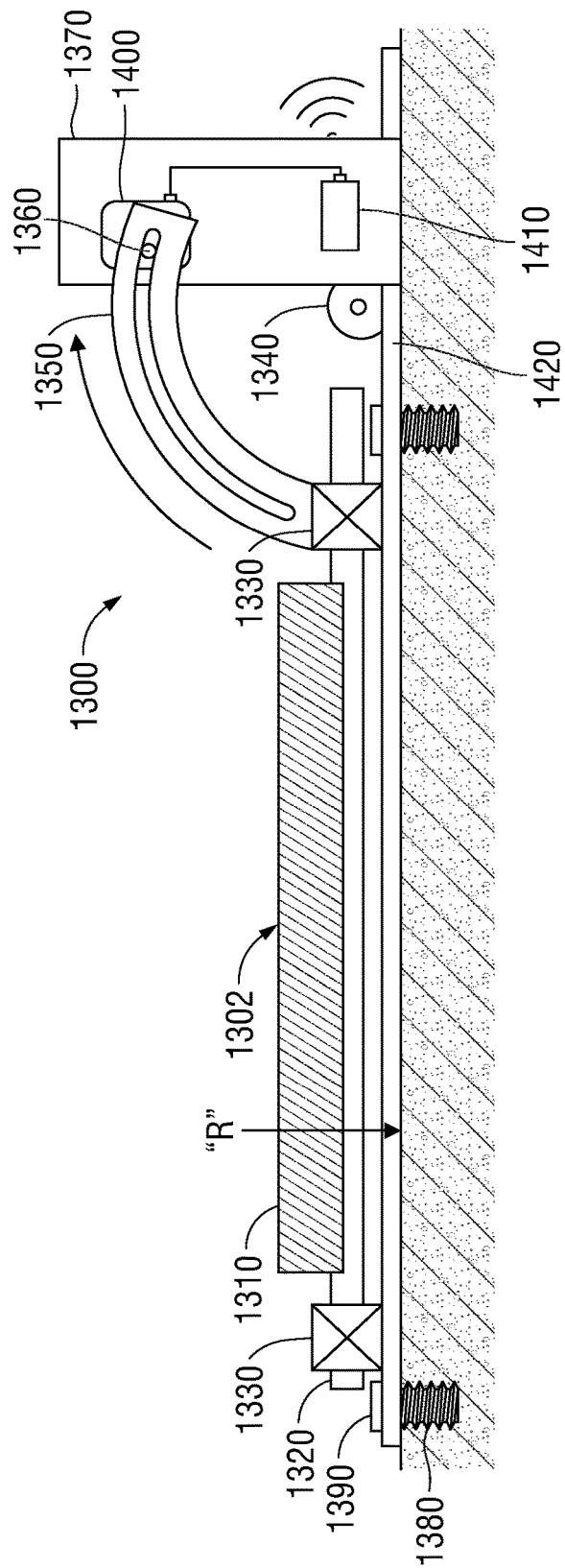
FIGS. 9A and 9B are side views of stowaway mechanisms in accordance with the present disclosure configured for use with the system of FIG. 1 or any other suitable system.
Figure 9B:
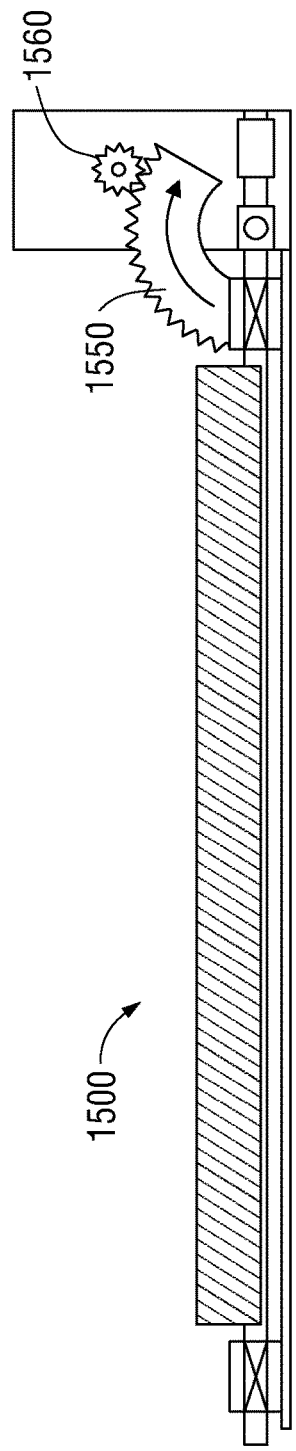

Referring to FIGS. 9A and 9B, in embodiments, some or all of the various on-road energy collection sub-systems 100 (FIG. 1) may be configured to move between a "use" position and a "stowed" position for street cleaning, snow removal, maintenance, when energy collection is not desired, etc.

FIG. 9A illustrates one embodiment of a stowaway mechanism 1300 in use with an on-road energy collection sub-system 1302 similar to any of the embodiments detailed above and generally including at least a flap lever 1310, a flap lever shaft 1320, and shaft support bearings 1330 coupling the sub-system 1302 to a base plate 1420.

Stowaway mechanism 1300 includes a pivot hinge 1340 pivotably coupling base plate 1420 with a stowaway housing 1370 or other grounded structure, a guide 1350 defining a rack slot, a pinion 1360 received within the rack slot of guide 1350, ground mount anchors 1380 for retaining base plate 1420 on the roadway "R," mount release mechanisms 1390, a guide motor 1400 housed within stowaway housing 1370, and an electronic control unit (ECU) 1410 housed within stowaway housing 1370.

Pivot hinge 1340 couples base plate 1420 to stowaway housing 1370 or other grounded structure. Guide 1350 is coupled to, for example, support bearings 1330 of on-road energy collection sub-system 1302 or base plate 1420. Pinion 1360 is disposed in meshed engagement within the rack slot of guide 1350 such that, when guide motor 1400 is activated, pinion 1360 is rotated to thereby urge guide 1350 and, thus, on-road energy collection sub-system 1302 to pivot. Rather than powered activation via motor 1400, manual activation, e.g., using a handle crank, is also contemplated.

In use, mount release mechanisms 1390 are (manually or automatically) activated to decouple ground mount anchors 1380 from the roadway "R." Thereafter, ECU 1410 directs motor 1400 to repositioning guide 1350 as detailed above, thereby pivoting on-road energy collection sub-system 1302 about pivot hinge 1340 and relative to the roadway "R" from a horizontal position substantially flush with the roadway "R" to a more-vertical position displaced from the roadway "R." Pivoting of on-road energy collection sub-system 1302 may be locally instructed, e.g., via controls on or within stowaway housing 1370, or remotely, e.g., via an internet connection to ECU 1410.

FIG. 9B illustrates another stowaway mechanism 1500 similar to stowaway mechanism 1300 (FIG. 9A) except that, rather than guide 1550 defining a rack slot, guide 1550 defines an outer rack surface that is disposed in meshed engagement with pinion 1560.

Figure 10C:
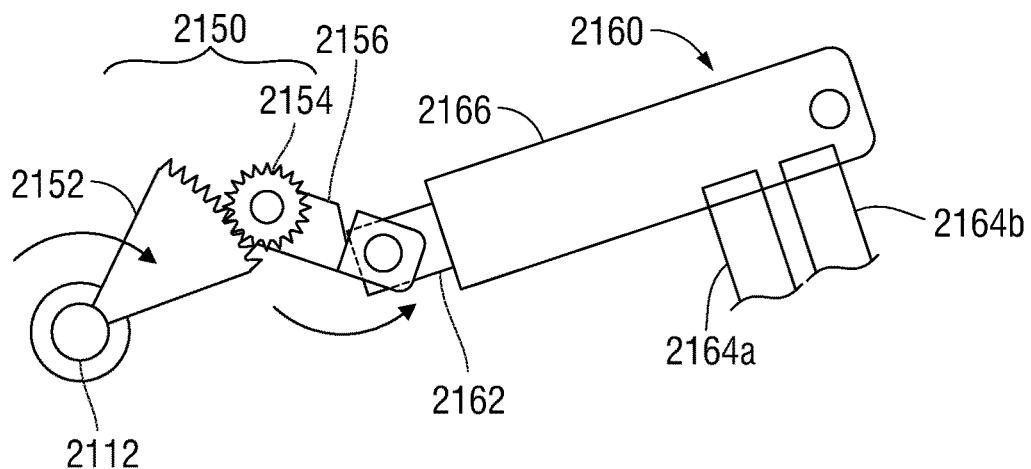
FIG. 10C is an enlarged, side view of a portion of the on-road energy collection sub-system of FIGS. 10A and 10B.

Referring to FIGS. 10A-10C, another embodiment of an on-road energy collection sub-system configured for use with system 10 (FIG. 1) or any other suitable system (such as those detailed herein) is illustrated generally identified by reference numeral 2100. Sub-system 2100 includes a pivoting flap assembly 2110, a gear coupling assembly 2150, and a hydraulic assembly 2160. Pivoting flap assembly 2110 includes first and second flap levers 2112, 2114 and first, second, and third flap lever shafts 2122, 2124, 2126. In embodiments, second flap lever 2114 and the components associated therewith such that first flap lever 2122 pivots at one end thereof about first flap lever shaft 2122 and defines a free second end. A first end of the first flap lever 2112 is fixedly engaged with first flap lever shaft 2122 (which is rotatably mounted in a mounted bearing 2130) such that pivoting of first flap lever 2112 rotates first flap lever shaft 2122. In embodiments, first flap lever 2112 may additionally be engaged, e.g., via welding, mechanical fastening, or in any other suitable manner, directly with first gear 2152 (and/or other suitable components of the gear coupling assembly 2150) to reduce the torsional load on first flap lever shaft 2122. A second, opposite end of first flap lever 2112 is pivotably coupled to a first end of the second flap lever 2114 via the second flap lever shaft 2124. The second end of second flap lever 2114, in turn, is pivotably coupled to the third flap lever shaft 2126 (or other suitable component) which is slidably received within a slot defined within a connector plate mounted bearing 2138. In use, downward pivoting of first flap lever 2112 pivots second flap lever 2114 downward and pushes the second end of second flap lever 2114 away from first flap lever 2112 to translate third flap lever shaft 2126 along the slot of connector plate mounted bearing 2138.

Hydraulic mechanism 2160 includes a hydraulic piston 2162, a hydraulic body 2166 configured to slidably receive piston 2162, a hydraulic input 2164*a* (including a one-way valve to inhibit backflow) and a hydraulic output 2164b (including a one-way valve to inhibit backflow). As an alternative to a separate hydraulic input 2164a and output 2164b, a single combined line may be provided.

Gear coupling assembly 2150 couples first flap lever shaft 2122 with hydraulic piston 2162 such that rotation of first flap lever shaft 2122 urges hydraulic piston 2162 to slide into/out of hydraulic body 2166. More specifically, gear coupling assembly 2150 provides a suitable gear ratio to amplify the output relative to the input, e.g., to provide greater than a 1:1 output to input ratio. Gear coupling assembly 2150 may include any suitable gearing components and configurations thereof to provide this amplification such as, for example, a first gear 2152 secured to the first flap lever shaft 2122, a second gear 2154 disposed in meshed engagement with first gear 2152, and a linkage 2156 secured at one end to second gear 2154 and pivotably coupled to hydraulic piston 2162 at the other end thereof. In this manner, when a vehicle drives onto first flap lever 2112 to pivot first flap lever 2112 downward and rotate first flap lever shaft 2122, first gear 2152 is rotated, thereby rotating second gear 2154 and pivoting linkage 2156 about the first end thereof to urge hydraulic piston 2162 to slide further into hydraulic body 2166 to displace hydraulic fluid and force the fluid out through hydraulic output 2164b, which is coupled to a transmission sub-system, e.g., a hydraulic transmission, according to any of the embodiments herein or other suitable transmission sub-system.

Figure 11:
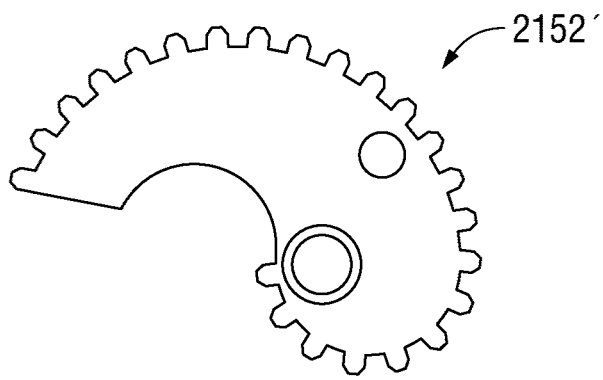
FIG. 11 is a side view of an eccentric gear configured for use with any suitable gear-based on-road energy collection sub-system.

With reference to FIG. 11, in gear-based embodiments, such as with respect to gear coupling assembly 2150 of sub-system 2100 (FIGS. 10A-10C), at least one of the gears, e.g., first gear 2152, or, in embodiments, at least two gears, may be configured as an eccentric gear 2152' where the gear ratio provided varies as the gear 2152' is rotated. Eccentric gears include non-circular, irregular, or other suitable gears that provide a varied gear ratio. The eccentric gear 2152' may be oriented such that the gear ratio is initially low when the sub-system is disposed in its reset/upright position, and increases as a vehicle traverses the sub-system. Such a configuration may enable a smoother torque/energy transfer from the vehicle to the flap lever and, thus, through the sub-system and/or may protect the sub-system from high impact transfer via the drive shaft. Eccentric gears may likewise be used in other assemblies involving gears for similar purposes.

Figure 12:
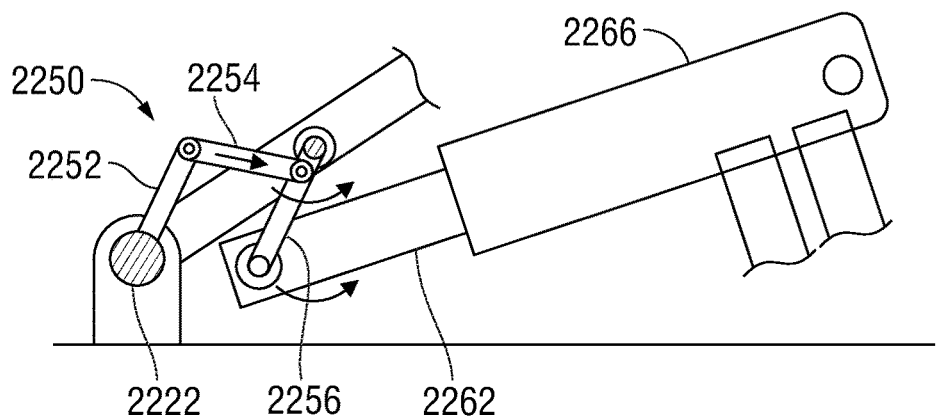
FIG. 12 is an enlarged, side view of another assembly configured for use with the on-road energy collection sub-system of FIGS. 10A and 10B.

Turning to FIG. 12, as an alternative to a gear coupling assembly 2150 (FIGS. 10A-10C) for providing a gear ratio to amplify output relative to the input, a four-bar mechanical linkage assembly 2250 may be utilized. Four-bar mechanical linkage assembly 2250 may include, for example, a first linkage 2252 fixed to the first flap lever shaft 2222 at a first end and pivotably coupled to a first end of a second linkage 2254 at a second end of the first linkage 2252. The second end of the second linkage 2254, in turn, is pivotably coupled to an intermediate portion of a third linkage 2256. A first end of third linkage 2256 is pivotable but translationally fixed such that third linkage 2256 is pivotable about the first end thereof. The second end of third linkage 2256 is pivotably coupled to the hydraulic piston 2262. Thus, upon an input rotation to first flap lever shaft 2222, first linkage 2252 is pivoted to thereby pivot and translate second linkage 2254 to, in turn, pivot third linkage 2256, thereby urging hydraulic piston 2262 to slide further into hydraulic body 2266. The output sliding of hydraulic piston 2262 is amplified as compared to the input rotation to first flap lever shaft 2222.

Figure 13:
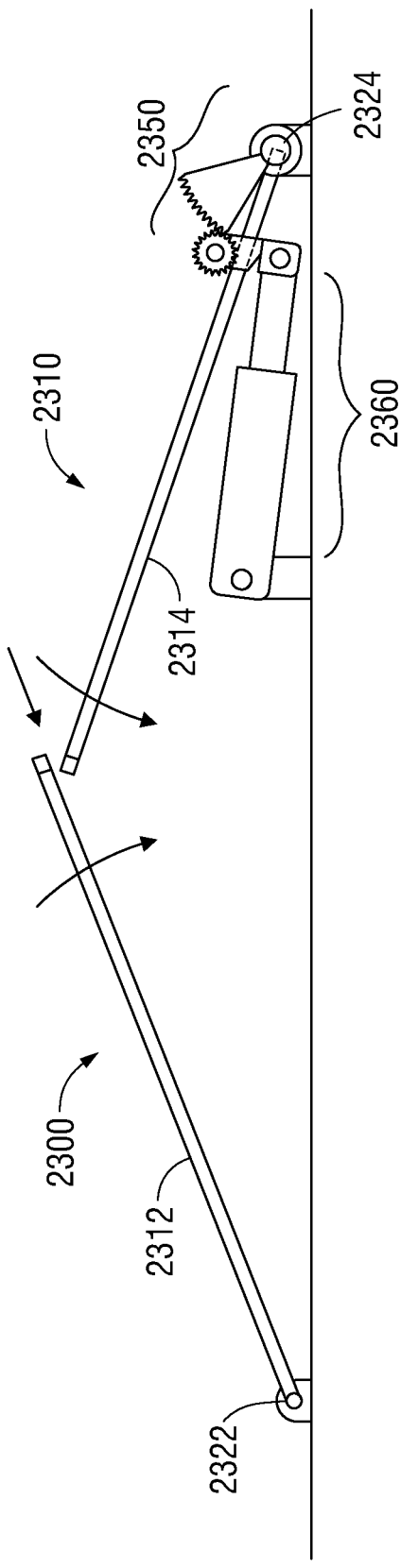
FIG. 13 is a side view of still another on-road energy collection sub-system configured for use with the system of FIG. 1 or any other suitable system in accordance with the present disclosure.

Referring to FIG. 13, another embodiment of an on-road energy collection sub-system configured for use with system 10 (FIG. 1) or any other suitable system (such as those detailed herein) is illustrated generally identified by reference numeral 2300. Sub-system 2300 includes a pivoting flap assembly 2310, a gear coupling assembly 2350, and a hydraulic assembly 2360. Pivoting flap assembly 2110 includes first and second flap levers 2312, 2314 and first and second flap lever shafts 2322, 2324. A first end of the first flap lever 2312 is fixedly engaged with first flap lever shaft 2322 such that pivoting of first flap lever 2312 rotates first flap lever shaft 2322. A second, opposite end of first flap lever 2312 is free-floating and overlaps above a first, free, floating end of second flap lever 2314. A second end of second flap lever 2314 is pivotably coupled to the second flap lever shaft 2324, which is operably coupled to hydraulic assembly 2360 via gear coupling assembly 2350. Hydraulic assembly 2360 and gear coupling assembly 2350 may be substantially similar as detailed above with respect to sub-system 2100 (FIGS. 10A-10C).

Sub-system 2300 is oriented such that a vehicle first travels over first flap lever 2312, urging first flap lever 2312 to pivot downwardly. Due to the free, floating end of first flap lever overlapping above the free, floating end of second flap lever 2314, the downward pivoting of first flap lever 2312 urges second flap lever 2314 to likewise pivot downwardly and, thus, drive power transmission components, e.g., hydraulic assembly 2360 via gear coupling assembly 2350. By first pivoting the first flap lever 2312, which is not connected to the power transmission components, e.g., hydraulic assembly 2360, first flap lever 2312 may act as pre-load/progressive force applier to second flap lever 2314, which includes hydraulic assembly 2360 connected thereto. Such a configuration may enable more progressive energy transfer and reduce initial high impact pulses. Other suitable power transmission components are also contemplated.

Figure 14:
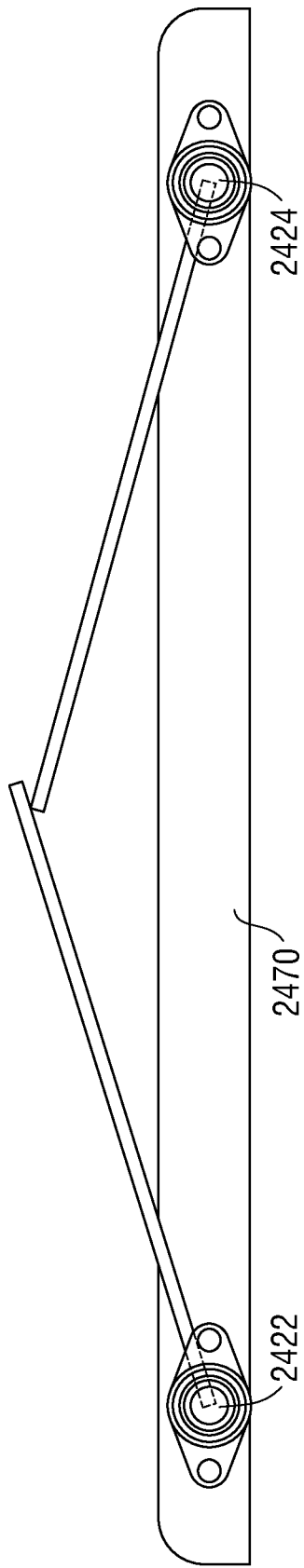
FIG. 14 is a side view of the on-road energy collection sub-system of FIG. 13 including a common structural base.

As illustrated in FIG. 14, in embodiments where two translationally fixed pivot shafts 2422, 2424, e.g., as with respect to first and second flap lever shafts 2322, 2324 (FIG. 13), a common support base 2470 may be provided to pivotably support the fixed pivot shafts 2422, 2424, thereby increasing structural integrity.

Figure 15A:
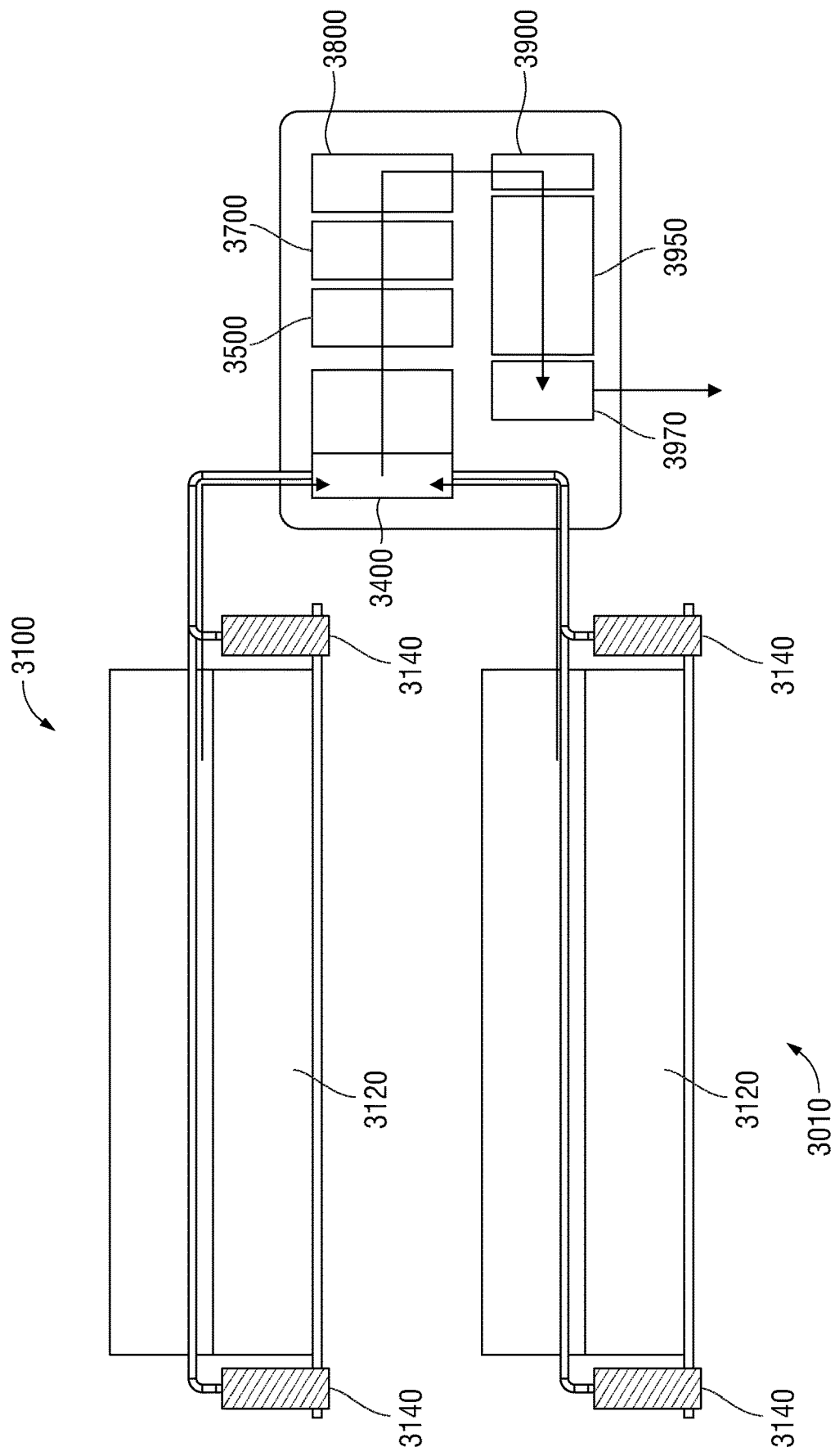
FIG. 15A is a schematic illustration of another system provided in accordance with the present disclosure for converting vehicular kinetic energy into electricity.

FIG. 15A schematically illustrates another surface-mounted system 3010 for converting vehicular kinetic energy into electricity in accordance with the present disclosure. System 3010, similar to system 10 (FIG. 1), a plurality of sub-systems: an on-road energy collection sub-system 3100; a first transmission sub-system 3400; a flywheel sub-system 3500; one or more second transmission sub-systems, e.g., a gearbox/continuously variable transmission (CVT), etc. sub-systems 3700; one or more energy generator sub-systems 3800; one or more charge controllers 3900; one or more battery banks 3950; and an DC/AC inverter 3970 for connecting to a power grid or other load. Each on-road energy collection sub-system 3100 (two are shown, any suitable number are contemplated) includes a shaft flap lever assembly 3120 disposed on the road for a vehicle to traverse, similarly as detailed with respect to any of the embodiments herein. Each on-road energy collection sub-system 3100 further includes a pair of hydra-mechanical gearbox assemblies 3140, one disposed on each side of the shaft flap lever assembly 3120 and, thus, on each side of the road (or portion of road). Hydra-mechanical gearbox assemblies 3140 may include gears, mechanical linkages, and/or other suitable components coupled to one or more hydraulic actuators for converting pivoting motion of the shaft flap lever assembly 3120 into actuation of the one or more hydraulic actuators, e.g., similarly as detailed above with respect to various embodiments herein. The hydra-mechanical gearbox assemblies 3140 of each on-road energy collection sub-system 3100 feed into a hydraulic line connected to the first transmission sub-system 3400 (or other suitable components) to enable electrical power generation and storage, e.g., within the one or more battery banks 3950, based thereon. In this and/or other embodiments, first transmission sub-system 3400 may be configured similarly as the second transmission sub-systems detailed herein, and vice versa.

Figure 15B:
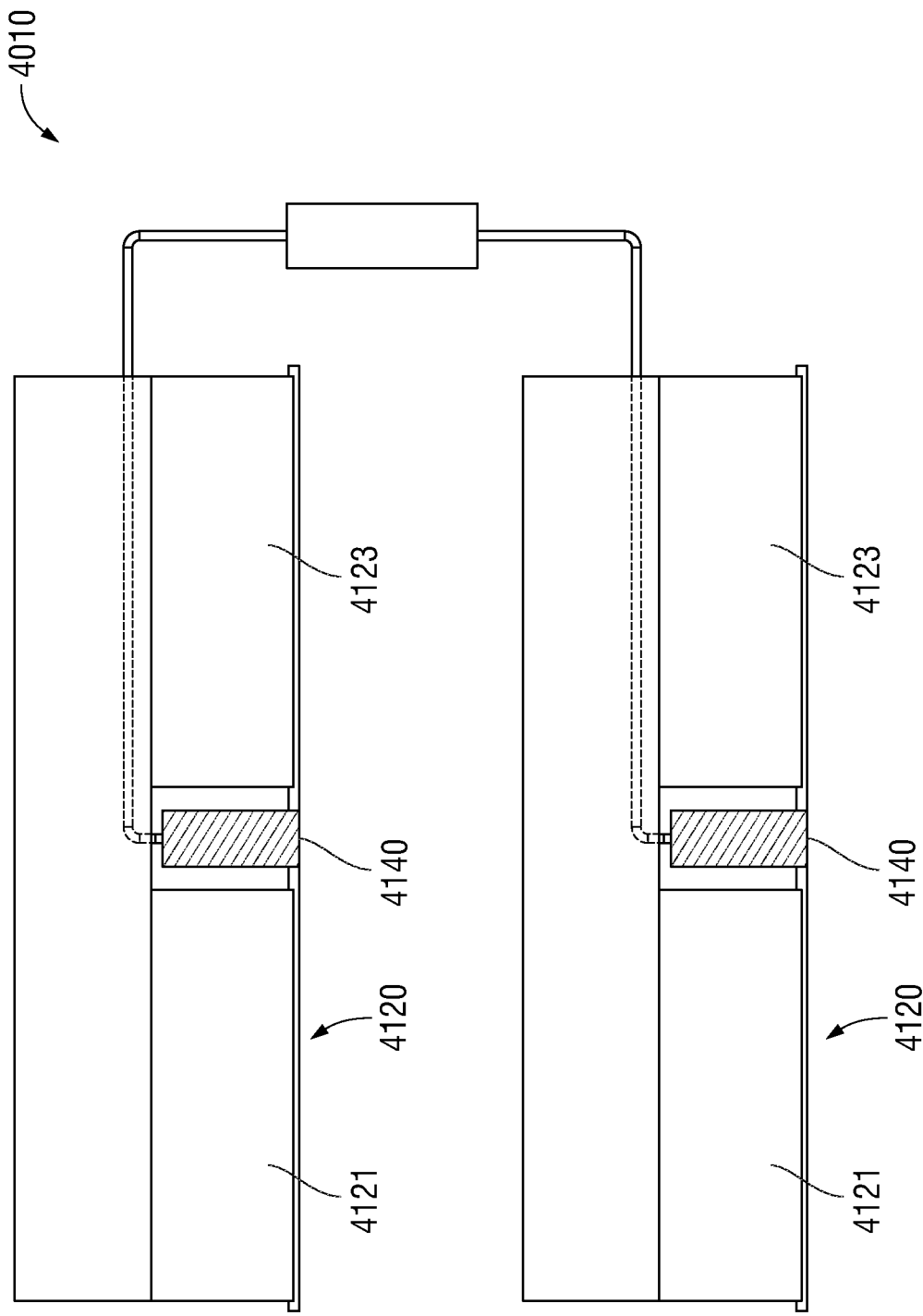
FIG. 15B is a schematic illustration of yet another system provided in accordance with the present disclosure for converting vehicular kinetic energy into electricity.

FIG. 15B schematically illustrates another surface-mounted system 4010 for converting vehicular kinetic energy into electricity in accordance with the present disclosure. System 4010 is similar to system 3010 (FIG. 15A) except that a single hydra-mechanical gearbox assembly 4140 is coupled to each of the shaft flap lever assemblies 4120, e.g., in a central location thereof. In such embodiments, the shaft flap lever assemblies 4120 may be bifurcated into first and second portions 4121, 4123 disposed on either side of and each connected to the central hydra-mechanical gearbox assembly 4140.

Turning to FIGS. 16A and 16B, sub-system 2400 is another embodiment of an on-road energy collection sub-system configured for use with system 10 (FIG. 1) or any other suitable system (such as those detailed herein) and includes a pair of independent pivoting flap assemblies 2401 each coupled to a common gearing assembly 2406 via a hydraulic assembly 2450.

The pivoting flap assemblies 2401 are oriented in the same direction and each includes first and second flap levers 2412, 2414; first, second, and third flap lever shafts 2422, 2424, 2426; and flap lever mounted bearings 2430, 2438. A first end of the first flap lever 2412 of each assembly 2401 is pivotably coupled to its flap lever mounted bearing 2430 via its first flap lever shaft 2422. A second, opposite end of first flap lever 2412 of each assembly 2401 is pivotably coupled to a first end of the second flap lever 2414 thereof via the second flap lever shaft 2424 of that assembly 2401. The second end of second flap lever 2414 of each assembly 2401, in turn, is coupled with the third flap lever shaft 2426 which, in turn, is slidably received within a slot defined within mounted bearing 2438.

Each hydraulic assembly 2450 includes input and output hydraulic pistons 2452, 2454. The input pistons 2452 are coupled to the respective third flap lever shafts 2426 such that, in response to translation of the corresponding third flap lever shaft 2426 within the slot defined within the mounted bearing 2438, e.g., in response to a vehicle driving over the first and second flap levers 2412, 2414 of that pivoting flap assemblies 2401, the input piston 2452 is actuated. Upon actuation of the input piston 2452, the output piston 2454 is, in turn, actuated. The output pistons 2454 are oriented in opposite directions and are each coupled to an opposing side of a common rack 2491 of gearing assembly 2406. Common rack 2491 is coupled to the first and second pinion gears 2492 of gearing assembly 2406 such that translation of common rack 2491 rotates the first and second pinion gears 2492 which provide the input to the remainder of gearing assembly 2460, which is otherwise configured similarly as detailed above with respect to gearing assembly 106*t* (see FIG. 2T-2) or gearing assembly 106*t'* (see FIG. 2T-4).

By coupling the output pistons 2454 on opposing side of the common rack 2491 in opposite directions, as detailed above, actuation of one output piston 2454 resets the other output piston 2452. As such, when a vehicle drives over one of the pivoting flap assemblies 2401, the hydraulic assemblies 2450 work to reset the other pivoting flap assembly 2401 to its initial position, e.g., ready to receive a vehicle.

In embodiments, it is noted that, instead of coupling the output pistons 2454 on opposing sides of common rack 2491 for coupling with the remainder of gearing assembly 2406, the output pistons 2454 may be coupled on either side of a dual-direction piston, e.g., dual-direction piston 390*u* (FIG. 2U-1), which, in turn, is coupled to a hydraulic assembly, e.g., hydraulic assembly 107*u* (FIG. 2U-1) or hydraulic assembly 107*u'* (FIG. 2U-2).

With reference to FIGS. 17A-17C, another embodiment of an on-road energy collection sub-system configured for use with system 10 (FIG. 1) or any other suitable system (such as those detailed herein) is shown as sub-system 2500. Sub-system 2500 includes a pivoting flap assembly 2501 and a hydraulic assembly 2550.

The pivoting flap assembly 2501 includes first and second flap levers 2512, 2514; first, second, and third flap lever shafts 2522, 2524, 2526; flap lever mounted bearings 2530, 2538 and a linkage 2539. A first end of the first flap lever 2512 is pivotably coupled to flap lever mounted bearing 2530 via first flap lever shaft 2522. A second, opposite end of first flap lever 2512 is pivotably coupled to a first end of the second flap lever 2514 via the second flap lever shaft 2524. The second end of second flap lever 2514, in turn, is coupled with the third flap lever shaft 2526 which, in turn, is slidably received within a slot defined within mounted bearing 2538. Linkage 2539 couples third flap lever shaft 2526 with piston 2552 of hydraulic assembly 2550, rather than a direct coupling between flap lever shaft 2526 and piston 2552. Such a configuration facilitates resetting pivoting flap assembly 2501 using hydraulic assembly 2550 (operating in the opposite direction from actuation thereof) in that it facilitates unlocking from an over-center lockout condition (or near over-center condition) where second flap lever shaft 2524 crosses (or approaches) a line segment interconnecting first and third flap lever shafts 2522, 2526, respectively.

Figure 18:
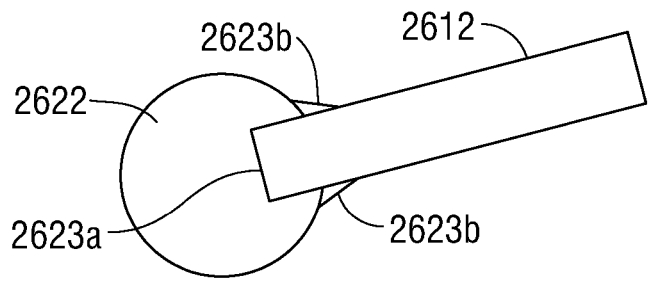
FIG. 18 is a cross-sectional view illustrating engagement between a flap lever and a shaft in accordance with the present disclosure and configured for use with an on-road energy collection sub-system.

Referring to FIG. 18, in many of the embodiments detailed herein, a shaft 2622 is fixedly engaged with a flap lever 2612 such that pivoting of the flap lever 2612 rotates the shaft 2622. In such configurations, a secure and rigid engagement therebetween is desired. In order to achieve such an engagement, in embodiments, the shaft 2622 may be formed to include or modified to include a keyway 2623*a* for receipt of an end of the flap lever 2612. Thereafter, the flap lever 2612 and shaft 2622 are welded to one another, e.g., at interfaces 2623*b* therebetween on either side of the keyway 2623*a*. The mechanical keyway engagement and weld securement provides a secure and rigid engagement.

Figure 19A:
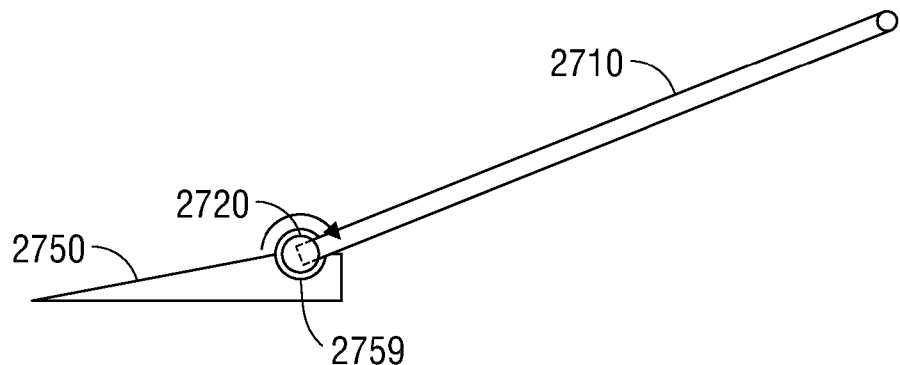
FIGS. 19A and 19B are side and end views, respectively, of an on-ramp structure, shaft, and flap lever coupling in accordance with the present disclosure and configured for use with an on-road energy collection sub-system.
Figure 19B:
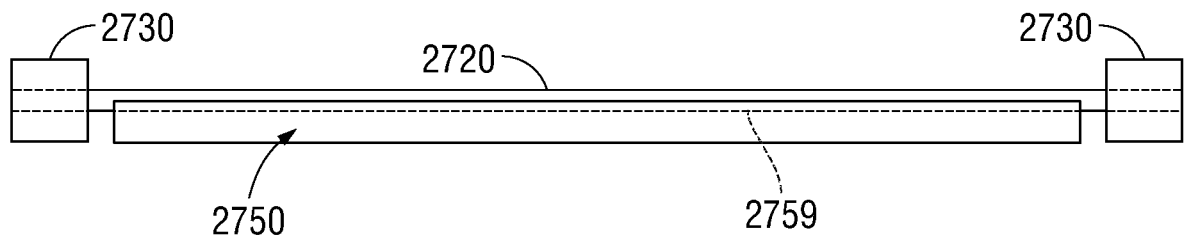

Turning to FIGS. 19A and 19B, in many of the embodiments detailed herein, an on-ramp structure 2750 is (or may be) positioned adjacent the first end of the first flap lever 2710 to define a smooth transition from a roadway onto the first flap lever 2710. Further, in many embodiments, at least the first flap lever shaft 2720, which is engaged with the first flap lever 2710 and extends across a roadway or portion thereof, is supported only at end portions thereof via mounted bearings 2730 and is otherwise suspended across the roadway or portion thereof. In order to increase the support and inhibit droop, rather than only supporting first flap lever shaft 2720 at end portions thereof via mounted bearings 2730, on-ramp structure 2750 may be formed to include or modified to include a support bearing defined therein, e.g., an arcuate recess 2759. Arcuate recess 2759 extends the width of on-ramp structure 2750, at least partially receives first flap lever shaft 2720 therein and supports first flap lever shaft 2720 while still permitting rotation of first flap lever shaft 2720 relative to on-ramp structure 2750.

This configuration may also allow for a lower profile of the sub-system at the first end of first flap lever 2710.

Figure 20:
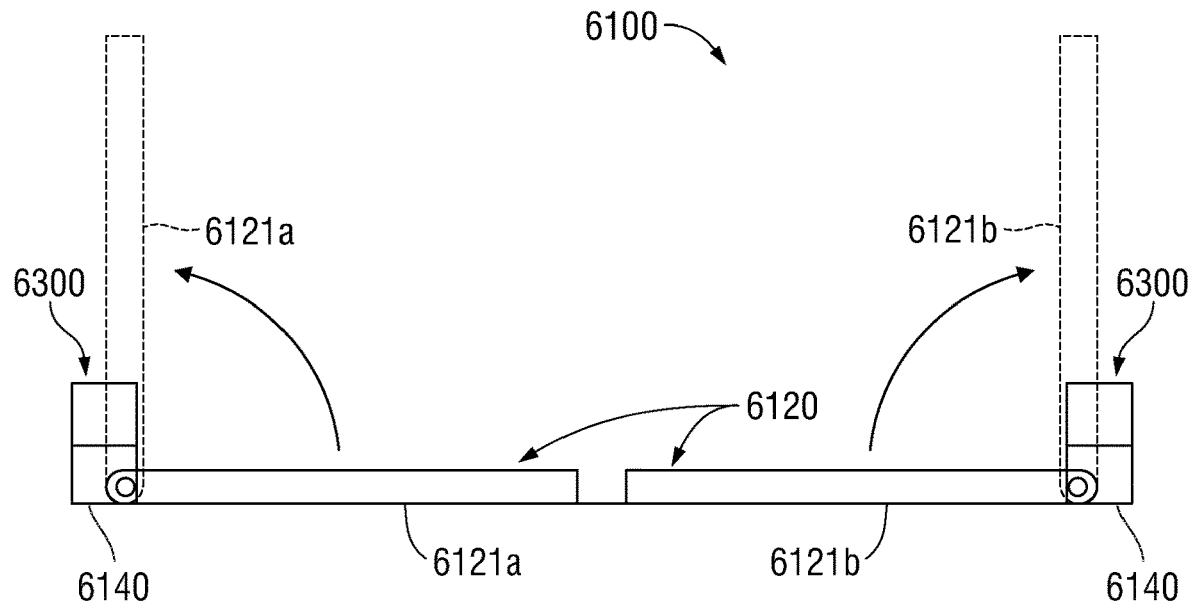
FIG. 20 is a side view of a stowaway mechanism in accordance with the present disclosure configured for use with any suitable system.

With reference to FIG. 20, in embodiments where the on-road energy collection sub-system 6100 includes a flap lever assembly 6120 extending across a roadway with a pair of hydra-mechanical gearbox assemblies 6140 (or other suitable energy-transmission components) on each side of the flap lever assembly 6120, the flap lever assembly 6120 may be separated or separable into first and second portions 6121a, 6121b, each of which is pivotably coupled with a stowaway mechanism 6300 (such as any of the stowaway mechanisms detailed herein or any other suitable stowaway mechanism) disposed along a side of the roadway. In this manner, the first and second portions 6121a, 6121b of flap lever assembly 6120 may be pivoted in opposite directions to a vertical, stowed condition on opposing sides of the roadway. By separating the flap lever assembly 6120 into first and second portions 6121a, 6121b, an overall height of the flap lever assembly 6120 in the vertical, stowed condition is reduced.

Figure 21:
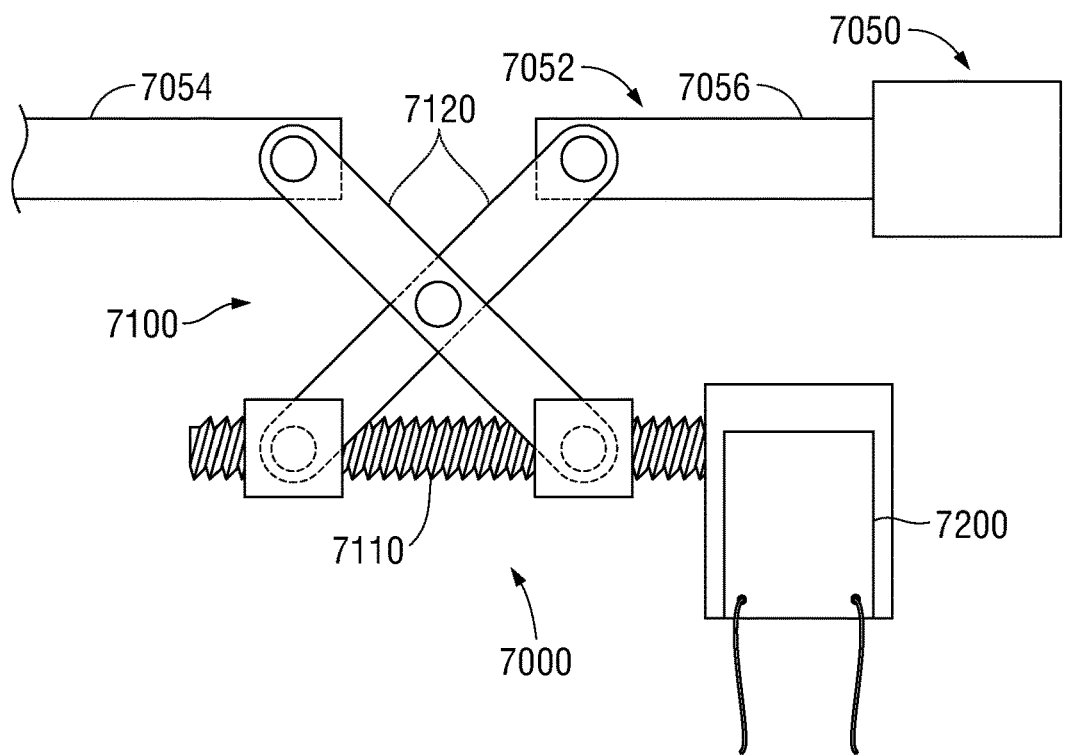
FIG. 21 is a side view of a height adjustment mechanism in accordance with the present disclosure configured for use with any suitable system.

Referring to FIG. 21, as noted above with respect to FIG. 7C, in embodiment, traffic analysis electronics sub-system 1000 (FIG. 7C) may be configured to assess vehicle ground clearance (and/or other suitable property) of an approaching vehicle and, based on the determined ground clearance (and/or other suitable property), make a decision to either maintain the height of the on-road flap lever system or adjust the height of the on-road flap lever system. With respect to adjusting the height of the on-road flap lever system, a height adjustment mechanism 7000 may be provided.

Height adjustment mechanism 7000 may, for example, couple first and second portions 7054, 7056 of a piston 7052 of a hydraulic assembly 7050 to enable movement of the first portion 7054 (which is coupled to the on-road flap lever system, similarly as detailed above with respect to several of the embodiments provided herein) relative to movement of the second portion 7054 (which is moved to actuate the hydraulic assembly similarly as detailed above with respect to several of the embodiments provided herein). More specifically, height adjustment mechanism 7000 may include a scissor jack mechanism 7100 and a motor 7200 coupled to the scissor jack mechanism 7100 for driving rotation of a lead screw 7110 thereof to thereby pivot first and second cross-links 7120 between a more-horizontal orientation and a more-vertical orientation. In the more-horizontal orientation, first and second portions 7054, 7056 of piston 7052 are farther spaced-apart from one another while, in the more-vertical orientation, first and second portions 7054, 7056 of piston 7052 are disposed in closer proximity relative to one another.

Referring also to FIGS. 17A, for example, the initial position of pivoting flap assembly 2501 may be modified using height adjustment mechanism 7000 by pivoting first and second cross-links 7120 towards the more-vertical orientation, thereby pivoting pivoting flap assembly 2501 downwardly, without actuating hydraulic assembly 2550. Other suitable height adjustment mechanisms for similar purposes are also contemplated.

Figure 22:
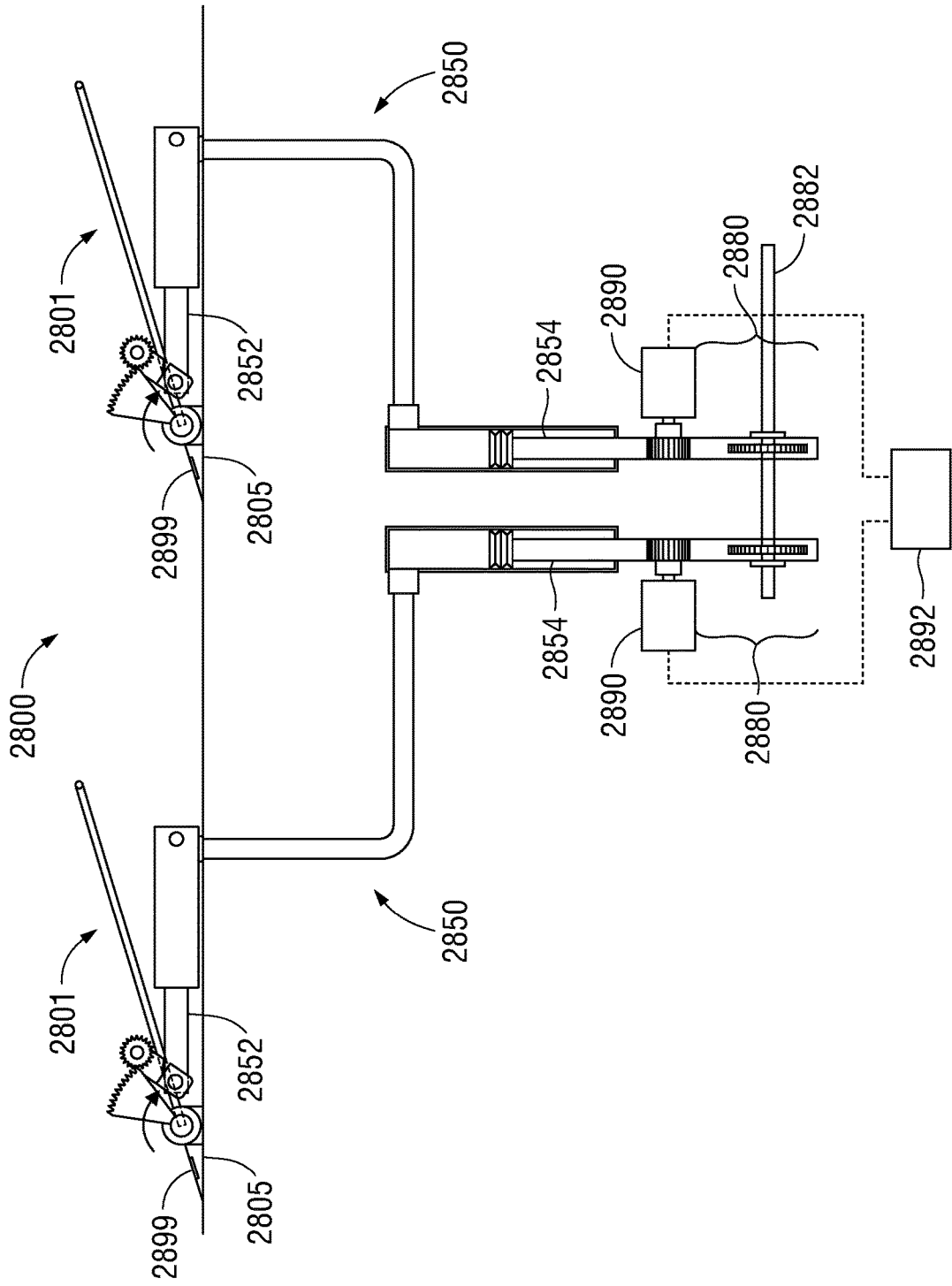
FIG. 22 is a side view of still another on-road energy collection sub-system configured for use with the system of FIG. 1 or any other suitable system in accordance with the present disclosure.

Turning to FIG. 22, sub-system 2800 is another embodiment of an on-road energy collection sub-system configured for use with system 10 (FIG. 1) or any other suitable system (such as those detailed herein) and includes a pair of independent pivoting flap assemblies 2801 each coupled to a hydraulic assembly 2850 and a gear assembly 2880. Reset motors 2890 and a reset motor controller 2892 are also provided to enable independent resetting of either or both of independent pivoting flap assemblies 2801.

Pivoting flap assemblies 2801 are oriented in the same direction and each may be configured similarly or differently, e.g., according to any of the embodiments detailed herein such as with respect to pivoting flap assembly 2110 (FIGS. 10A-10C). Each hydraulic assembly 2850 includes input and output hydraulic pistons 2852, 2854. The input piston 2852 is coupled to the respective pivoting flap assembly 2801 such that, in response to actuation of the pivoting flap assembly 2801, e.g., via a vehicle driving over the flap lever thereof, the input piston 2852 is actuated. Upon actuation of the input piston 2852, the output piston 2854 is, in turn, actuated. The output pistons 2854 drive corresponding gearing assemblies 2880 which are connected to a common output shaft 2882. One-way gears, clutches, or other suitable components may be provided to operably couple gearing assemblies 2880 to common output shaft 2882 such that common output shaft 2882 is only driven to rotate in a single direction.

Reset motors 2890, as controlled by reset motor controller 2892, are configured to back-drive hydraulic assemblies 2850 to thereby reset pivoting flap assemblies 2801 to their initial positions. Reset motors 2890, in embodiments, may be coupled to other components (not necessarily gearings assemblies 2880) and reset motor controller 2892 may direct reset motors 2890 to reset their corresponding pivoting flap assembly 2801 based on a timer, mechanical switch, sensor, or other feedback. For example, a pressure sensor 2899 may be disposed on the on-ramp structure 2805 associated with each of the pivoting flap assemblies 2801. Reset motors 2890 are independently activatable to enable independent resetting of pivoting flap assemblies 2801.

In embodiments, as with other electronic components of the present disclosure, reset motors 2890 may be configured to generate electrical energy when not being driven to reset. That is, during actuation of hydraulic assemblies 2850, the rotor of each reset motor 2890 may be driven in the opposite direction to generate electrical energy (e.g., in a regenerative manner). This generated electrical energy may be used to fully or partially power reset motors 2890. Alternatively or additionally, the reset motors 2890 may be powered (and/or batteries thereof charged) in-system (e.g., via electrical energy generated by the on-road system, thus obviating the need for an external power source). Further, although two pivoting flap assemblies 2801 are detailed with respect to sub-system 2800, it is contemplated that any suitable number may be provided.

In embodiments, reset motors 2890 may be configured, e.g., based on vehicle ground clearance information (or other vehicle property information) input received at reset controller 2892 from a sensor or other source, to adjust the initial height of the pivoting flap assemblies 2801 (or to reset the pivoting flap assemblies 2801 to a different initial height), similarly as detailed above.

Figure 23:
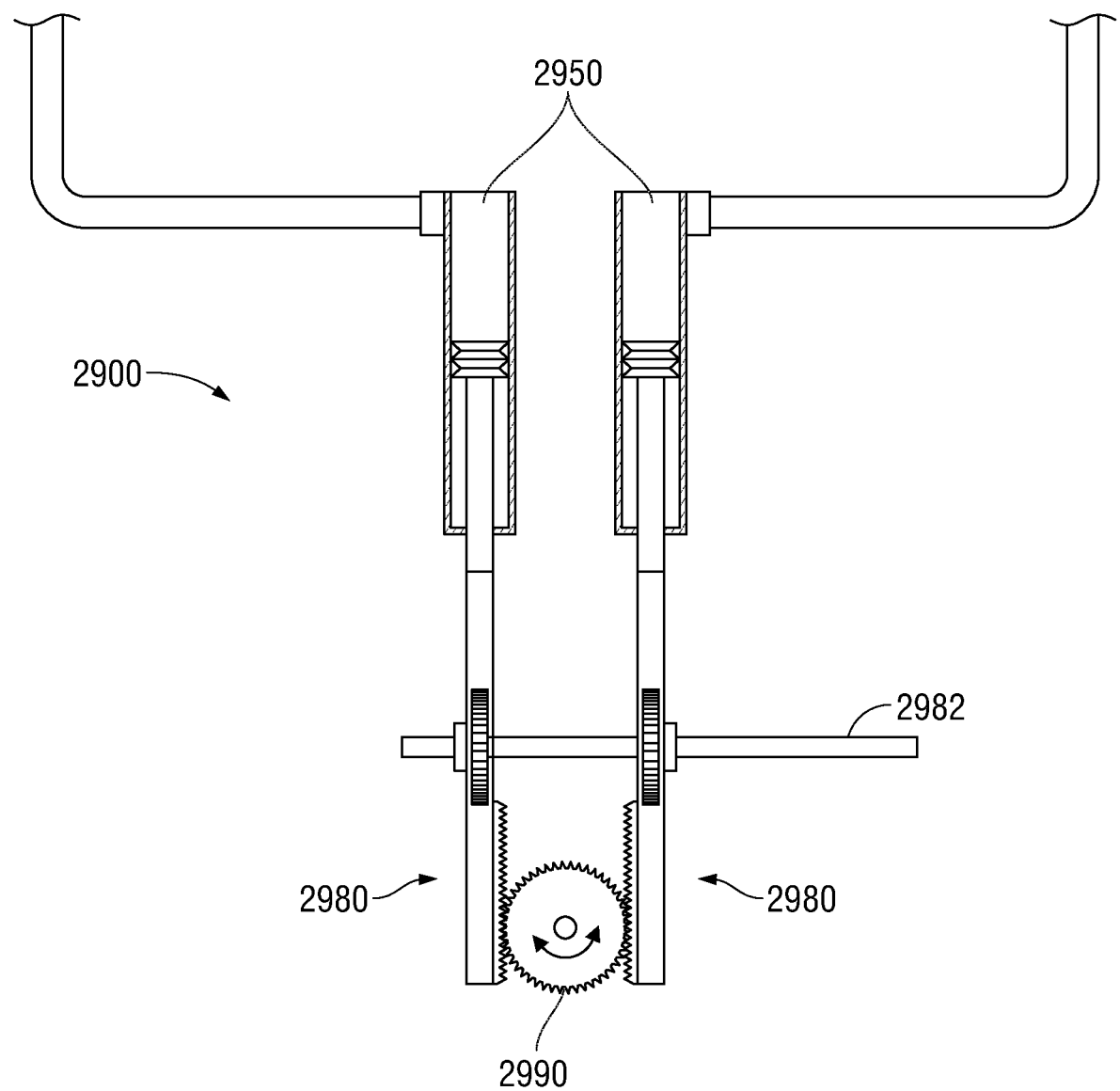
FIG. 23 is a side view of still another on-road energy collection sub-system configured for use with the system of FIG. 1 or any other suitable system in accordance with the present disclosure.

Illustrated in FIG. 23 is another on-road energy collection sub-system 2900 configured for use with system 10 (FIG. 1) or any other suitable system (such as those detailed herein). Sub-system 2900 may be similar to sub-system 2800 (FIG. 22) except that, rather than providing reset motors and a reset controller, sub-system 2900 includes a reset gear 2990 interdisposed between the gear assemblies 2980 associated with first and second pivoting flap assemblies. In this manner, in response to actuation of one pivoting flap assembly, e.g., via a vehicle driving over the flap lever thereof, the corresponding hydraulic assembly 2950 is actuated to thereby drive the corresponding gear assembly 2980 to rotate the output the common output shaft 2982 (which is capable of being driven in a single direction through the use of one-way gears, clutched, etc.). The driving of the gear assembly 2980 also drives the reset gear 2990 to thereby drive the other gear assembly 2980 in reverse, reverse-actuating the other hydraulic assembly 2950 and, ultimately, resetting the other pivoting flap assembly.

With reference to FIGS. 24 and 25, in embodiments, rather than utilizing the output of a flap lever shaft at an end of one of the flap levers, an intermediate flap lever shaft (positioned along one of the flap levers somewhere between the ends thereof) may be provided. More specifically, sub-system 8000 is another embodiment of an on-road energy collection sub-system configured for use with system 10 (FIG. 1) or any other suitable system (such as those detailed herein) and includes a pair of pivoting flap assemblies 8001, one (FIG. 24) or both (FIG. 25) of which is coupled to a gear assembly 8040 and a hydraulic assembly 8050. The pivoting flap assemblies 8001 are similar to one another and face one another, e.g., defining mirror image configurations relative to one another, and each includes a flap lever 8012, and end flap lever shaft 8022 coupled to an end of the flap lever 8012 and rotatably mounted in a mounted bearing 8030, and an intermediate flap lever shaft 8024 coupled to an intermediate portion of the flap lever 8012 at a position spaced-apart from the end flap lever shaft 8022. Each flap lever 8012 defines a free end, the free ends overlapping similarly as detailed above with respect to the configuration illustrated in FIG. 13. In some embodiments, only one of the pivoting flap assemblies 8001 includes an intermediate flap lever shaft 8024 (see, e.g., FIG. 25).

The gear assembly 8040 (see FIG. 25) or both gear assemblies 8040 (FIG. 24) includes a linkage gear 8042 defining a slot 8044 configured to receive the intermediate flap lever shaft 8024 and an arcuate gear teeth portion 8046. The or each gear assembly 8040 further includes a gear rack 8048 disposed in meshed engagement with the arcuate gear teeth portion 8046 of the linkage gear 8042. As a result of the above configuration, pivoting of the flap lever 8012 of one of the pivoting flap lever assemblies 8001 pivots both flap levers 8012 about flap lever shafts 8022, thereby moving the intermediate flap lever shaft(s) 8024 (along a radiused arc about the flap lever shaft 8022). Due to the receipt of intermediate flap lever shaft(s) 8024 within slot(s) 8044, this arcuate motion drives rotation of linkage gear(s) 8042 which, in turn, drives translation of gear rack(s) 8048.

The hydraulic assembly 8050 (see FIG. 25) or both hydraulic assemblies 8050 (FIG. 24) includes a hydraulic piston 8052 coupled to the gear rack 8048 such that translation of the gear rack actuates the hydraulic piston 8052 to urge pressurized fluid through the hydraulic assembly(s) 8050 to thereby drive down stream transmission/gear/hydraulic components configured to generate or facilitate the generation of electricity, e.g., according to any of the embodiments detailed here or other suitable embodiments.

The above-detailed configuration which utilizes an intermediate flap lever shaft (positioned between the ends of a flap lever) rather than a flap lever shaft at an end of a flap lever, is not limited for use with the gear and hydraulic assemblies shown in FIGS. 24 and 25 but may be utilized with any of the other configurations detailed herein, by swapping the end flap lever shaft for an intermediate flap lever shaft.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as examples of particular embodiments.

What is claimed is:

1. A system for converting vehicular kinetic energy into electricity, comprising:
    at least one on-road energy collection sub-system, including:
        at least one flap lever configured to pivot in response to a vehicle driving over the at least one flap lever;
        at least one flap lever shaft coupled to the at least one flap lever such that the pivoting of the at least one flap lever drives movement of the at least one flap lever shaft, the movement including at least one of rotational or translational motion; and
        at least one output shaft coupled to the at least one flap lever shaft such that the at least one output shaft is driven to rotate to provide a unidirectional rotational output in response to the movement of the at least one flap lever shaft;
    a transmission sub-system configured to receive the unidirectional rotational output from the at least one output shaft as a rotational input, the transmission sub-system configured to selectively modify the rotational input for transmission to a flywheel sub-system; and
    a hydraulic assembly coupled between the at least one flap lever shaft and the at least one output shaft, the hydraulic assembly including at least one hydraulic piston coupled to the at least one flap lever shaft such that the movement of the at least one flap lever shaft drives the hydraulic piston to thereby urge pressurized fluid to flow at least partially through the hydraulic assembly, wherein the flow of the pressurized fluid at least partially through the hydraulic assembly drives the rotation of the at least one output shaft to provide the unidirectional rotational output.

2. The system according to claim 1, wherein the movement is rotational motion and wherein a gear assembly is coupled between the at least one flap lever shaft and the hydraulic assembly to convert the rotational motion into translational motion to drive the hydraulic piston, the gear assembly configured to provide an output to input ratio of greater than 1:1.

3. The system according to claim 1, wherein the movement is rotational motion and wherein a linkage assembly is coupled between the at least one flap lever shaft and the hydraulic assembly to convert the rotational motion into translational motion to drive the hydraulic piston, the linkage assembly configured to provide an output to input ratio of greater than 1:1.

4. The system according to claim 1, wherein the at least one on-road energy collection sub-systems includes a plurality of on-road energy collection sub-systems and wherein the at least one output shaft includes a plurality of output shafts each corresponding to one of the on-road energy collection sub-systems, each output shaft configured to provide a unidirectional rotational output to the transmission sub-system.

5. The system according to claim 1, wherein the at least one on-road energy collection sub-systems includes first and second on-road energy collection sub-systems and wherein the at least one output shaft includes one output shaft coupled to both of the first and second on-road energy collection sub-systems to provide a unidirectional rotational output to the transmission sub-system.

6. The system according to claim 5, further comprising at least one of another hydraulic assembly or a gear assembly coupled between the first and second on-road energy collection sub-systems, wherein the another hydraulic assembly or the gear assembly is configured such that pivoting of the at least one flap lever of the first on-road energy collection sub-system results in the unidirectional rotational output to the transmission sub-system and such that such that pivoting of the at least one flap lever of the second on-road energy collection sub-system results in the unidirectional rotational output to the transmission sub-system.

7. The system according to claim 6, wherein the at least one of the another hydraulic assembly or the gear assembly is further configured to reset the first on-road energy collection sub-system in response to pivoting of the at least one flap lever of the second on-road energy collection sub-system and to reset the second on-road energy collection sub-system in response to pivoting of the at least one flap lever of the first on-road energy collection sub-system.

8. The system according to claim 6, further comprising first and second motors configured to reset the first and second on-road energy collection sub-systems, respectively.

9. The system according to claim 1, wherein the transmission sub-system includes at least one of: an electronically-controlled transmission or a mechanical clutch transmission.

10. The system according to claim 1, wherein the at least one on-road energy collection sub-system further includes at least one stowaway mechanism configured to move the at least one flap lever and the at least one flap lever shaft between a use position, wherein the at least one flap lever and the at least one flap lever shaft extend across at least a portion of a roadway, and a stowed position, wherein the at least one flap lever and the at least one flap lever shaft are displaced from the roadway.

11. The system according to claim 1, wherein the least one flap lever includes first and second flap levers configured to pivot in response to a vehicle driving over at least one of the first or second flap levers.

12. The system according to claim 1, wherein the at least one flap lever shaft is positioned at an end of the at least one flap lever or at an intermediate position along the at least one flap lever.

13. A system for converting vehicular kinetic energy into electricity, comprising:
 at least one on-road energy collection sub-system, including:
  at least one flap lever configured to pivot in response to a vehicle driving over the at least one flap lever;
  at least one flap lever shaft coupled to the at least one flap lever such that the pivoting of the at least one flap lever drives movement of the at least one flap lever shaft, the movement including at least one of rotational or translational motion; and
  at least one output shaft coupled to the at least one flap lever shaft such that the at least one output shaft is driven to rotate to provide a unidirectional rotational output in response to the movement of the at least one flap lever shaft;
 a transmission sub-system configured to receive the unidirectional rotational output from the at least one output shaft as a rotational input, the transmission sub-system configured to selectively modify the rotational input for transmission to a flywheel sub-system; and
 at least one sensor associated with the at least one on-road energy collection sub-system and configured to sense vehicle data of an approaching vehicle, wherein the transmission sub-system is configured to selectively modify the rotational input for transmission to the flywheel sub-system based upon feedback from the at least one sensor.

14. The system according to claim 13, wherein an algorithm is utilized to determine how to modify the rotational input for transmission to the flywheel sub-system based upon feedback from the at least one sensor.

15. The system according to claim 14, wherein the algorithm is remotely updated based upon prior data from other systems for converting vehicular kinetic energy.

16. The system according to claim 13, wherein the at least one sensor is configured to sense at least one of: vehicle speed or vehicle mass.

17. A system for converting vehicular kinetic energy into electricity, comprising:
 at least one on-road energy collection sub-system, including:
  at least one flap lever configured to pivot in response to a vehicle driving over the at least one flap lever;
  at least one flap lever shaft coupled to the at least one flap lever such that the pivoting of the at least one flap lever drives movement of the at least one flap lever shaft, the movement including at least one of rotational or translational motion; and
  at least one output shaft coupled to the at least one flap lever shaft such that the at least one output shaft is driven to rotate to provide a unidirectional rotational output in response to the movement of the at least one flap lever shaft;
 a transmission sub-system configured to receive the unidirectional rotational output from the at least one output shaft as a rotational input, the transmission sub-system configured to selectively modify the rotational input for transmission to a flywheel sub-system; and
 a height adjustment mechanism configured to adjust an initial height of the at least one flap lever.

18. The system according to claim 17, further comprising at least one sensor associated with the at least one on-road energy collection sub-system and configured to sense vehicle data of an approaching vehicle, wherein the height adjustment mechanism is configured to adjust an initial height of the at least one flap lever based upon feedback from the at least one sensor.

19. The system according to claim 18, wherein the vehicle data of the approaching vehicle includes a ground clearance of the approaching vehicle.

* * * * *